US010815075B2

(12) United States Patent
Bastian, II et al.

(10) Patent No.: US 10,815,075 B2
(45) Date of Patent: Oct. 27, 2020

(54) AUTOMATED UNLOADING AND LOADING ROBOT SYSTEM

(71) Applicant: Bastian Solutions, LLC, Indianapolis, IN (US)

(72) Inventors: William A. Bastian, II, Carmel, IN (US); Ariel Marie Roberts, Greenwood, IN (US); Craig Adam Lawrence, Fishers, IN (US); Eugene Anthony Oskay, Indianapolis, IN (US); Joshua Michael Hoeing, Rushville, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 84 days.

(21) Appl. No.: 15/795,947

(22) Filed: Oct. 27, 2017

(65) Prior Publication Data
US 2018/0118476 A1 May 3, 2018

Related U.S. Application Data

(60) Provisional application No. 62/413,602, filed on Oct. 27, 2016.

(51) Int. Cl.
B65G 47/91 (2006.01)
B65G 41/00 (2006.01)

(52) U.S. Cl.
CPC ......... B65G 47/914 (2013.01); B65G 41/001 (2013.01)

(58) Field of Classification Search
CPC .... B64D 9/00; B64D 2009/006; B65G 67/02; B65G 67/08; B65G 67/24; B65G 41/002;
(Continued)

(56) References Cited

U.S. PATENT DOCUMENTS 307,980 A * 11/1884 Paxton ................. B65G 41/002
198/861.4
2,563,965 A * 8/1951 Seed ...................... B65G 47/52
198/535
(Continued)

FOREIGN PATENT DOCUMENTS

DE 102014116725 A1 5/2016
EP 2 570 372 A1 3/2013
(Continued)

OTHER PUBLICATIONS

International Patent Application PCT/US2017/058762 International Search Report dated Feb. 14, 2018. 5 pages.
(Continued)

Primary Examiner — Glenn F Myers
(74) Attorney, Agent, or Firm — Woodard, Emhardt, Henry, Reeves & Wagner, LLP

(57) ABSTRACT

A system includes a robot configured to load and/or unload from a location, such as a cargo carrier or building. The robot includes a base unit that has a transport system to move the base unit. A mast extends from the base unit, and the mast has a mast conveyor. An End of Arm Tool (EoAT) is coupled to the mast. The EoAT includes an EoAT conveyor configured to move a cargo item to and from the mast conveyor. A gripper mechanism is configured to move between a retracted position where the gripper mechanism is clear of the cargo item on the EoAT conveyor and an extended position where the gripper mechanism is able to grip the cargo item.

68 Claims, 49 Drawing Sheets

(58) Field of Classification Search
CPC ...... B65G 41/005; B65G 16/26; B65G 35/08; B65G 15/22; B65G 37/005; B65G 37/00
See application file for complete search history.

(56) References Cited

U.S. PATENT DOCUMENTS

| | | | | |
|---|---|---|---|---|
| 2,755,945 A * | 7/1956 | Gilson | B65G 67/02 | 414/688 |
| 2,973,073 A | 2/1961 | Elliott | | |
| 3,158,252 A * | 11/1964 | Vogt | B65G 47/261 | 198/783 |
| 3,356,236 A * | 12/1967 | Shaw | B65G 67/08 | 414/398 |
| 3,885,682 A * | 5/1975 | McWilliams | B65G 67/08 | 414/789.8 |
| 3,931,897 A * | 1/1976 | Bacon | B65G 67/08 | 414/789.8 |
| 5,009,560 A | 4/1991 | Ruder et al. | | |
| 5,015,145 A | 5/1991 | Angell et al. | | |
| 5,176,485 A * | 1/1993 | Ruder | B65G 67/08 | 414/392 |
| 5,391,038 A | 2/1995 | Stewart | | |
| 5,403,142 A | 4/1995 | Stewart | | |
| 5,538,391 A * | 7/1996 | Bonnet | B65G 59/005 | 198/592 |
| 5,794,416 A | 8/1998 | Rahman | | |
| 7,967,543 B2 | 6/2011 | Criswell et al. | | |
| 8,172,071 B2 | 5/2012 | Schaefer | | |
| 8,562,277 B2 | 10/2013 | Criswell | | |
| 2006/0088403 A1* | 4/2006 | Smith | B65G 41/002 | 414/352 |
| 2008/0118337 A1* | 5/2008 | Vestergaard | B64D 9/00 | 414/340 |
| 2009/0067953 A1 | 3/2009 | Schenning | | |
| 2009/0074546 A1* | 3/2009 | Christensen | B64F 1/32 | 414/298 |
| 2011/0139576 A1 | 6/2011 | Johanssen | | |
| 2012/0253507 A1 | 10/2012 | Eldershaw et al. | | |
| 2013/0034420 A1 | 2/2013 | Hjornet | | |
| 2015/0063973 A1 | 3/2015 | Girtman et al. | | |
| 2015/0274447 A1* | 10/2015 | McCollum | B25J 9/0093 | 414/792.6 |
| 2016/0068357 A1 | 3/2016 | Bastian, II | | |
| 2016/0243971 A1 | 8/2016 | Scheer et al. | | |

FOREIGN PATENT DOCUMENTS

| | | |
|---|---|---|
| EP | 1 885 636 B1 | 4/2013 |
| WO | WO 1999/046195 A1 | 9/1999 |
| WO | WO 2006/117003 A1 | 11/2006 |
| WO | WO 2006/121329 A1 | 11/2006 |

OTHER PUBLICATIONS

International Patent Application PCT/US2017/058762 Written Opinion dated Feb. 14, 2018. 18 pages.

Bastian Solutions. MODEX 2018: One Minute Recap. Apr. 25, 2018. 1 page screenshot of video. [online], [retrieved on Aug. 30, 2018]. Retrieved from YouTube.com using Internet <URL: https://www.youtube.com/watch?v=FrC863wL60Y>.

Bastian Solutions. Robotic Truck Trailer Case Loader/Unloader. [retrieved on Aug. 30, 2018]. 2 pages. Retrieved from the Internet: <URL:https://www.bastiansolutions.com/docs/default-source/default-document-library/ultra-cutsheet.pdf?s.

Bastian Solutions. ULTRA Automated Trailer Loading. Apr. 30, 2018. 1 page screenshot of video. [online], [retrieved on Aug. 30, 2018]. Retrieved from YouTube.com using Internet <URL:https://www.youtube.com/watch?v=kS0Rcgh9-Qw>.

Bastian Solutions. ULTRA: Robotic Truck Loading & Unloading. [retrieved on Aug. 30, 2018]. 1 page. Retrieved from the Internet: <URL: https://www.bastiansolutions.com/solutions/technology/industrial-robotics/industrial-robotic-solutions/mobile-robotics/robotic-truck-unloading-loading>.

Bastian Solutions. New Concepts—Robotic Trailer Loading. Jul. 6, 2011. 1 page screenshot of video. [online], [retrieved on Sep. 5, 2014] Retrieved from YouTube.com using Internet <URL:https://www.youtube.com/watch?v=H-Hw-9uoE_s>.

Teun. The best way to unload a container . . . Nov. 17, 2009. 1 page screenshot of video. [online], [retrieved on Sep. 5, 2014] Retrieved from YouTube.com using Internet <URL:https://www.youtube.com/watch?v=Mc-IC1yclgU>.

Wynright Corporation. Fluid Load RTL Loading. Jan. 13, 2012. 1 page screenshot of video. [online], [retrieved on Sep. 5, 2014] Retrieved from Vimeo.com using Internet <URL:http://vimeo.com/35019088>.

Wynright Corporation. Fluid Unload RTL Unloading. Jan. 9, 2012. 1 page screenshot of video. [online]. [retrieved on Sep. 5, 2014] Retrieved from Vimeo.com using Internet <URL:http://vimeo.com/34806951>.

Wynright Corporation. RTL Mixed Case Simulation. Dec. 12, 2012. 1 page screenshot of video. [online], [retrieved on Sep. 5, 2014] Retrieved from Vimeo.com using Internet <URL:http://vimeo.com/55445160>.

Wynright Corporation. RTL Robotic Truck Loading. Dec. 12, 2012. 1 page screenshot of video. [online], [retrieved on Sep. 5, 2014] Retrieved from Vimeo.com using Internet <URL:http://vimeo.com/55451735>.

Wynright Corporation. RTL-Tire Loading. Dec. 12, 2012. 1 page screenshot of video. [online], [retrieved on Sep. 5, 2014] Retrieved from Vimeo.com using Internet <URL:http://vimeo.com/55457869>.

Wynright Corporation. RTU Mixed Case. Feb. 11, 2013. 1 page screenshot of video. [online], [retrieved on Sep. 5, 2014] Retrieved from Vimeo.com using Internet <URL:http://vimeo.com/59409850>.

Wynright Corporation. RTU Robotic Truck Unloading. Dec. 12, 2012. 1 page screenshot of video. [online], [retrieved on Sep. 5, 2014] Retrieved from Vimeo.com using Internet <URL:http://vimeo.com/55458633>.

Wynright Corporation. RTU Window View. Feb. 11, 2013. 1 page screenshot of video. [online], [retrieved on Sep. 5, 2014] Retrieved from Vimeo.com using Internet <<URL:http://vimeo.com/59409853>.

International Patent Application PCT/US2017/058762 International Preliminary Report on Patentability dated May 9, 2019. 20 pages.

European Patent Application 17866295.3 Extended European Search Report dated Jun. 29, 2020. 9 pages.

\* cited by examiner

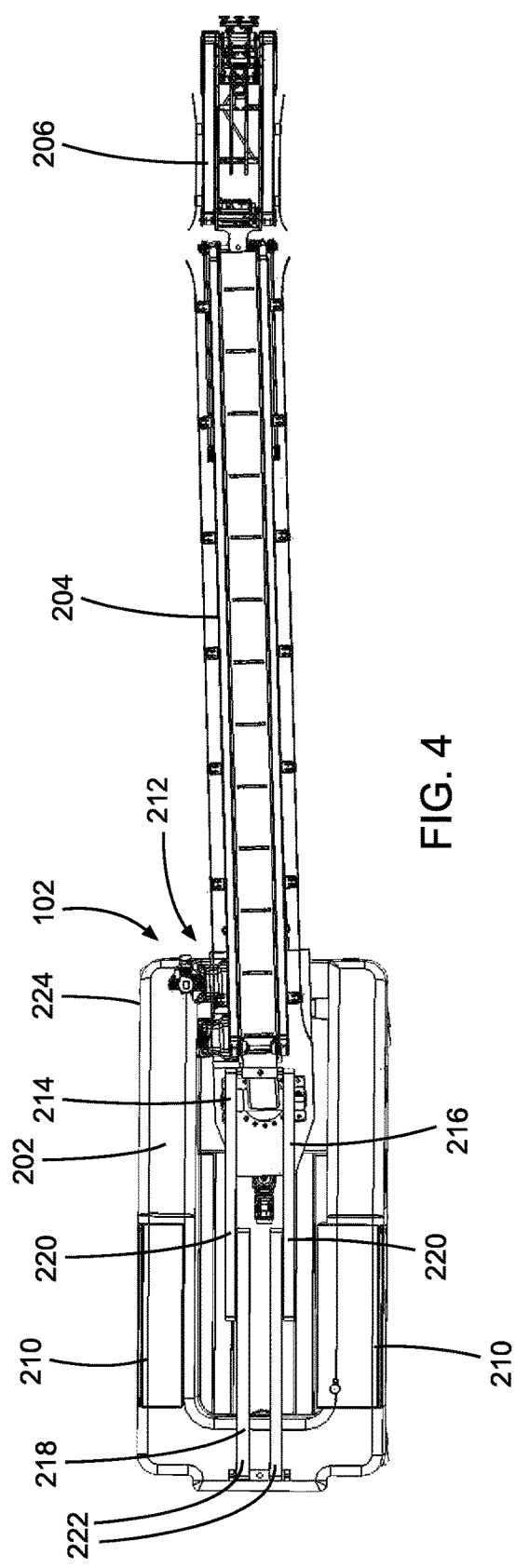
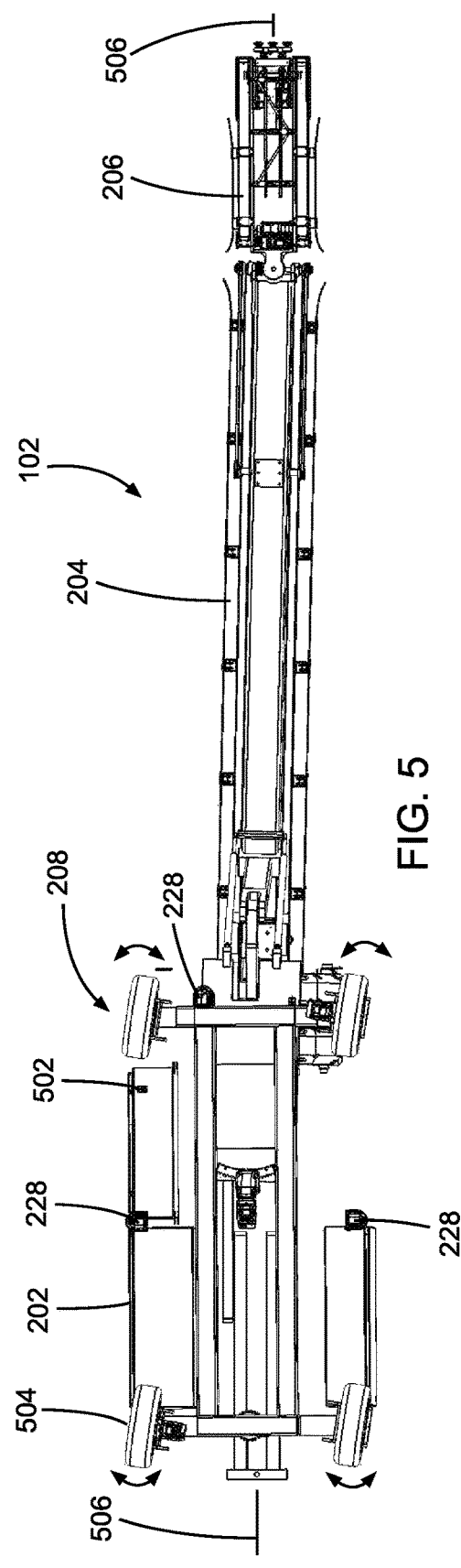

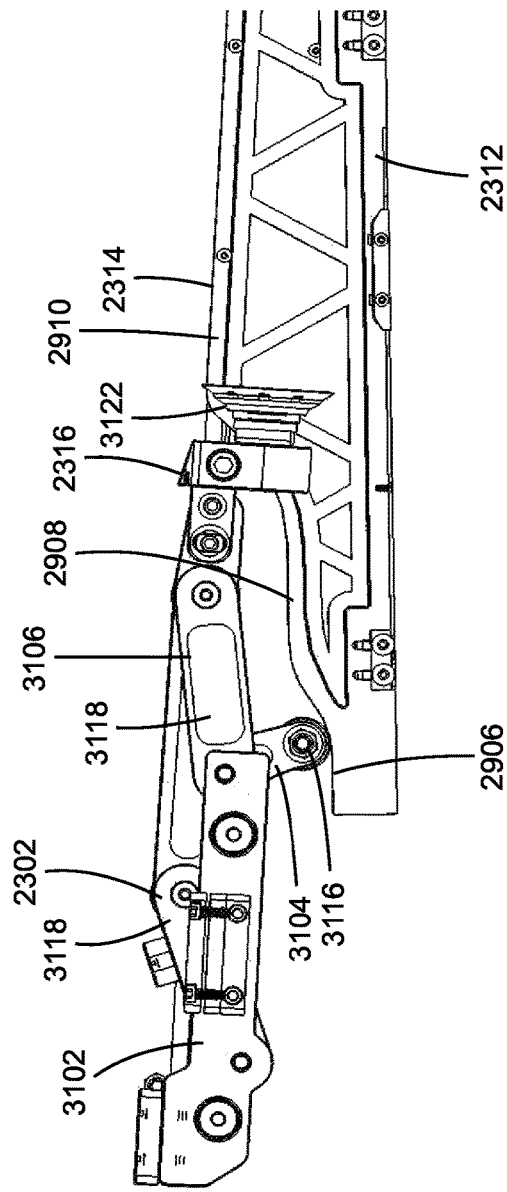
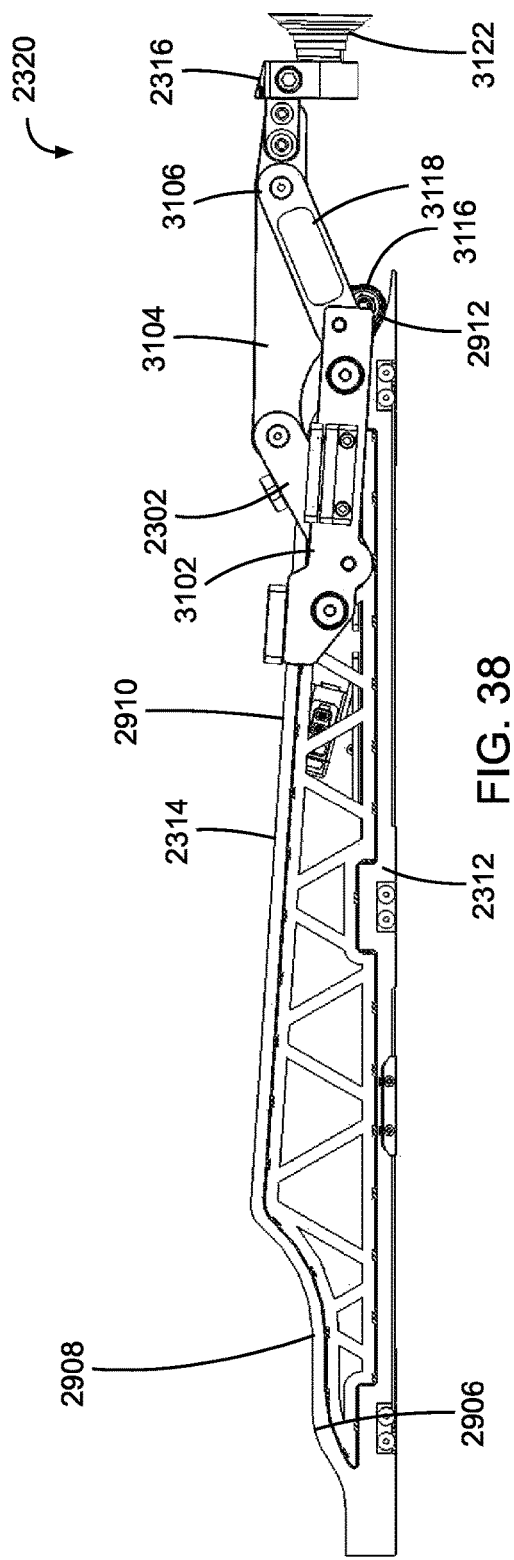
FIG. 37
FIG. 38

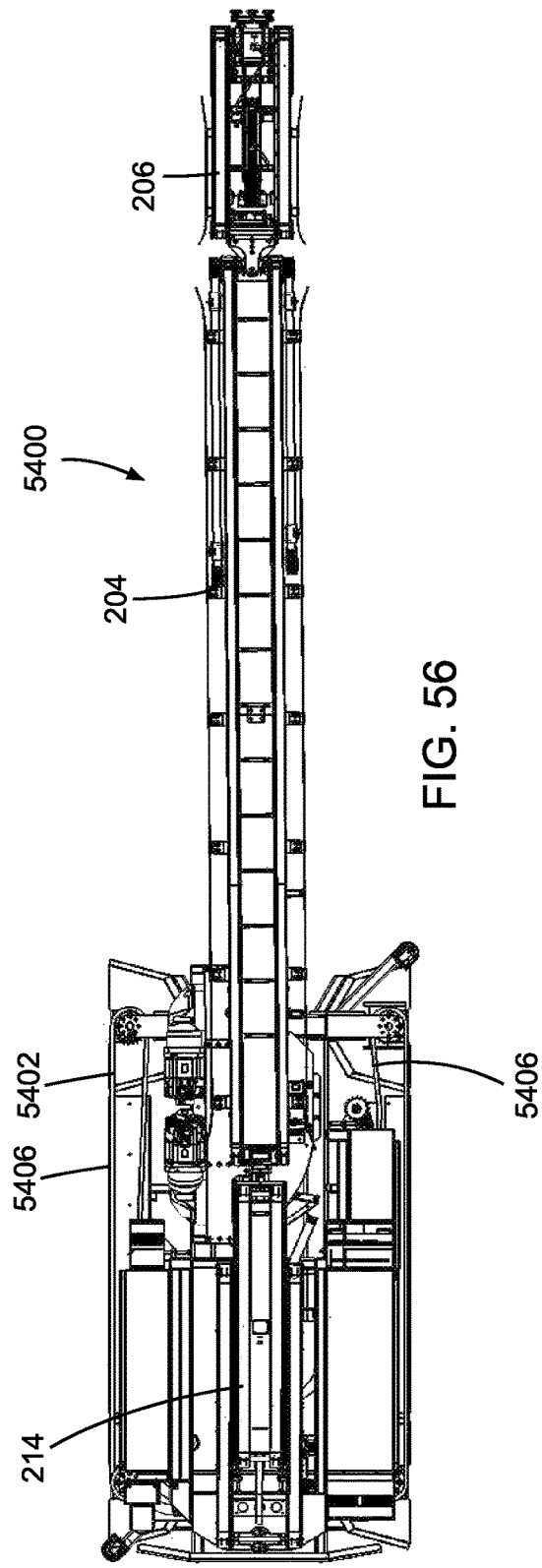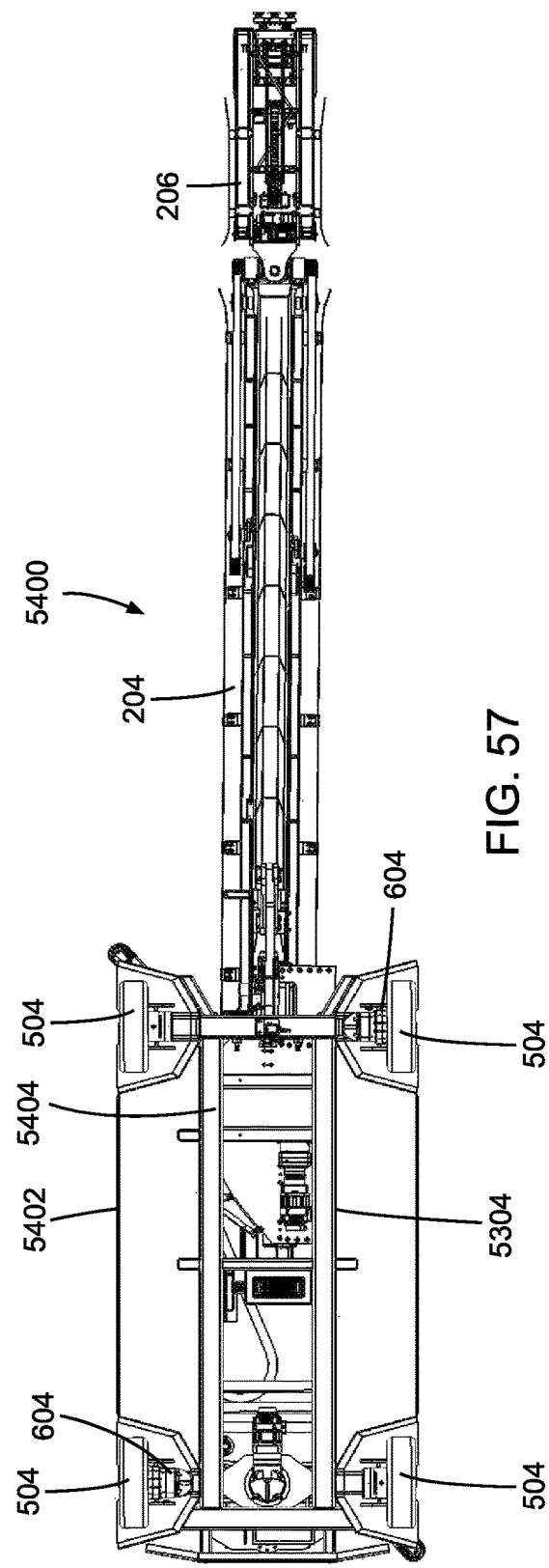

AUTOMATED UNLOADING AND LOADING ROBOT SYSTEM

CROSS-REFERENCE TO RELATED APPLICATION

This application claims the benefit of U.S. Provisional Application No. 62/413,602 filed Oct. 27, 2016, which is hereby incorporated by reference.

BACKGROUND

Loading and unloading cargo, such as packages, boxes, bags, cans, and/or other products, from the cargo containers, such as trailers, cargo carriers, and the like, can be quite expensive, labor-intensive, and even dangerous at times. Often the shipping and receiving operations at the loading docks are the bottlenecks for the entire fulfillment operation. Stacking and unstacking cargo items in warehouses and manufacturing plants can be likewise expensive and dangerous. High stacks of cargo items can become unstable so as to readily fall on those handling the cargo. Manually loading and unloading a trailer can be a tough job because of the environmental conditions inside the trailer. In summer, the trailer can become extremely hot, and in the winter, it can be quite cold. It is also a physically demanding job. For example, personnel in some cases need to manually lift very heavy cargo items approaching 50 pounds in weight over an eight hour shift, and reaching for such items when stacked high can be back breaking work. In such physically demanding jobs, employee turnover is high, and worker compensation claims are likewise high.

Often forklift trucks have been used to load pallets of items to and from cargo containers and warehouses, but there are a number of limitations on their use. For example, semi-trailers have been known to dislodge from loading docks which can be especially dangerous for forklift truck operators. Moreover, the loading or unloading process typically takes a considerable amount of time because usually only one forklift can fit inside the trailer at a time. In addition, the pallets for the forklifts typically waste usable space within the cargo container and add unnecessary weight. This wasted empty space and added weight costs money. When difficulties arise with the forklifts, loading dock personnel have been used to manually unload and stack items within the cargo space, but again such labor intensive activities can still be quite expensive and time-consuming as well as can result in injury to the personnel. Robotic and other automated systems have been proposed for loading and unloading cargo, but these systems still have a number of significant drawbacks. The throughput provided by these systems is typically low, and these systems are error prone, thereby still requiring human intervention when mishaps occur. Thus, there is a need for improvement in this field.

SUMMARY

An automated unloading and loading robot system has been developed to rapidly stack and/or unstack cargo items in a cargo carrier (or other location). The system includes a mobile robot that has a unique End of Arm Tool (EoAT) attached to a moveable mast. The EoAT incorporates a conveyor system that is able to rapidly transport the cargo items on a near continuous basis. The EoAT includes an extendable-retractable gripper mechanism that is configured to grip the cargo items. In one form, the gripper mechanism includes one or more vacuum cups to grip the cargo items. The gripper mechanism is able to extend the vacuum cups above the conveyor system on the EoAT in order to pull cargo onto the conveyor system. Once the cargo item is pulled onto the conveyor system, the vacuum cups are retracted below the conveyor system so that the cargo item is able to travel over the gripper mechanism. When unloading or stacking the cargo items, the gripper mechanism can operate in a reverse fashion and accurately push the cargo items from the conveyor system and onto the cargo stack. The EoAT is able to move in yaw (side-to-side) and pitch (tilt) directions relative to the mast so that it is properly positioned to pick or place the cargo items. The mast is attached to a mobile base unit. The mobile base unit is able to move the EoAT by moving the mast. In addition, large or major movements of the EoAT can be accomplished by moving and/or steering the mobile base unit. For example, the mobile base unit is configured to move in and out of a trailer as well as in side-to-side directions. The moveable mast minimizes the distance the base unit needs to move in order to load or unload the cargo items from the cargo container. The base unit is able to adjust the yaw and pitch of the mast. The base unit is also able to extend and retract the mast so that the base unit does not need to move as the EoAT moves vertically and horizontally along a row of stacked cargo items. The mast and base unit have conveyors for transporting the cargo items to and from the EoAT. In one form, an extendable conveyor is coupled to the base unit so as to form a link between the robot and main conveyor system in a facility. This robot system can rapidly load and unload cargo carriers automatically with no or little human interaction. This system design eliminates the need for forklift operators which in turn reduces the risk of injury and expense associated with the operators as well as reduces loading and unloading times.

Aspect 1 concerns a system, comprising a robot including a base unit having a transport system to move the base unit, a mast extending from the base unit, the mast having a mast conveyor, and an End of Arm Tool (EoAT) coupled to the mast, wherein the EoAT includes an EoAT conveyor configured to move a cargo item to and from the mast conveyor, and a gripper mechanism configured to move between a retracted position where the gripper mechanism is clear of the cargo item on the EoAT conveyor and an extended position where the gripper mechanism is able to grip the cargo item.

Aspect 2 concerns the aspect of any preceding aspect, wherein the gripper mechanism is at or underneath the EoAT conveyor to facilitate unobstructed movement of the cargo item along the EoAT conveyor when in the retracted position; and the gripper mechanism is raised above the EoAT conveyor to grip the cargo item when in the extended position.

Aspect 3 concerns the aspect of any preceding aspect, wherein the gripper mechanism includes a carriage, an extension mechanism coupled to the carriage to vertically extend the gripper mechanism relative to the EoAT conveyor; and a gripping section coupled to the extension mechanism, wherein the gripping section is configured to grip the cargo item.

Aspect 4 concerns the aspect of any preceding aspect, wherein the EoAT includes a cam track along which the carriage rides, wherein the cam track is shaped to guide the extension mechanism to move the gripping mechanism between the retracted position and the extended position; and a drive track coupled to the carriage to guide the carriage in a longitudinal direction along the cam track to move the gripper mechanism between the retracted position and the extended position.

Aspect 5 concerns the aspect of any preceding aspect, wherein the carriage includes a cam follower coupled to the extension mechanism; and the cam follower rides along the cam track as the carriage moves in a longitudinal direction along the cam track.

Aspect 6 concerns the aspect of any preceding aspect, wherein the cam track includes a retracted section where the gripper mechanism is positioned at the retracted position an engagement section where the gripper mechanism is at the extended position; and a transition section located between the retracted section and the engagement section.

Aspect 7 concerns the aspect of any preceding aspect, wherein the EoAT has a mast facing end where the EoAT is coupled to the mast and a cargo facing end located opposite the mast facing end; and the cam track includes an extended section configured to lower the gripper mechanism relative to the EoAT conveyor when at the cargo facing end.

Aspect 8 concerns the aspect of any preceding aspect, wherein the cam track tapers from the mast facing end to the cargo facing end; and the drive track tapers from the mast facing end to the cargo facing end.

Aspect 9 concerns the aspect of any preceding aspect, wherein the extension mechanism includes one or more extension linkages pivotally coupled between the carriage and the gripper mechanism.

Aspect 10 concerns the aspect of any preceding aspect, wherein the one or more extension linkages are oriented in a parallelogram linkage type arrangement with the carriage and the gripper mechanism.

Aspect 11 concerns the aspect of any preceding aspect, wherein the extension mechanism includes a biasing spring to bias the gripper mechanism towards the retracted position.

Aspect 12 concerns the aspect of any preceding aspect, wherein the EoAT includes a gripper drive configured to move the gripper mechanism in the longitudinal direction along the drive track.

Aspect 13 concerns the aspect of any preceding aspect, wherein the gripper drive includes a reversible motor; and a gripper drive belt operatively connecting the gripper drive to the carriage.

Aspect 14 concerns the aspect of any preceding aspect, wherein the drive track defines a guide slot; and the carriage includes a drive wheel recited in the guide slot.

Aspect 15 concerns the aspect of any preceding aspect, wherein the EoAT conveyor includes a belt type conveyor.

Aspect 16 concerns the aspect of any preceding aspect, wherein the EoAT includes one or more guide rails that have a flared shape.

Aspect 17 concerns the aspect of any preceding aspect, wherein the gripper mechanism includes at least two vacuum cups; and each of the vacuum cups has a vacuum control valve that operates independently of the other vacuum cups.

Aspect 18 concerns the aspect of any preceding aspect, wherein the gripper mechanism includes one or more vacuum cups to grip the cargo item.

Aspect 19 concerns the aspect of any preceding aspect, wherein the robot includes an EoAT pitch-yaw joint connecting the EoAT to the mast; and the EoAT pitch-yaw joint being configured to move the EoAT in a pitch direction and/or a yaw direction.

Aspect 20 concerns the aspect of any preceding aspect, wherein the EoAT pitch-yaw joint includes a yaw pivot shaft, a pivot block defining a shaft channel through which the yaw pivot shaft extends, a rack gear rotatably coupled to the yaw pivot shaft to rotate around the yaw pivot shaft; and a pinion gear engaging the rack gear at a position traverse to the rack gear.

Aspect 21 concerns the aspect of any preceding aspect, wherein the EoAT pitch-yaw joint includes an EoAT bracket connected to the EoAT, the EoAT bracket has at least a pair of flanges that define a bracket cavity in which the pivot block is disposed, and the yaw pivot shaft extends between the flanges.

Aspect 22 concerns the aspect of any preceding aspect, wherein the EoAT pitch-yaw joint includes a pitch driveshaft secured to the pivot block in a fixed manner a pitch drive pulley secured to the pitch driveshaft to move the EoAT in the pitch direction when rotated; and a yaw drive gear coupled to the pinion gear in a fixed manner, wherein the yaw drive gear is rotatably coupled to the pitch driveshaft to move the EoAT in the yaw direction when rotated about the pitch driveshaft.

Aspect 23 concerns the aspect of any preceding aspect, wherein the EoAT pitch-yaw joint includes a second pinion gear engaging the rack gear at a second position traverse to the rack gear, wherein the second pinion gear is positioned opposite the pinion gear with the yaw pivot shaft located in between a first pulley connected to the pinion to rotate the pinion a second pulley connected to the second pinion to rotate the second pinion wherein the rack gear is secured in a fixed manner to one of the pair of flanges wherein the pivot block defines a rack cavity in which the rack gear is disposed, a first pinion cavity in which the pinion is disposed, a second pinion cavity in which the second pinion is disposed, a first gear engagement channel extending between the rack cavity and the first pinion cavity, and a second gear engagement channel extending between the rack cavity and the second pinion cavity wherein the pinion and the second pinion are configured to move the EoAT in the pitch direction when rotated in a same direction; and wherein the pinion and the second pinion are configured to move the EoAT in the yaw direction when rotated in an opposite direction.

Aspect 24 concerns the aspect of any preceding aspect, wherein the EoAT pitch-yaw joint includes a second pinion gear engaging the rack gear at a second position traverse to the rack gear, wherein the second pinion gear is positioned opposite the pinion gear with the yaw pivot shaft located in between.

Aspect 25 concerns the aspect of any preceding aspect, wherein the robot includes a mast actuator system configured to move the mast in a yaw direction, a pitch direction, and/or a longitudinal direction.

Aspect 26 concerns the aspect of any preceding aspect, wherein the mast actuator system includes a mast yaw control subsystem coupled to the base unit to control movement of the mast in the yaw direction; and a mast pitch control subsystem coupled to the mast yaw control subsystem to control movement of the mast in the pitch direction and the longitudinal direction.

Aspect 27 concerns the aspect of any preceding aspect, wherein the mast yaw control subsystem includes a mast base rotatably coupled to the base unit, wherein the mast pitch control subsystem is supported by the mast base; and a mast yaw drive motor secured to the base unit, wherein the mast yaw drive is coupled to the mast base to rotate the mast base in the yaw direction relative to the base unit.

Aspect 28 concerns the aspect of any preceding aspect, wherein the mast yaw control subsystem includes a mast yaw drive gearbox mounted to the base unit; and wherein the mast yaw drive gearbox operatively couples the mast yaw drive motor to the mast base.

Aspect 29 concerns the aspect of any preceding aspect, wherein the mast pitch control subsystem includes a mast extension arm pivotally coupled between the mast base and the mast, wherein the mast extension arm is configured to pivot to cause the mast and the EoAT to move horizontally in the longitudinal direction; and a mast pitch arm pivotally coupled between the mast base the mast, wherein the mast pitch arm is configured to move to control movement the mast in the pitch direction.

Aspect 30 concerns the aspect of any preceding aspect, wherein the mast pitch control subsystem includes an extension drive mounted to the mast base an extension crank coupled to the extension drive an extension link connecting the extension crank to the mast extension arm wherein the extension drive is configured to rotate the extension crank to pivot the mast extension arm a pitch drive mounted to the mast base a pitch crank coupled to the pitch drive wherein the mast pitch arm is pivotally coupled to the pitch crank; and wherein the pitch drive is configured to rotate the pitch crank to move the mast pitch arm.

Aspect 31 concerns the aspect of any preceding aspect, further comprising a counterbalance system coupled to the mast to counterbalance the weight of the mast.

Aspect 32 concerns the aspect of any preceding aspect, wherein the counterbalance system includes an air spring coupled to the mast.

Aspect 33 concerns the aspect of any preceding aspect, further comprising a base unit conveyor operatively connecting the base unit and the mast to transport the cargo item between the mast and a main conveyor system, wherein the base unit conveyor has an extendable length a mast connection joint connecting the base unit conveyor to the mast, wherein the mast connection joint is configured to allow multidirectional movement between the base unit conveyor and the mast; and a base connection joint connecting the base unit conveyor to the base unit, wherein the base unit connection joint is configured to allow movement of the base unit conveyor in the yaw direction and the pitch direction.

Aspect 34 concerns the aspect of any preceding aspect, further comprising a base unit conveyor operatively connecting the base unit and the mast, wherein the base unit conveyor is configured to extend in a telescoping manner a mast connection joint connecting the base unit conveyor to the mast, wherein the mast connection joint is configured to allow multidirectional movement between the base unit conveyor and the mast; and a base connection joint connecting the base unit conveyor to the base unit, wherein the base unit connection joint is configured to allow movement of the base unit conveyor in the yaw direction and the pitch direction.

Aspect 35 concerns the aspect of any preceding aspect, wherein the base unit conveyor includes a mast section connected to the mast via the mast connection joint a transition section connected to the base unit via the base unit connection joint, wherein the mast section and the transition section are nested together; and a telescoping joint connecting the mast section to the transition section to allow the mast section to move relative to the transition section in a telescoping manner.

Aspect 36 concerns the aspect of any preceding aspect, wherein the mast section includes a mast section conveyor, and a mast section conveyor motor configured to power the mast section conveyor the transition section includes a transition section conveyor, and a transition section conveyor motor configured to power the transition section conveyor; and wherein the mast section conveyor motor and the transition section conveyor motor are configured to operate independently of each other.

Aspect 37 concerns the aspect of any preceding aspect, wherein the mast connection joint includes a ball type joint to facilitate relative movement between the mast and the base unit conveyor in both a pitch direction and a yaw direction.

Aspect 38 concerns the aspect of any preceding aspect, wherein the base connection joint includes a turntable joint rotatably coupled to the base unit a conveyor shaft bracket defining a shaft opening; and a conveyor shaft rotatably received in the shaft opening.

Aspect 39 concerns the aspect of any preceding aspect, wherein the transport system includes one or more self-powered wheels configured to rotate at least ninety-degrees (90°) relative to the base unit.

Aspect 40 concerns the aspect of any preceding aspect, further comprising a main conveyor system; and an extendable conveyor coupled between the robot and the main conveyor.

Aspect 41 concerns a system, comprising an End of Arm Tool (EoAT) including an EoAT conveyor configured to move a cargo item, a gripper mechanism configured to move between a retracted position and an extended position, wherein the gripper mechanism includes one or more vacuum cups to grip the cargo item, wherein the gripper mechanism is at or underneath the EoAT conveyor to facilitate unobstructed movement of the cargo item along the EoAT conveyor when in the retracted position, and wherein the gripper mechanism is raised above the EoAT conveyor to grip the cargo item when in the extended position.

Aspect 42 concerns the aspect of any preceding aspect, wherein the gripper mechanism includes a carriage, an extension mechanism coupled to the carriage to vertically extend the gripper mechanism relative to the EoAT conveyor, and a gripping section coupled to the extension mechanism, wherein the gripping section is configured to grip the cargo item.

Aspect 43 concerns the aspect of any preceding aspect, wherein the EoAT includes a cam track along which the carriage rides, wherein the cam track is shaped to guide the extension mechanism to move the gripping mechanism between the retracted position and the extended position; and a drive track coupled to the carriage to guide the carriage in a longitudinal direction along the cam track to move the gripper mechanism between the retracted position and the extended position.

Aspect 44 concerns the aspect of any preceding aspect, wherein the carriage includes a cam follower coupled to the extension mechanism; and the cam follower rides along the cam track as the carriage moves in a longitudinal direction along the cam track.

Aspect 45 concerns the aspect of any preceding aspect, wherein the cam track includes a retracted section where the gripper mechanism is positioned at the retracted position an engagement section where the gripper mechanism is at the extended position; and a transition section located between the retracted section and the engagement section.

Aspect 46 concerns the aspect of any preceding aspect, further comprising an EoAT pitch-yaw joint connected to the EoAT; and the EoAT pitch-yaw joint being configured to move the EoAT in a pitch direction and/or a yaw direction.

Aspect 47 concerns the aspect of any preceding aspect, wherein the EoAT pitch-yaw joint includes a yaw pivot shaft a pivot block defining a shaft channel through which the yaw pivot shaft extends a rack gear rotatably coupled to the yaw pivot shaft to rotate around the yaw pivot shaft; and a pinion gear engaging the rack gear at a position traverse to the rack gear.

Aspect 48 concerns the aspect of any preceding aspect, further comprising a robot including a base unit having a transport system to move the base unit, a mast extending from the base unit, the mast having a mast conveyor, and the EoAT coupled to the mast.

Aspect 49 concerns a system, comprising an End of Arm Tool (EoAT) having an EoAT conveyor, a mast having a mast conveyor, an EoAT pitch-yaw joint connecting the EoAT to the mast, wherein the EoAT pitch-yaw joint is configured to move the EoAT in a pitch direction and/or a yaw direction to maintain alignment of the EoAT conveyor and the mast conveyor, wherein the EoAT pitch-yaw joint includes a yaw pivot shaft, a rack gear rotatably coupled to the yaw pivot shaft to rotate around the yaw pivot shaft, a first pinion gear engaging the rack gear at a position traverse to the rack gear, and a second pinion gear engaging the rack gear at a second position traverse to the rack gear.

Aspect 50 concerns the aspect of any preceding aspect, wherein the mast conveyor includes a mast conveyor belt, and the EoAT pitch-yaw joint includes a pivot housing a mast conveyor pulley rotatably coupled to the pivot housing, and wherein the mast conveyor belt engages the mast conveyor pulley.

Aspect 51 concerns a system, comprising a base unit having a transport system to move the base unit, a mast having a mast conveyor coupled to the base unit a mast actuator system configured to move the mast in a yaw direction, a pitch direction, and/or a longitudinal direction relative to the base unit, wherein the mast actuator system includes a mast yaw control subsystem coupled to the base unit to control movement of the mast in the yaw direction, and a mast pitch control subsystem coupled to the mast yaw control subsystem to control movement of the mast in the pitch direction and the longitudinal direction.

Aspect 52 concerns the aspect of any preceding aspect, wherein the mast yaw control subsystem includes a mast base rotatably coupled to the base unit, the mast pitch control subsystem is supported by the mast base; and a mast yaw drive motor secured to the base unit, wherein the mast yaw drive is coupled to the mast base to rotate the mast base in the yaw direction relative to the base unit.

Aspect 53 concerns the aspect of any preceding aspect, wherein the mast pitch control subsystem includes a mast extension arm pivotally coupled between the mast base and the mast, wherein the mast extension arm is configured to pivot to cause the mast and the EoAT to move horizontally in the longitudinal direction; and a mast pitch arm pivotally coupled between the mast base and the mast, wherein the mast pitch arm is configured to move to control movement of the mast in the pitch direction.

Aspect 54 concerns the aspect of any preceding aspect, further comprising a base unit conveyor operatively connecting the base unit and the mast to transport a cargo item, wherein the base unit conveyor has an extendable length a mast connection joint connecting the base unit conveyor to the mast, wherein the mast connection joint is configured to allow multidirectional movement between the base unit conveyor and the mast; and a base connection joint connecting the base unit conveyor to the base unit, wherein the base unit connection joint is configured to allow movement of the base unit conveyor in the yaw direction and the pitch direction.

Aspect 55 concerns a method of operating the system according to any preceding claim.

Aspect 56 concerns a method, comprising positioning an End of Arm Tool (EoAT) proximal a cargo item, wherein the EoAT has an EoAT conveyor, wherein the gripper mechanism includes one or more vacuum cups securing a cargo item with the vacuum cups of the gripper mechanism pulling the cargo item onto the EoAT conveyor with the gripper mechanism by moving the gripper mechanism along the EoAT retracting the gripper mechanism at or underneath the EoAT conveyor to a retracted position; and moving the cargo item with the EoAT conveyor over the gripper mechanism when in the retracted position.

Aspect 57 concerns the aspect of any preceding aspect, further comprising wherein said positioning includes moving the EoAT with a mast that is coupled to the EoAT wherein the mast includes a mast conveyor; and transferring the cargo item from the EoAT conveyor to the mast conveyor.

Aspect 58 concerns the aspect of any preceding aspect, further comprising moving the gripper mechanism from the retracted position to an extended position before said securing; and wherein the gripper mechanism is raised above the EoAT conveyor to grip the cargo item when in the extended position.

Aspect 59 concerns a method, comprising positioning an End of Arm Tool (EoAT), wherein the EoAT has an EoAT conveyor, wherein the gripper mechanism includes one or more vacuum cups moving a cargo item with the EoAT conveyor over the gripper mechanism when in a retracted position extending the gripper mechanism from the retracted position to an extended position where the gripper mechanism is raised above the EoAT conveyor to contact the cargo item after said moving the cargo item; and pushing the cargo item off the EoAT conveyor with the gripper mechanism by moving the gripper mechanism along the EoAT.

Aspect 60 concerns the aspect of any preceding aspect, further comprising wherein said positioning includes moving the EoAT with a mast that is coupled to the EoAT wherein the mast includes a mast conveyor; and transferring the cargo item from the mast conveyor to the EoAT conveyor.

Aspect 61 concerns the aspect of any preceding aspect, wherein the EoAT includes a guide rail having a front end extending longer than the EoAT, and the front end is spring biased.

Aspect 62 concerns the aspect of any preceding aspect, wherein the EoAT has a vision sensor to sense the cargo item.

Aspect 63 concerns the aspect of any preceding aspect, wherein the pulling includes pulling the cargo item with a second cargo item stacked thereupon.

Aspect 64 concerns the aspect of any preceding aspect, wherein the pushing includes pushing the cargo item with a second cargo item stacked thereupon.

Further forms, objects, features, aspects, benefits, advantages, and embodiments of the present invention will become apparent from a detailed description and drawings provided herewith.

BRIEF DESCRIPTION OF THE DRAWINGS

FIG. 4 is a top view of the FIG. 2 robot.

FIG. 5 is a bottom view of the FIG. 2 robot with a housing of the FIG. 2 robot hidden from view.

FIG. 37 is an enlarged cross-sectional view of the interface between the FIG. 29 cam track and the FIG. 31 gripper mechanism when in the retracted position.

FIG. 38 is a cross-sectional view of the FIG. 29 cam track and the FIG. 31 gripper mechanism when in the extended position.

FIG. 56 is a top view of the FIG. 54 robot.

FIG. 57 is a bottom view of the FIG. 54 robot.

DESCRIPTION OF THE SELECTED EMBODIMENTS

Figure 1:
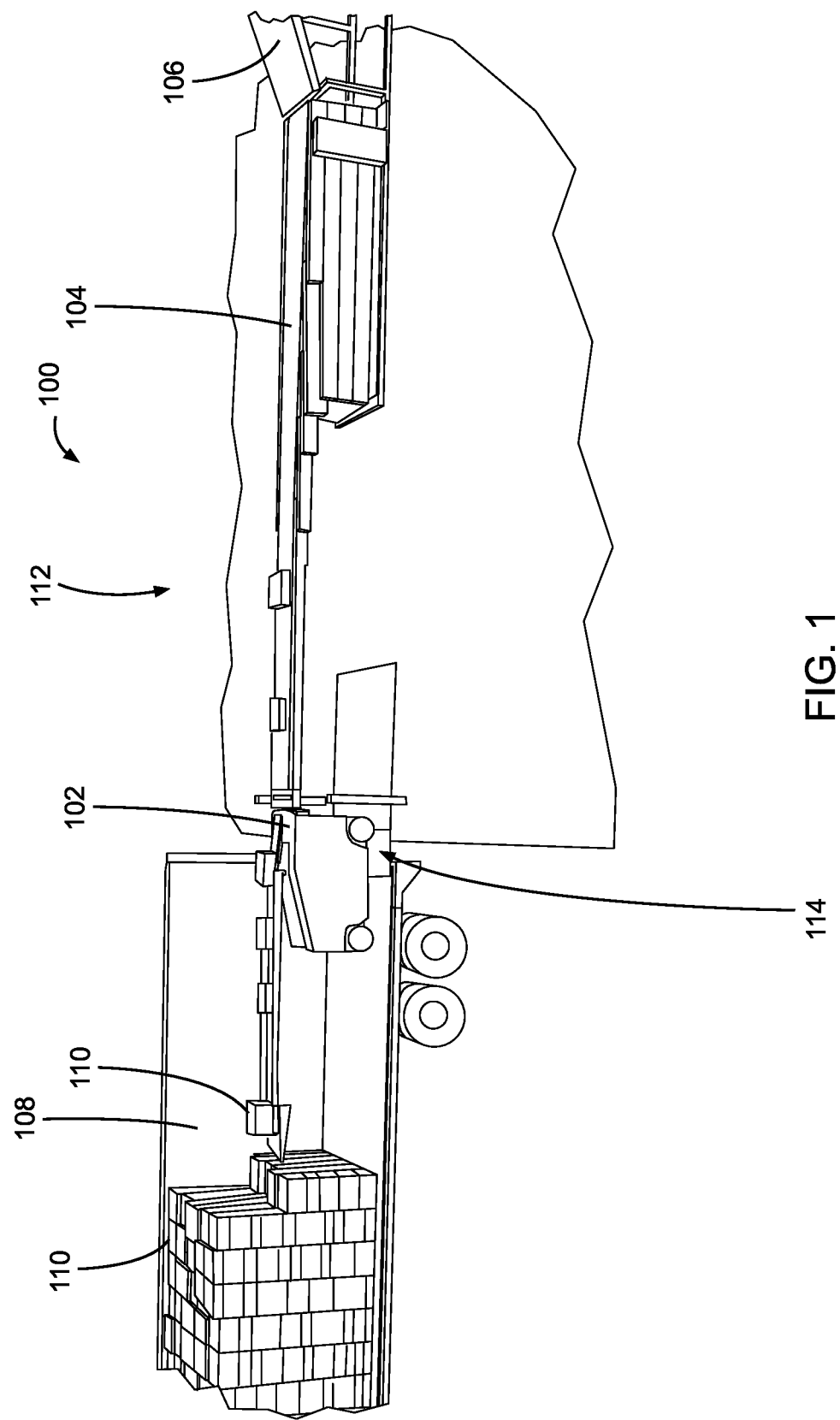
FIG. 1 is a perspective view of an automated unloading and loading system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a perspective view of an automated unloading and loading system 100 according to one example. The system 100 includes an automated unloading and loading robot 102 and an extendable conveyor system 104 operatively positioned between the robot 102 and a main conveyor system 106, which is typically (but not always) found in a warehouse and/or manufacturing plant. As shown, the robot 102 is configured to move in and out of a cargo carrier 108, such as a semi-trailer or flatbed trailer, in a progressive manner. Alternatively or additionally, the robot 102 is able to move between various dock doors as well as other cargo carriers 108. As the robot 102 progressively moves in and out of the cargo carrier 108, the extendable conveyor system 104 extends or retracts, depending on the movement of the robot 102 in the cargo carrier 108 as well as elsewhere. The extendable conveyor system 104 can for example include connectors, cabling, and/or tubing for supplying electrical power, air, and/or communication pathways to the robot 102. The robot 102 is configured to load and/or unload cargo items 110 from the cargo carrier 108. In the illustrated example, the cargo items 110 are in the form of boxes, but in other examples, other types of cargo items 110, such as bags, drums, cases, etc., can be loaded and/or unloaded from the cargo carrier 108 with the robot 102. As will be explained in greater detail below, the robot 102 is configured to load and/or unload the cargo items 110 within the cargo carrier 108 in a continuous or near continuous fashion. As a result, the robot 102 is able to quickly service the cargo carrier 108. The robot 102 is designed to rapidly stack and unstack the cargo items 110 within the cargo carrier 108 as well as unstack or unload the cargo items 110 from the cargo carrier 108 with minimal movement. Consequently, the cargo carrier 108 can be rapidly loaded and unloaded automatically without any (or minimal) human interaction. As can be also seen in FIG. 1, the robot 102 is able to pack or unpack the cargo items 110 from the bottom and nearly to the top and sides of the cargo carrier 108 so as to efficiently almost fill the entire space inside the cargo carrier 108, if needed.

To provide some context, the system 100 will be described with reference to a warehousing environment, but it should be recognized that the system 100 can be used in other types of environments, such as manufacturing plants, food processing plants, and/or agricultural environments, to name just a few examples. Besides on or inside the cargo carrier 108, the robot 102 can be used to stack or unstack cargo items 110 at other locations, such as at various storage or staging locations within a building 112. As illustrated, the extendable conveyor system 104 and the main conveyor system 106 are typically located within the building 112, such as a warehouse. The extendable conveyor system 104 transports the cargo items 110 between the robot 102 and the main conveyor system 106, and vice versa. The main conveyor system 106 for instance can supply the cargo items 110 to various processing equipment and/or storage locations within the building 112. The robot 102 is able to service the cargo carrier 108 through a standard loading dock 114 in the building 112 such that no modifications to the loading dock 114 and/or building 112 are typically required.

Figure 2:
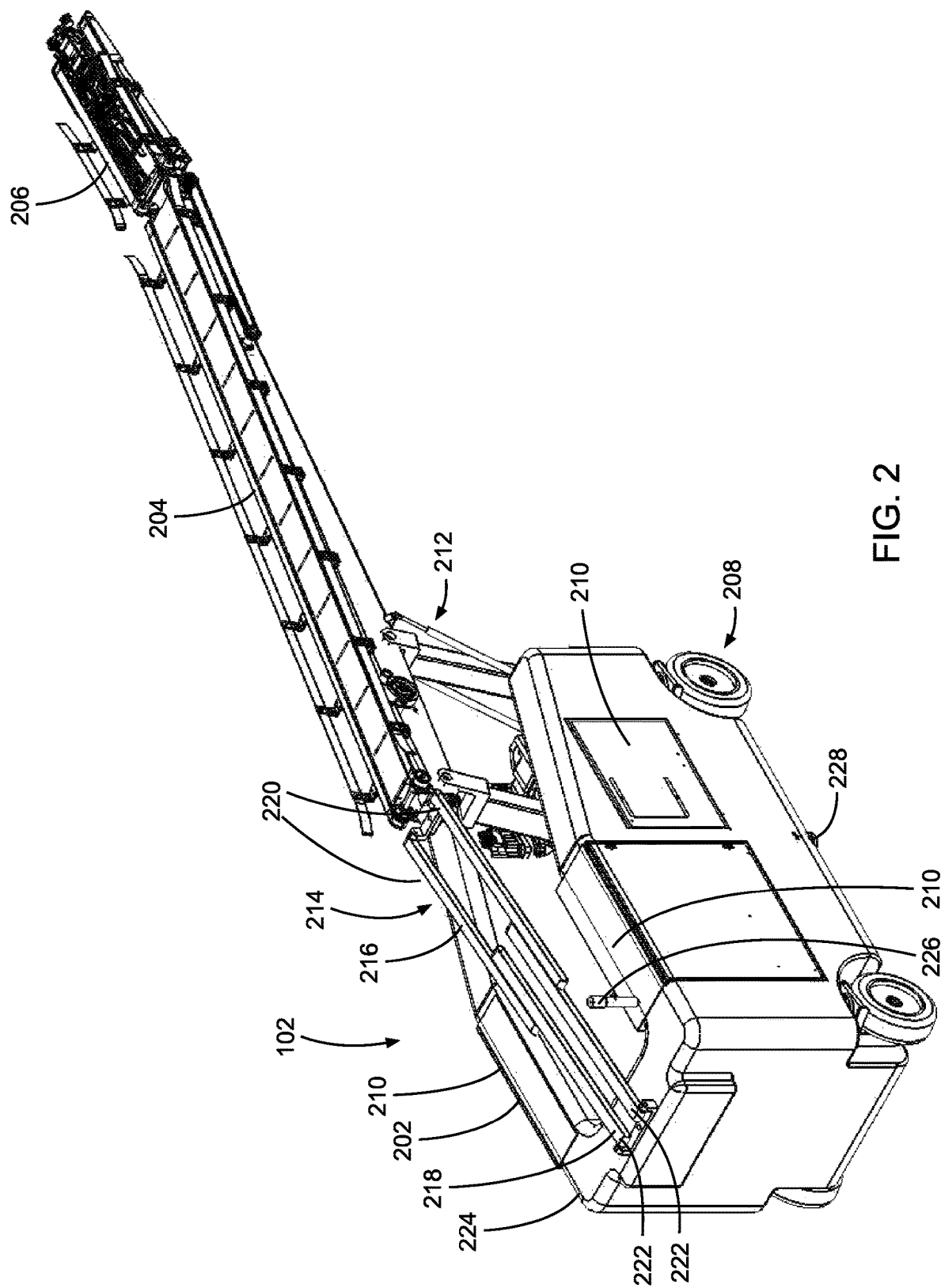
FIG. 2 is a rear perspective view of an automated unloading and loading robot used in the FIG. 1 system.
Figure 3:
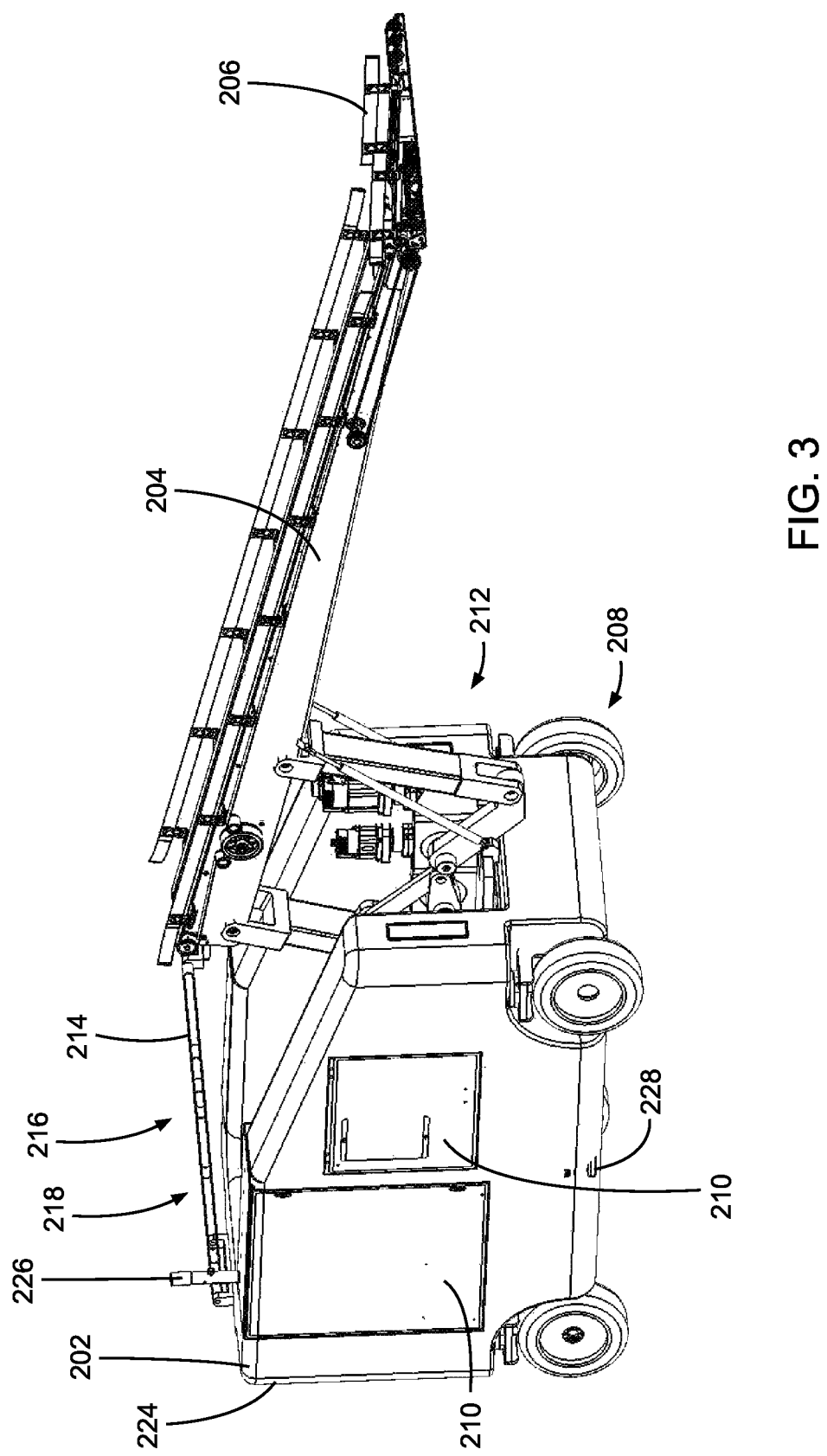
FIG. 3 is a front perspective view of the FIG. 2 robot.

FIGS. 2 and 3 respectively show rear and front perspective views of the robot 102, and FIG. 4 shows a top view of the robot 102. As can be seen, the robot 102 includes a base unit 202, a mast 204 extending from the base unit 202, and an end of arm tool (EoAT) 206 extending from the mast 204. To move and manipulate the EoAT 206, the robot 102 has a series of joints (i.e., J1, J2, J3, J4, and J5) that provide a number of degrees of freedom of movement. The base unit 202 is generally configured to provide power, move, and control the general operation of the robot 102. The mast 204 is designed to position the EoAT 206 as well as provide a pathway for conveying the cargo items 110 between the base unit 202 and the EoAT 206. The EoAT 206 is configured to rapidly stack and unstack the cargo items 110 in the cargo carrier 108. The EoAT 206 has a low profile to make picking or placing cargo items 110 from the floor of the cargo carrier 108 or building 112 easier as well as in stacks of cargo items 110. The EoAT 206 is shaped so that the cargo item 110 only needs to be lifted 2 to 3 inches (about 5-8 cm) from the floor to be placed on the EoAT 206, but in other examples, the cargo items 110 can be lifted to lower or higher heights from the floor. For instance, the EoAT 206 in other examples can include a heavy duty version that is larger for lifting larger and/or heavier cargo items 110. This also allows cargo items 110 to be packed close to the top of the cargo carrier 108. In one example, the cargo items 110 only leave a 7 inch (about 18 cm) empty gap at the top of the cargo carrier 108. The robot 102 is configured to load and unload the cargo items 110 using a serpentine pattern at a high rate. In one form, the robot 102 is able to stack or unstack the cargo items 110 at an average rate of no more than one (1) cargo item 110 per every three (3) seconds.

As shown, the base unit 202 includes a transport system 208 that is configured to move the robot 102. The base unit 202 along with the rest of the robot 102 can be powered in any number of manners. In the illustrated example, the robot 102 is electrically powered by an external power source (e.g., power cable with a plug), but in other examples, the robot 102 can be self-powered and/or powered in other ways, such as through batteries, solar cells, pneumatically through pneumatic tanks, hydraulically through hydraulic lines, and the like. The base unit 202 further has one or more controllers 210 for controlling the operation of the robot 102 along with a mast actuator system 212 that is configured to move the mast 204. In one form, the controllers 210 include Programmable Logic Controllers (PLCs). The base unit 202 can include other components to enhance safety, such as lighting, safety scanners, as well as safety electronic (E) stop radiofrequency (RF) receivers. The base unit 202 also serves as a weighted counter balance to counterbalance the weight of the mast 204 and EoAT 206 as well any cargo items 110 thereon.

A base unit conveyor 214, which is located on the top of the base unit 202, conveys the cargo items 110 between the mast 204 and the extendable conveyor system 104. In the illustrated example, the base unit conveyor 214 includes a mast section 216 and a transition section 218 that are nested together so as to overlap. This overlap between the mast section 216 and the transition section 218 is able to compensate for the relative changes of distance between the end of the mast 204 and the end of the extendable conveyor 104 as the mast 204 moves. In the depicted example, the mast section 216 includes a pair of belt conveyors 220, and likewise, the transition section 218 includes a pair of belt conveyors 222. Looped ends of each of belts 220 of the mast section 216 are secured to the mast 204, and looped ends of the belts 220 for the transition section 218 are secured to the base unit 202. In the illustrated example, the belt conveyors 222 of the transition section 218 are positioned in between the belt conveyors 220 of the mast section 216, but in other examples, the respective positions of the belt conveyors 220, 222 can be reversed. This configuration provides stable support as the cargo items 110 transition between the mast 204 and the extendable conveyor system 104. The base unit 202 further includes a base unit housing 224 that covers and protects the various components of the base unit 202. A vent tube 226 extending from one of the controllers 210 circulates air for cooling the controllers 210. The base unit 202 further includes one or more safety scanners or sensors 228 that senses objects, individuals, and/or structures located around the robot 102. In one example, the safety scanners 228 are in the form of light curtains for sensing the relative location of the robot 102. For instance, the safety scanners 228 can sense when personnel get too close to the robot 102 such that operation of the robot 102 can cease or enter a safe operational mode. The safety scanners 228 can also sense the walls of the cargo carrier 108 so that the robot 102 is properly positioned within the cargo carrier 108.

Cargo containers 108 typically provide limited space in which the robot 102 is able to maneuver. The transport system 208 is configured to enhance the mobility of the base unit 202 so that the robot 102 is able to maneuver within the tight confines of cargo containers 108. FIG. 5 shows a bottom view of the robot with the base unit housing 224 removed. As can be seen, the transport system 208 includes a chassis or frame 502 and wheels 504 rotatably mounted to the frame 502. In the illustrated example, the transport system 208 includes four wheels 504, but in other examples, the transport system 208 can include more or less wheels 504. It is envisioned that other mechanisms for moving, such as magnetic levitation, pneumatic systems, and the like, can be used instead of wheels 504. As indicated by the double arrows, the wheels 504 are able to rotate or pivot to a great degree relative to the frame 502 in order to enhance mobility of the robot 102. In one form, the wheels 504 are able to pivot to at least ninety-degree (90°) angles (perpendicular) relative to the longitudinal axis 506 of the robot 102, and in other variations, the wheels 504 have three-hundred-sixty (360°) mobility.

Figure 6:
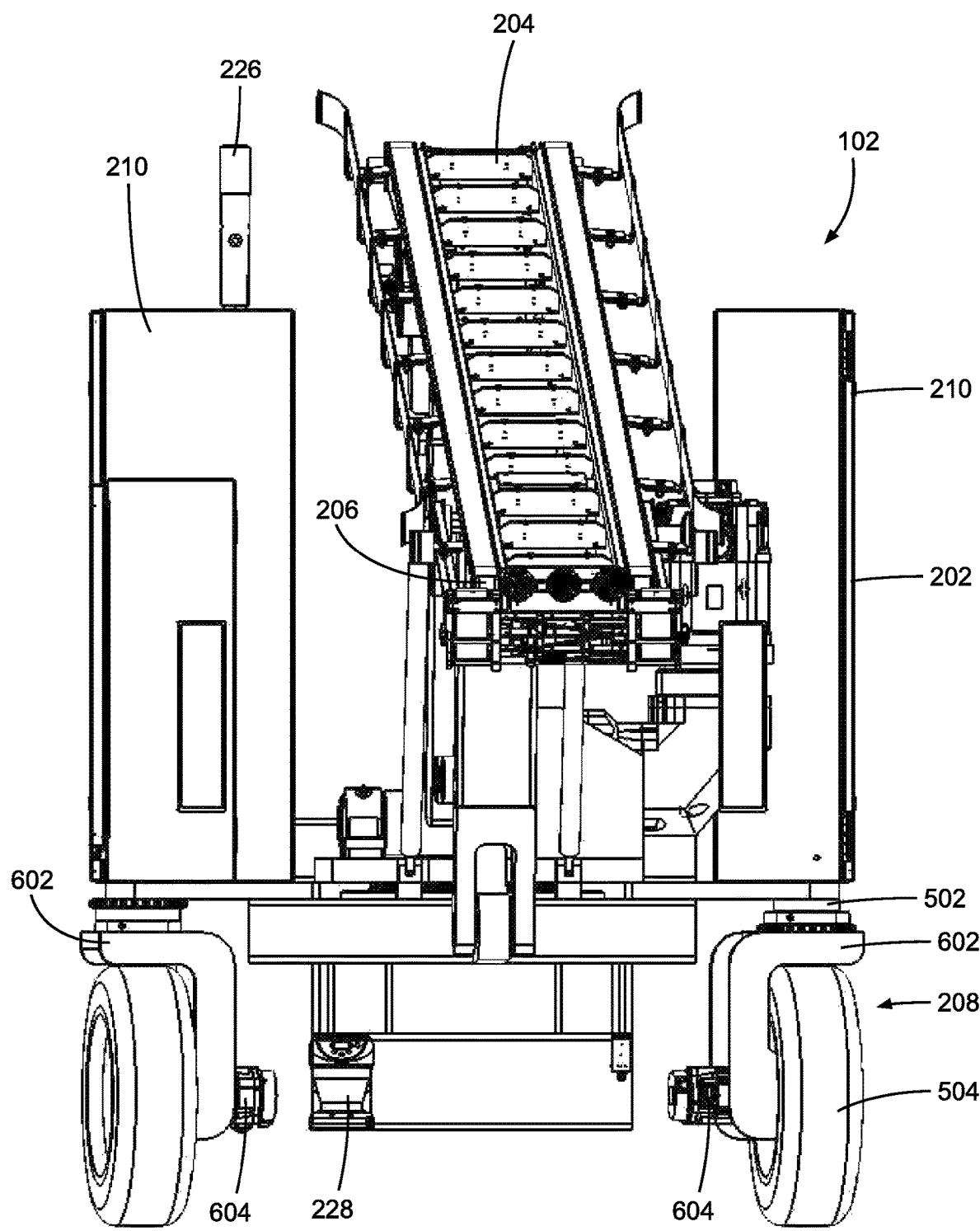
FIG. 6 is a front view of the FIG. 2 robot without the housing.
Figure 7:
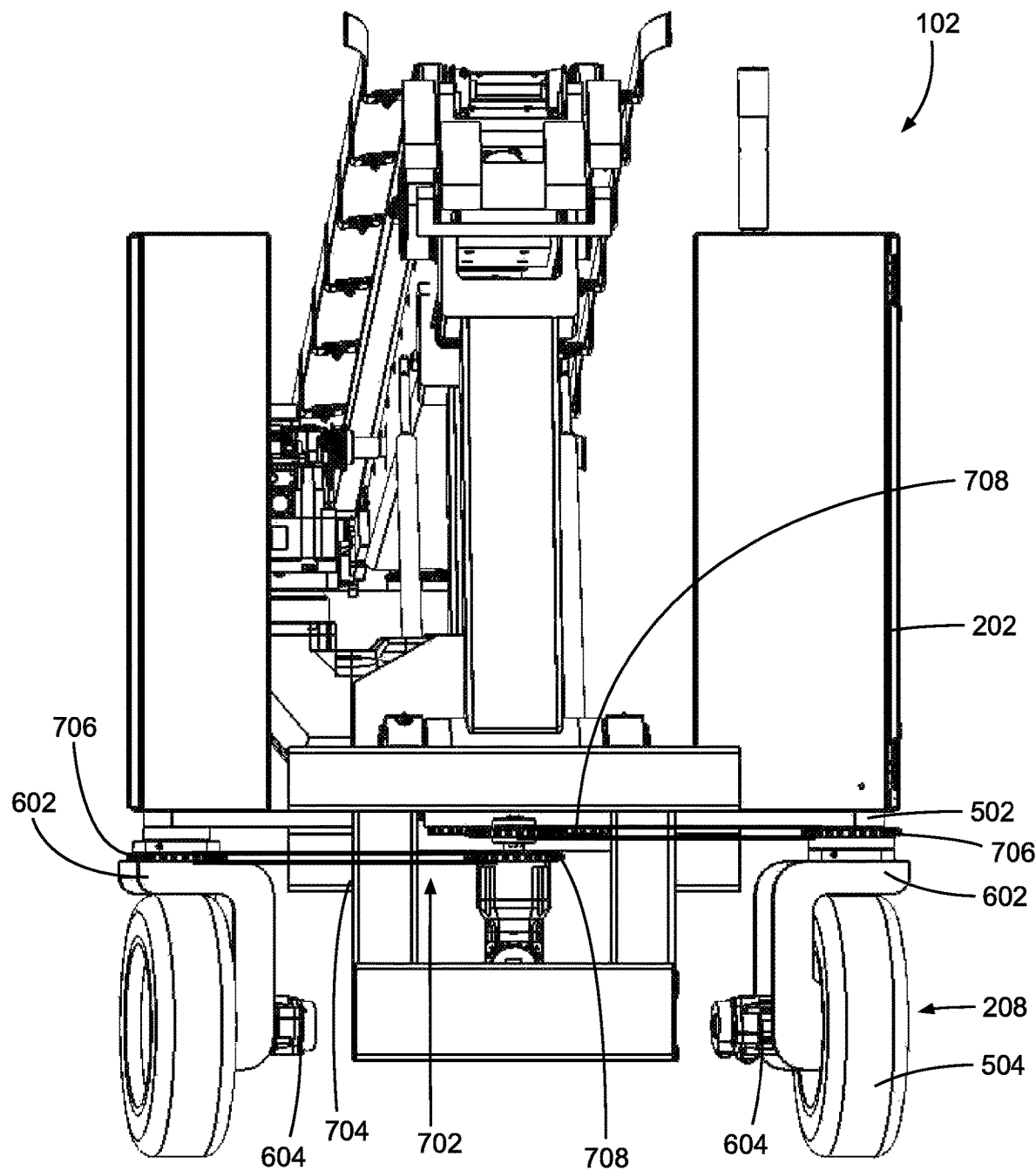
FIG. 7 is a rear view of the FIG. 2 robot without the housing.
Figure 8:
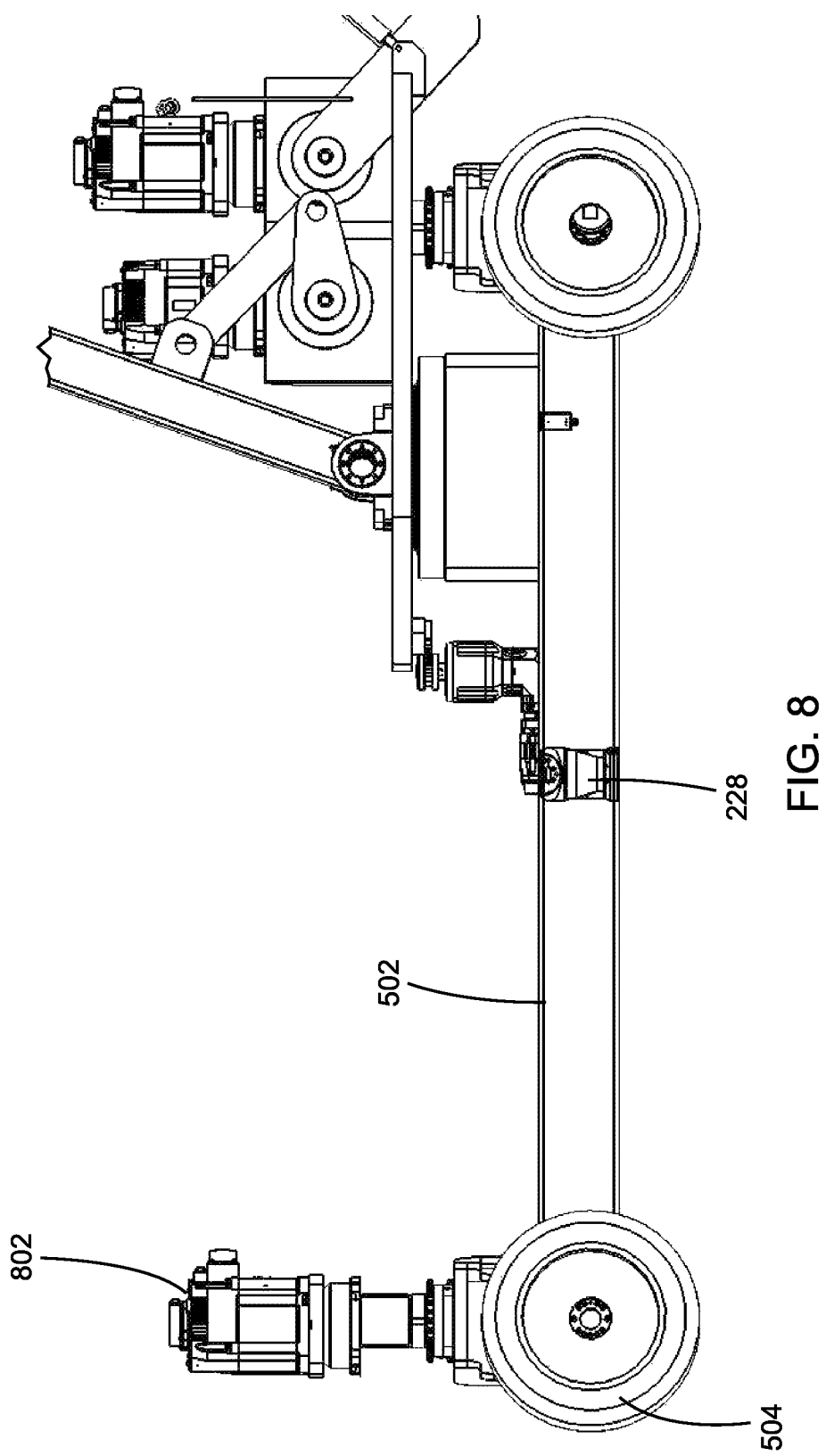
FIG. 8 is an enlarged side partial cross-sectional view of the FIG. 2 robot.

FIGS. 6 and 7 respectively illustrate front and back views of the robot 102 with selected components, such as the base unit housing 224, removed to enhance visibility. As can be seen, each wheel 504 has a wheel bracket 602 pivotally mounted to the frame 502 to facilitate steering of the robot 102. Each wheel 504 in the illustrated example further includes a wheel motor 604 that is mounted to the wheel bracket 602 in order to drive the wheels 504. In one form, the wheel motor 604 is an electric motor, but in other examples, other types of motors, such as pneumatic and hydraulic type motors, can be used. Moreover, one or more of the wheels 504 can be unpowered such that the wheel 504 does not include the wheel motor 604. Referring now to FIGS. 7 and 8, the wheel brackets 602 are rotated relative to the frame 502 via a steering mechanism 702. In the illustrated example, the steering mechanism 702 includes one or more steering chains 704 looped around and engaging wheel bracket gears 706 and steering gear 708 in order to steer the wheels 504. In other examples, other types of structures can control the steering, such as rack-pinion designs and steering belts. Looking at FIG. 8, a steering motor 802, such as an electric and/or pneumatic motor, drives the steering gears 708. In one form, the shaft of the steering motor 802 is connected to the steering gears 708 directly, but in other forms, a gearbox or transmission can be used to indirectly couple the steering motor 802 to the steering gears 708. The robot 102 in one example can include a single steering motor 802 that controls all of the wheels 504, and in the illustrated example, the robot 102 includes a steering motor 802 at each end so as to separately control the front and back wheels 504. In other variations, each wheel 504 can be independently steered and controlled. Once more, this overall design of the transport system 208 allows the robot 102 to make extremely tight turns.

Figure 9:
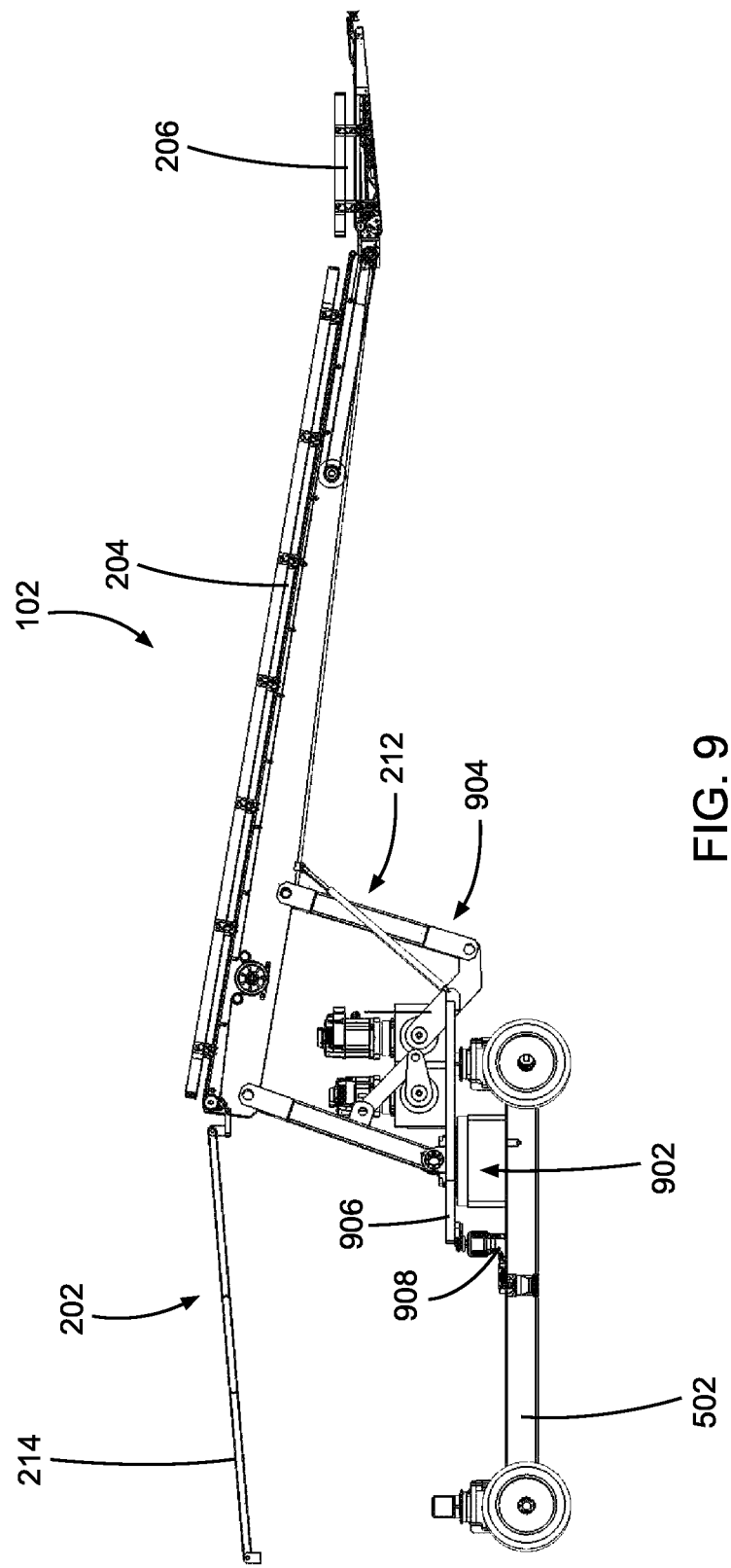
FIG. 9 is a side view of the FIG. 2 robot without selected components.
Figure 10:
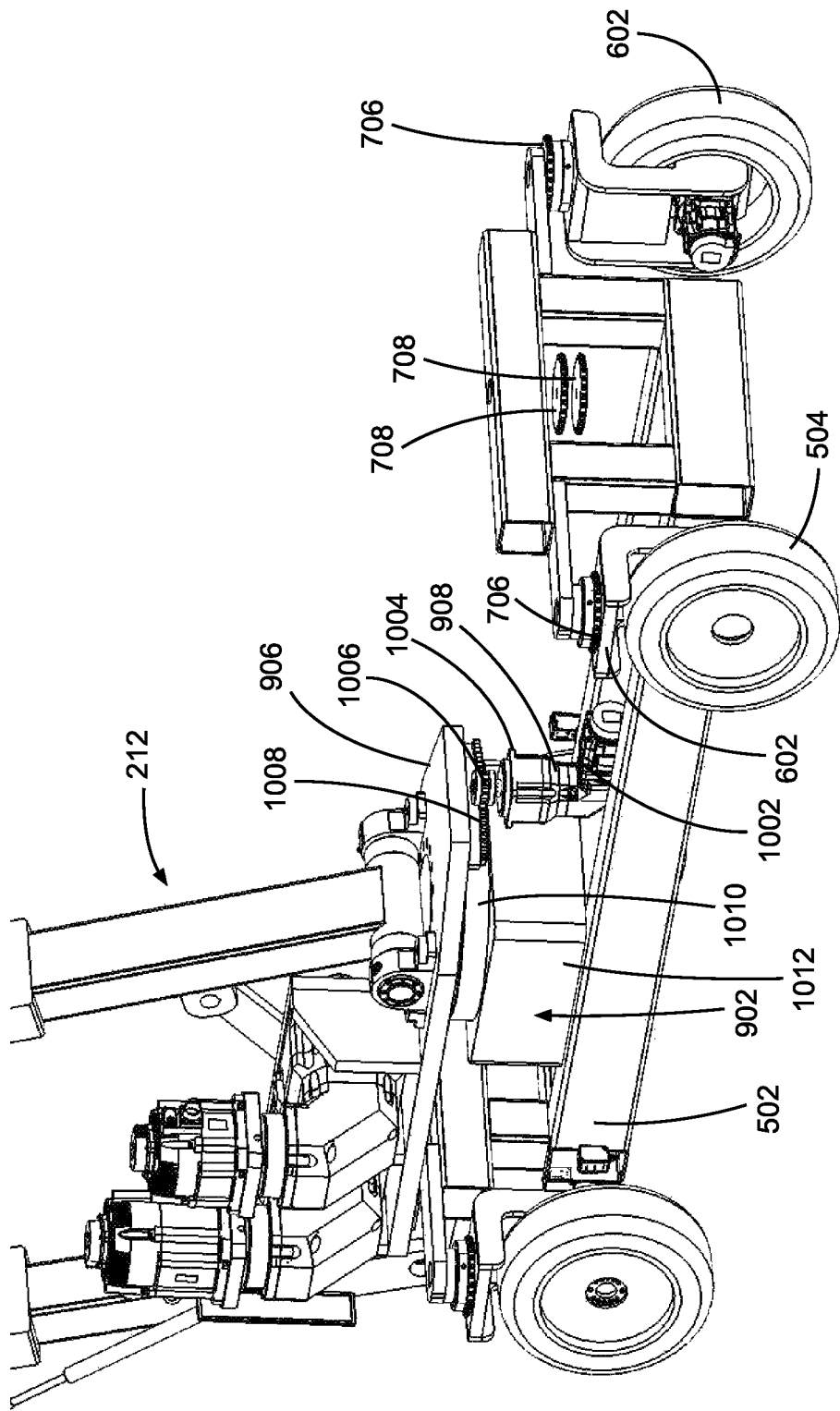
FIG. 10 is an enlarged rear perspective view of the FIG. 2 robot shown in FIG. 9.
Figure 11:
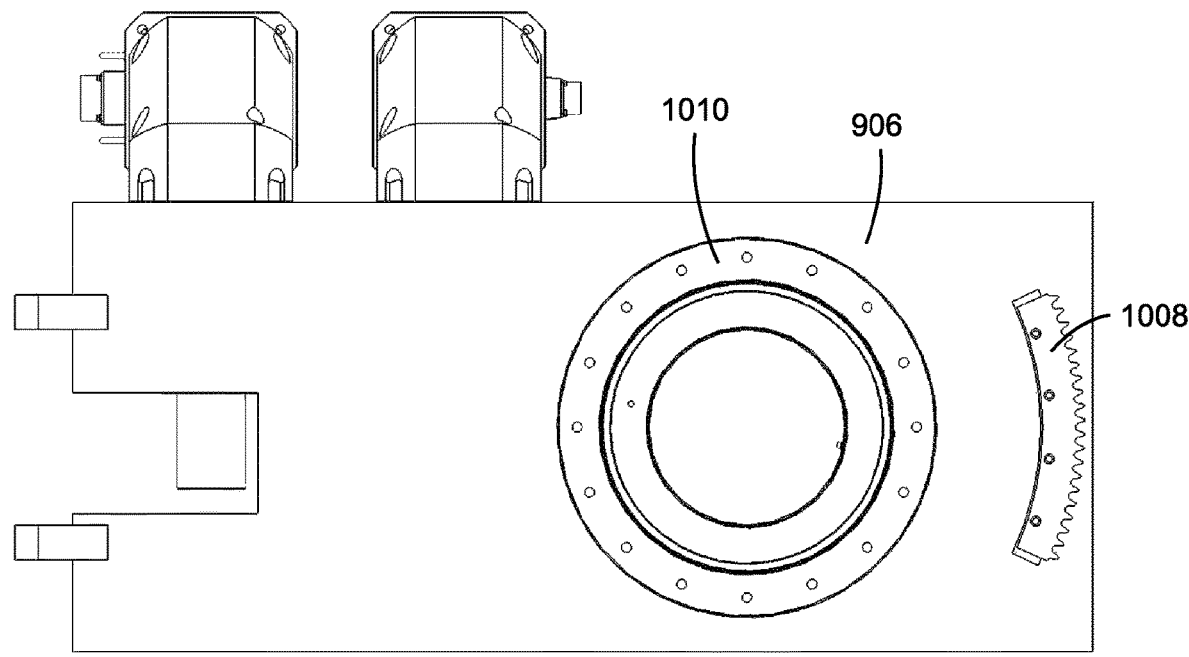
FIG. 11 is a bottom view of a mast base found in the FIG. 2 robot.

Turning to FIG. 9, which shows a side view of the robot 102 with selected components removed to aid visibility, the mast actuator system 212 is configured to control the yaw (i.e., horizontal, or side-to-side) and pitch (i.e., vertical, or up and down tilt) orientations of the mast 204 along with the EoAT 206. Specifically, the mast actuator system 212 can be subdivided into a mast yaw control subsystem 902 that controls the yaw of the mast 204 (e.g., acts as a J1 joint) and a mast pitch control subsystem 904 that controls the pitch of the mast 204 as well as the extension and retraction of the mast 204 along the longitudinal axis 506 (J2 and J3 joints). The mast yaw control subsystem 902 includes a mast base 906 that is rotatably mounted to the frame 502 and a mast yaw drive 908 that is configured to rotate the mast base 906 relative to the frame 502. As can be seen, the mast base 906 supports the mast 204 and the components of the mast pitch control subsystem 904. Looking at FIGS. 10 and 11, the mast yaw drive 908 includes a mast yaw drive motor 1002 with a mast yaw drive gearbox 1004 that is mounted to the frame 502. The mast yaw drive gearbox 1004 has a pinion gear 1006 that engages a rack 1008 attached to the mast base 906. As depicted, the rack 1008 has a semicircular shape so as to facilitate rotation of the mast base 906. The mast yaw drive motor 1002 in one example is a reversible motor so that the pinion gear 1006 can be rotated in opposite directions. This in turn allows the mast 204 to be rotated in clockwise and counterclockwise directions. To facilitate smooth rotation, the mast base 906 has a bearing or slew ring 1010 mounted to a bearing block 1012 on the frame 502. The bearing ring 1010 includes bearings to reduce friction between the mast base 906 and the bearing block 1012. It should be recognized that other friction reducing structures or techniques, such as lubricants, special materials, magnetic bearings, and the like, can be alternatively or additionally used to reduce friction.

Figure 13:
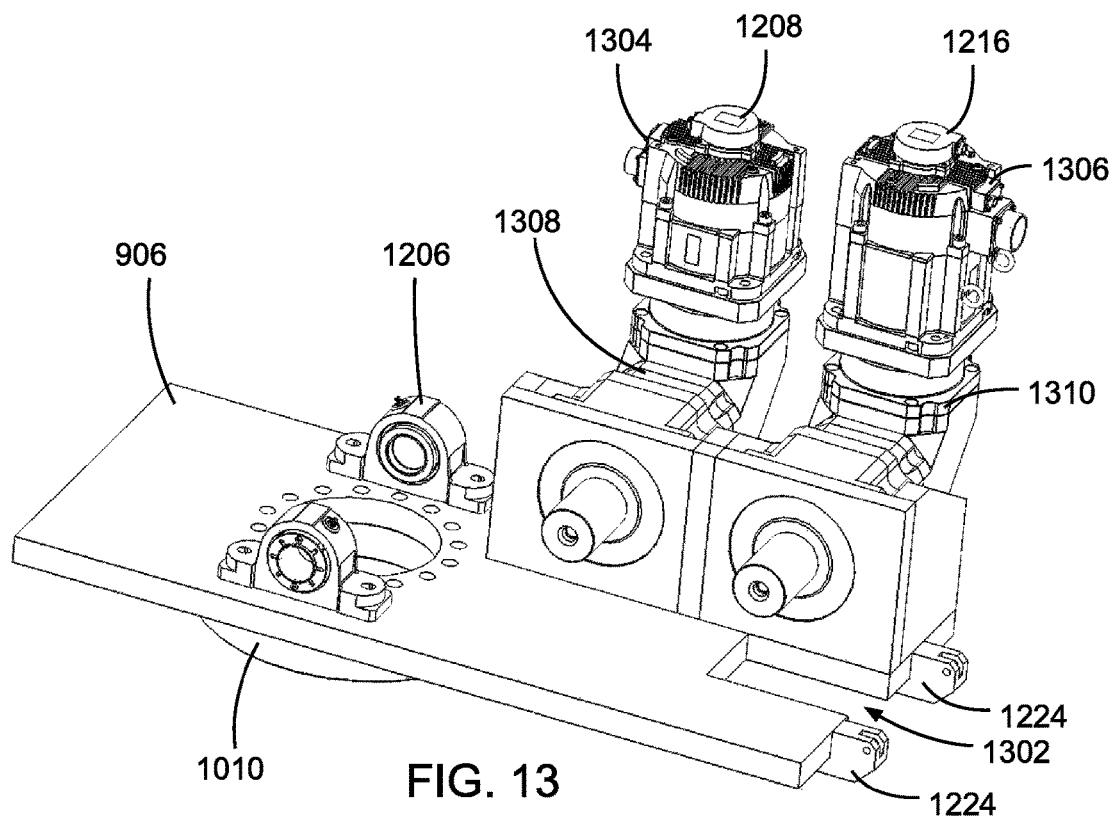
FIG. 13 is a perspective view of the FIG. 11 mast base and other associated components.
Figure 12:
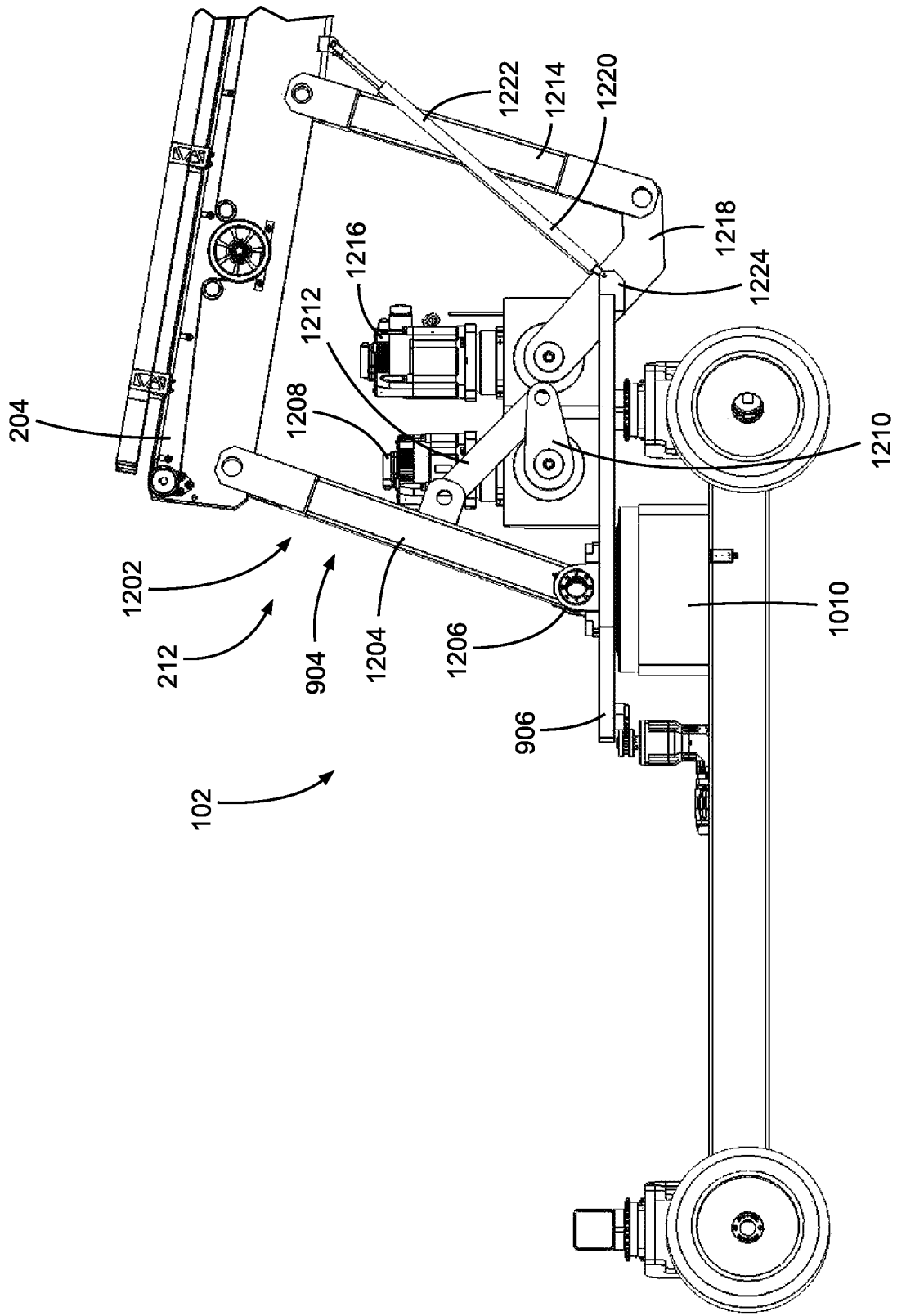
FIG. 12 is an enlarged side view of the FIG. 2 robot shown in FIG. 9.

Turning to FIGS. 12 and 13, the mast pitch-extension control subsystem 904 in the mast actuator system 212 include a series of linkages 1202 that connect the mast 204 to the mast base 906. The height of the mast 204 (relative to the floor) at a neutral, level position is set so that the EoAT 206 is positioned at or near the middle of an average stack height of cargo items 110 in the cargo carrier 108. Having the EoAT 206 centered in the middle location reduces the overall travel time and distance for the mast 204 and EoAT 206 as well as reduces cantilevered loading on the base unit 202. With the mast 204 mast being relatively long and being normally positioned in the middle of the stack, the mast has a maximum incline or pitch angle of at most 25 degrees (25°) and a maximum yaw (side-to-side) angle of at most 20 degrees (20°). This configuration provides a gradual slope and transition for the cargo items 110 being transported on the mast 204 and EoAT 206 which in turn reduces the risk of jamming and/or cargo items 110 from falling off the robot 102, even when the mast 204 and/or EoAT 206 is moved.

In the illustrated example, the mast pitch-extension control subsystem 904 includes a pair of rocker mechanisms for moving the mast 204. The rocker mechanisms are formed by the linkages 1202, and these linkages 1202 in part include a mast extension arm 1204 that is pivotally connected to the mast base 906 at one end via an extension arm coupling (or bearings) 1206 and pivotally connected to the mast 204 at the other end. As can be seen, the extension arm coupling 1206 is centered over the bearing ring 1010 so as to reduce the torque required to rotate the mast 204. In particular, the pivot point for the extension arm 1204 is centered over the bearing ring 1010 to reduce the movement of the end of the mast 204. This can also reduce the moment load on the bearing ring 1010 and reduce the torque required to rotate the mast 204. Pivotal movement of the mast extension arm 1204 causes the mast 204 along with the EoAT 206 to move horizontally in the longitudinal direction 506 of the robot 102. In other words, pivoting of the mast extension arm 1204 causes the EoAT 206 to extend or retract while the base unit 202 remains stationary, if so desired. To facilitate this, the mast actuator system 212 includes an extension drive 1208 with an extension crank 1210 that is connected to the mast extension arm 1204 via an extension link 1212. As the extension drive 1208 rotates the extension crank 1210, the mast extension arm 1204 pivots about the extension arm coupling 1206. For instance, when the extension crank 1210 is rotated in the counterclockwise direction (as viewed in FIG. 12), the mast 204 is retracted which in turn retracts the EoAT 206. Conversely, when the extension drive 1208 rotates the extension crank 1210 in a clockwise direction, the EoAT 206 is extended in the longitudinal direction 506.

This ability to extend and retract the mast 204 in the longitudinal direction 506 allows the base unit 202 to remain generally stationary as the pitch and/or the yaw of the mast 204 is changed. If left uncompensated, the EoAT 206 would not be able to reach all of the cargo items 110 within a row or stack of the cargo items 110 because of arc-shaped pivoting movement of the EoAT 206. By being able to extend and retract the EoAT 206 with the mast 204, the mast extension arm 1204 ensures that the EoAT 206 is properly positioned to stack and/or unstack the cargo items 110 when the pitch and/or yaw of the mast 204 is changed by the mast actuator system 212. In certain situations, the robot 102 is able to stack or unstack multiple rows of cargo items 110 without having to move the base unit 202 with the transport system 208.

With continued reference to FIGS. 12 and 13, a mast pitch arm 1214 is used to control the pitch or vertical movement of the mast 204. A pitch drive 1216 is operatively connected to the mast pitch arm 1214 via a pitch crank 1218. As shown, the pitch crank 1218 has a bent, hockey stick shape. The pitch drive 1216 is able to control the pitch of the mast 204 via the pitch crank 1218 and mast pitch arm 1214. This in turn allows the pitch drive 1216 to control the vertical location of the EoAT 206. In the illustrated example, as the pitch crank 1218 is moved in a counterclockwise direction (as viewed in FIG. 12), the mast 204 is pitched in an upwards direction such that the EoAT 206 moves upwards. When the pitch crank 1218 is moved in a clockwise direction, the mast 204 is pitched in a downwards direction such that the EoAT moves downwards. As noted before, the extension drive 1208 via the mast extension arm 1204 typically, but not always, works in conjunction with the pitch drive 1216 to ensure that the EoAT 206 is properly positioned so as to still be able to engage with the cargo items 110 as the pitch of the mast 204 changes. To reduce the cantilevered loading of the mast 204 on the pitch drive 1216, the mast actuator system 212 includes a mast counterbalance system 1220. In one form, the mast counterbalance system 1220 includes one or more air springs 1222 that are coupled between the mast 204 and the mast base 906. As shown, the mast base 906 includes an air spring connector 1224 to which the air spring 1222 is pivotally connected. In the illustrated example, the mast counterbalance system 1220 includes a pair of the air springs 1222, but more or less can be used in other examples. Moreover, other types of counterbalance systems 1220 can be used. For example, as will be explained below with reference to FIG. 49, a counterweight can be used to help balance or compensate for the weight of the mast 204 as well as the EoAT 206 and any cargo items 110 thereon.

Turning to FIG. 13, the mast base 906 defines a crank notch 1302 in order to provide a clearance for the pitch crank 1218. The extension drive 1208 and the pitch drive 1216 respectively include extension 1304 and pitch 1306 drive motors with gearboxes 1308, 1310. In the illustrated example, the drive motors 1304, 1306 are electric motors, but it should be appreciated that other types of motors, such as pneumatic and/or hydraulic motors, can be used. Moreover, it should be recognized that the mast pitch-extension control subsystem 904 can be configured differently in other examples. For example, hydraulic and/or pneumatic pistons can be used to position the mast 204.

Figure 14:
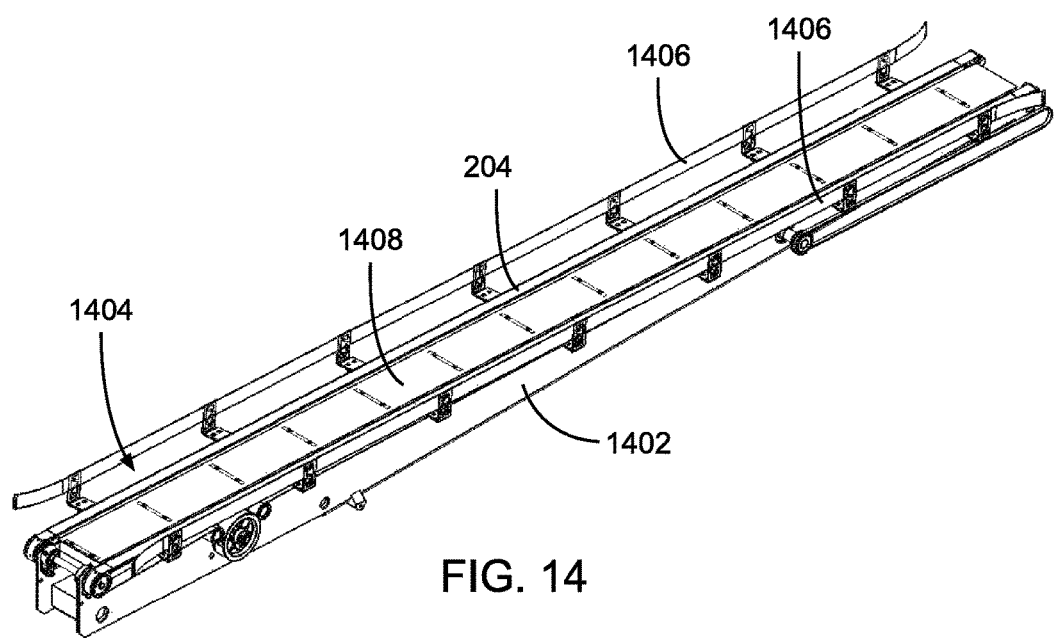
FIG. 14 is a rear perspective view of a mast found in the FIG. 2 robot.

FIG. 14 shows a rear perspective view of the mast 204. As shown, the mast 204 includes a mast support arm 1402, a mast conveyor 1404, one or more guide rails 1406, and a mast arm cover 1408. The mast support arm 1402 provide structural support for the components of the mast 204 as well as provides a structural connection between the base unit 202 and EoAT 206. The mast conveyor 1404 is configured to convey the cargo items 110 between the base unit 202 and EoAT 206. In the illustrated example, the mast 204 includes a pair of guide rails 1406 that are positioned on opposite sides of the mast conveyor 1404 to prevent the cargo items 110 from accidentally falling off of the mast 204 when transported.

Figure 15:
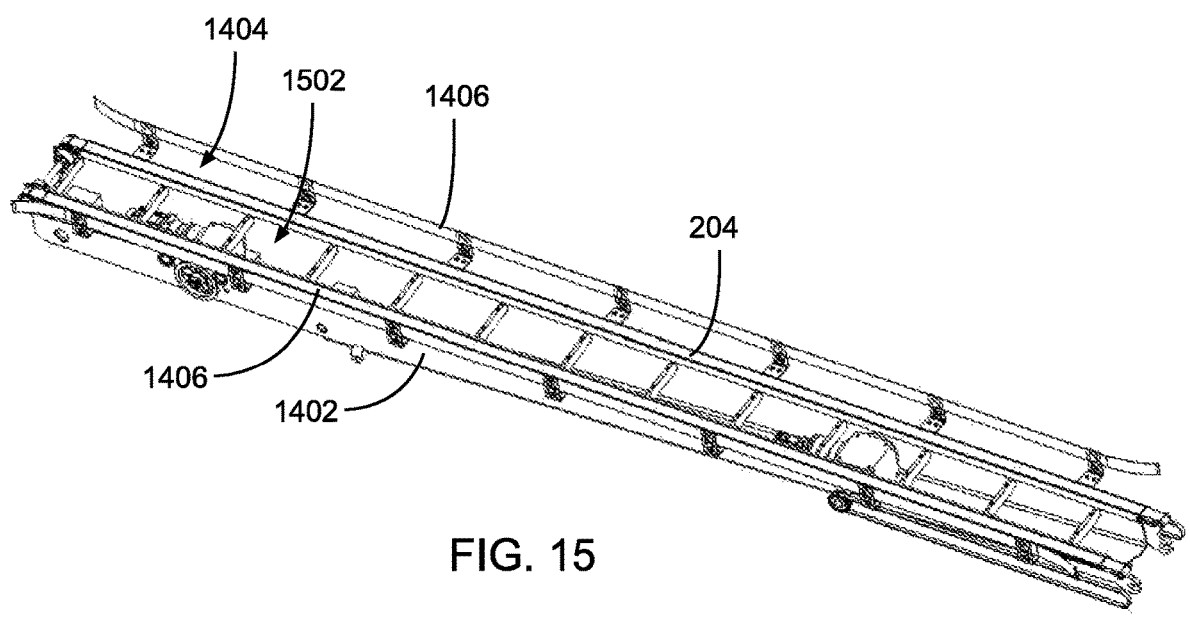
FIG. 15 is a top perspective view of the FIG. 14 mast.

FIG. 15 shows a front perspective view of the mast with the mast arm cover 1408 removed. As depicted, the mast support arm 1402 defines a mast channel 1502 that is covered by the mast arm cover 1408. In one example, the mast arm cover 1408 is made of Ultra-high-molecularweight polyethylene (UHMW), but the mast arm cover 1408 in other examples can be made of different materials. The mast arm cover 1408 prevents contaminants or other items from falling into the mast channel 1502 which in turn protects components contained within the mast channel 1502. The mast support arm 1402 has generally a U-shaped (or hat-shaped) cross-sectional shape. In one form, the mast support arm 1402 is an aluminum 6061 T6 hat channel type structural support such that the mast 204 is lightweight, but the mast support arm 1402 can be different in other examples. In addition to the components of the mast 204 housed inside the mast channel 1502 of the mast support arm 1402, the mast channel 1502 provides a conduit for housing power cabling, communication lines, air hosing, wiring, and other components for the EoAT 206.

Figure 16:
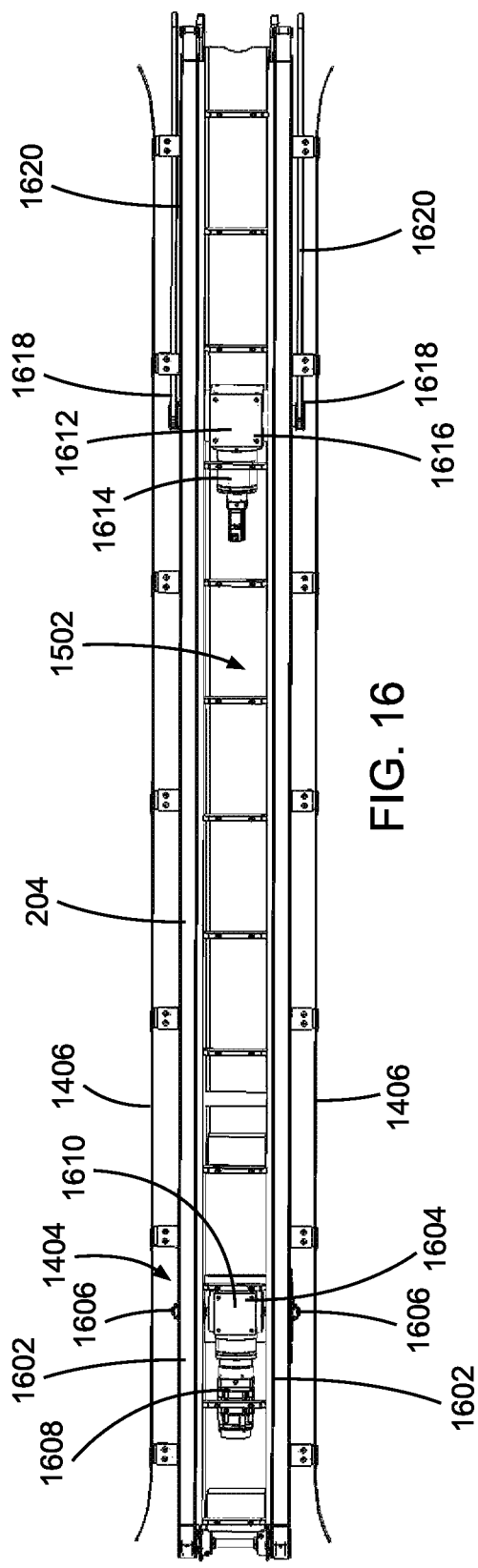
FIG. 16 is a top view of the FIG. 14 mast.
Figure 17:
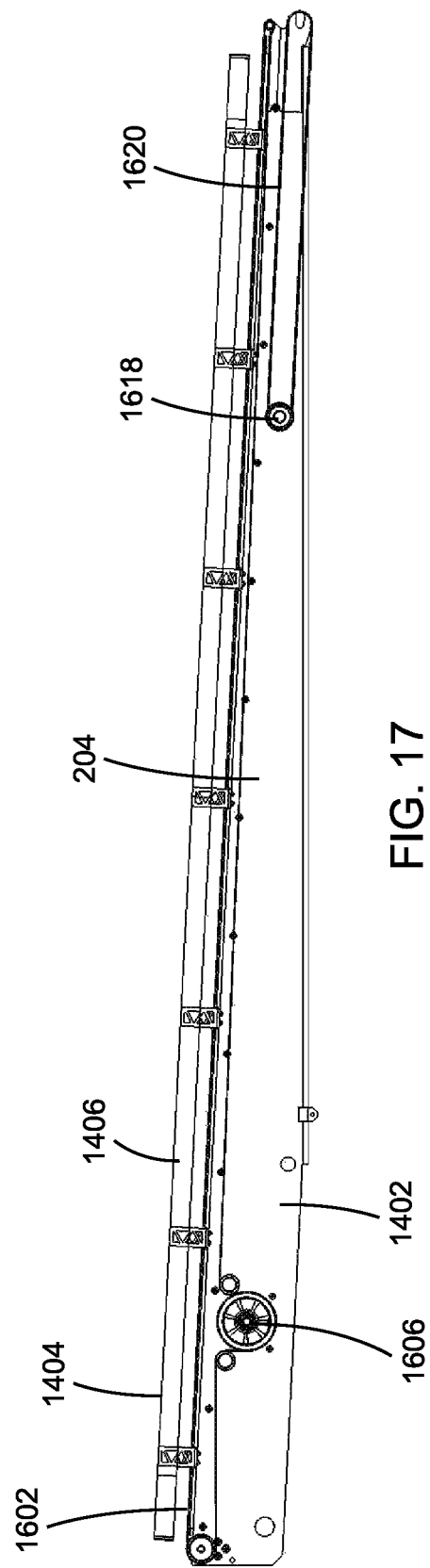
FIG. 17 is a side view of the FIG. 14 mast.

Referring now to FIGS. 16 and 17, the mast conveyor 1404 in the illustrated example includes a pair of belt conveyors 1602 in order to minimize weight, but it should be recognized that other types of conveyors can be used. Both belt conveyors 1602 are powered by a conveyor drive 1604 via conveyor drive pulley 1606. In the illustrated example, the conveyor drive 1604 includes a motor 1608, such as an electric motor or pneumatic motor, that is coupled to a gearbox 1610 that drives the conveyor drive pulleys 1606 on opposing sides of the mast support arm 1402. As can be seen, the conveyor drive 1604 is positioned closer to the base unit 202 as compared to the EoAT 206. Having the conveyor drive 1604, which is relatively heavy, positioned closer to the base unit 202 reduces the torque and resulting energy required to move the mast 204. As can be seen, the mast support arm 1402 is also tapered closer to the EoAT 206 so as to minimize weight closer to the EoAT 206 which in turn reduces the amount of power needed to move the mast 204. In other words, the design of the mast 204 significantly reduces the cantilevered loads of the robot 102 which in turn improves cycle time during use.

The mast channel 1502 at the end of the mast 204 near the EoAT 206 also houses an EoAT pitch or tilt drive 1612. The EoAT pitch drive 1612 is designed to control the pitch or tilt of the EoAT 206 relative to the mast 204. As shown, the EoAT pitch drive 1612 includes an EoAT pitch motor 1614 that is connected to an EoAT pitch gearbox 1616. Drive pulleys or sprockets 1618, which are connected to the driveshafts of the EoAT pitch gearbox 1616, are positioned on opposite sides of the mast support arm 1402 and are configured to power EoAT pitch drive belts 1620. In one form, the EoAT pitch motor 1614 includes a reversible motor so that the EoAT pitch drive belts are able to move in both directions to facilitate pitching of the EoAT 206 in either direction. It is contemplated that transmissions or other similar devices can be used to achieve the same result.

Figure 18:
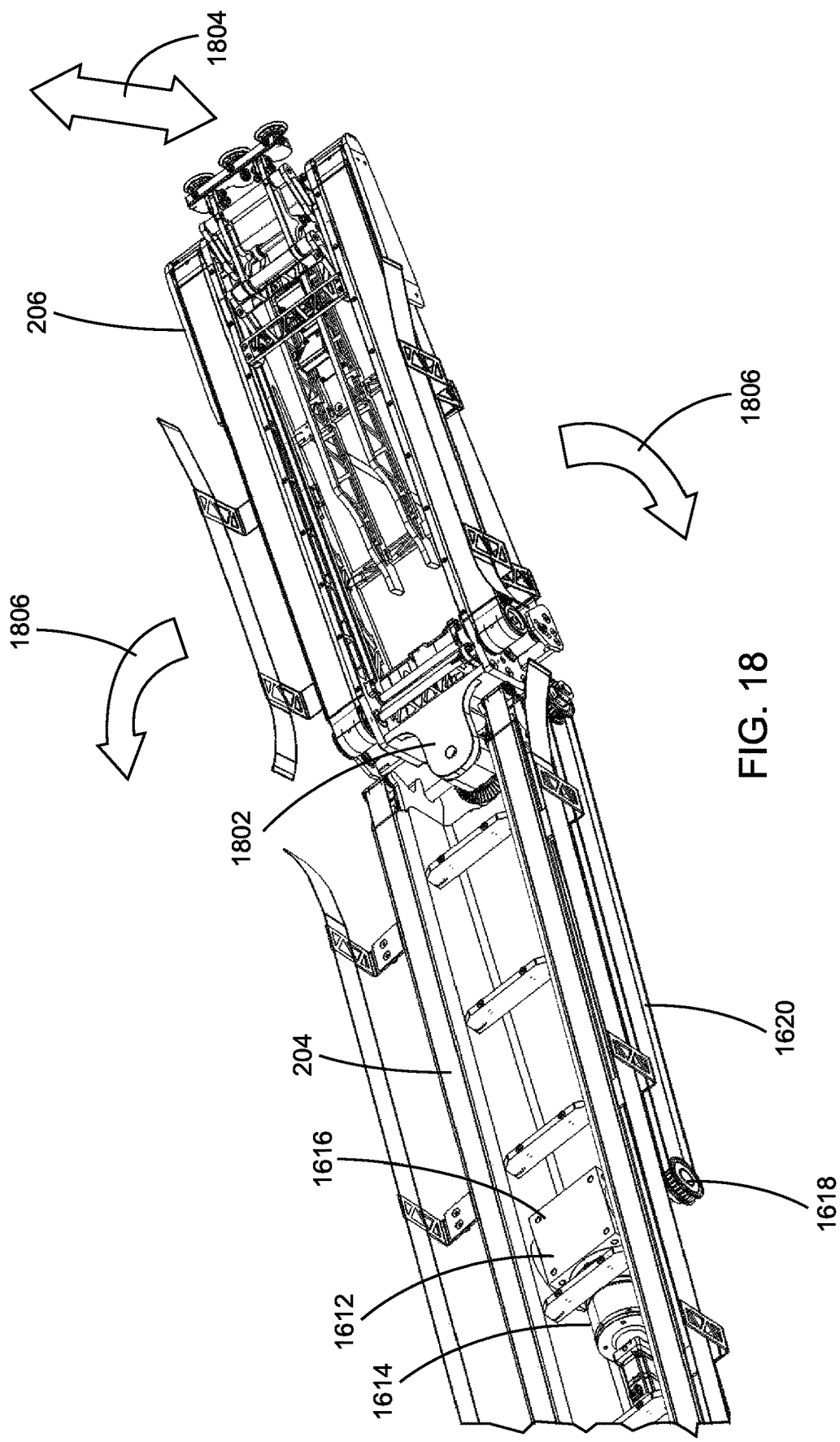
FIG. 18 is an enlarged perspective view of an actuator joint joining the FIG. 14 mast to an end of arm tool (EoAT) for the FIG. 2 robot.
Figure 19:
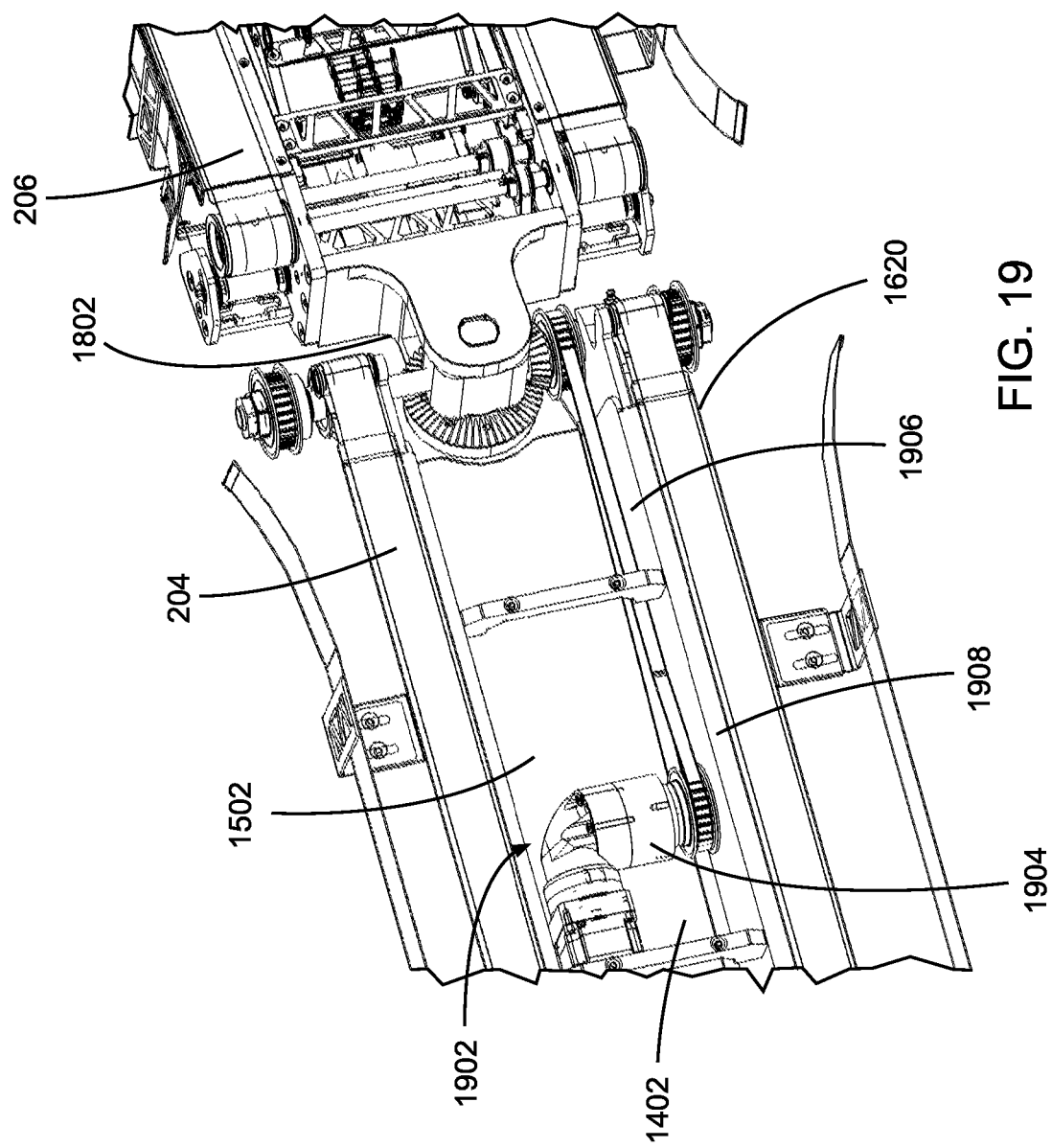
FIG. 19 is an enlarged perspective view of the area surrounding the FIG. 18 joint.

Turning to FIG. 18, an EoAT pitch-yaw actuator joint 1802 connects the mast 204 to the EoAT 206. The EoAT pitch-yaw actuator joint 1802 is configured to move the EoAT 206 in a pitch direction as indicated by double arrow 1804 and a yaw direction as indicated by arrows 1806. In other words, the EoAT pitch-yaw actuator joint 1802 acts as two joints, that is, the J4 and J5 joints for the robot 102. The EoAT pitch drive 1612 via the EoAT pitch drive belts 1620 moves EoAT 206 in the pitch direction 1804 (e.g., up and down) via the EoAT pitch-yaw actuator joint 1802. Looking at FIG. 19, the mast channel 1502 in the mast support arm 1402 houses an EoAT yaw drive 1902 that is configured to move the EoAT 206 in the yaw direction 1806 (e.g., side-to-side). The EoAT yaw drive 1902 includes an EoAT yaw motor (and/or gearbox) 1904, such as in the form of an electric or pneumatic motor, that powers a yaw drive belt 1906 via a drive gear or pulley 1908. The yaw drive belt 1906 in turn powers the EoAT pitch-yaw actuator joint 1802 to move the EoAT 206 in the yaw direction 1806. In one form, the EoAT yaw motor 1904 is a reversible type motor such that the belt 1906 can move in both directions so as to move the EoAT 206 in both yaw directions 1806. In other examples, a transmission or other similar device can be used to achieve the same result.

Figure 20:
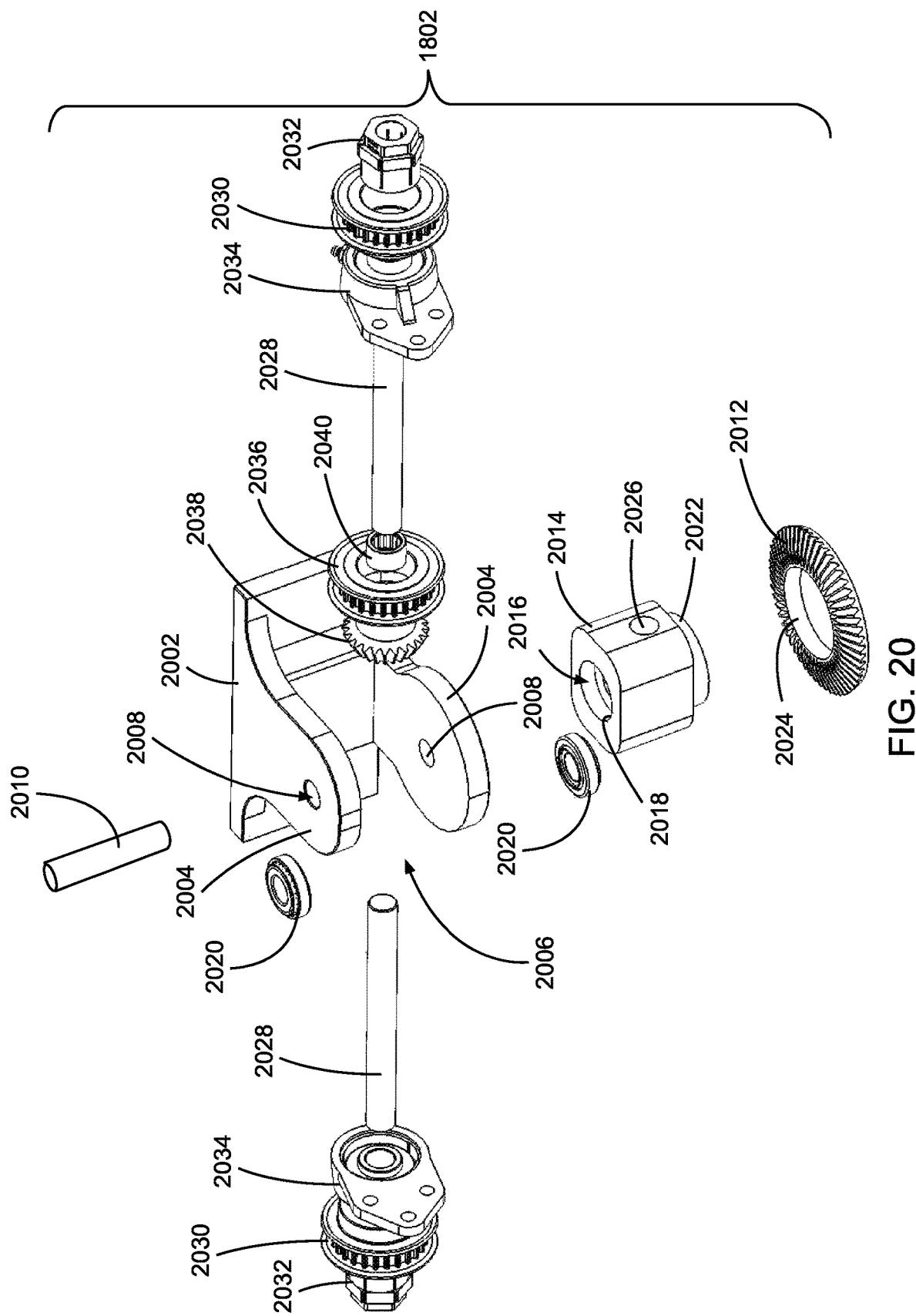
FIG. 20 is an exploded view of the FIG. 18 joint.
Figure 21:
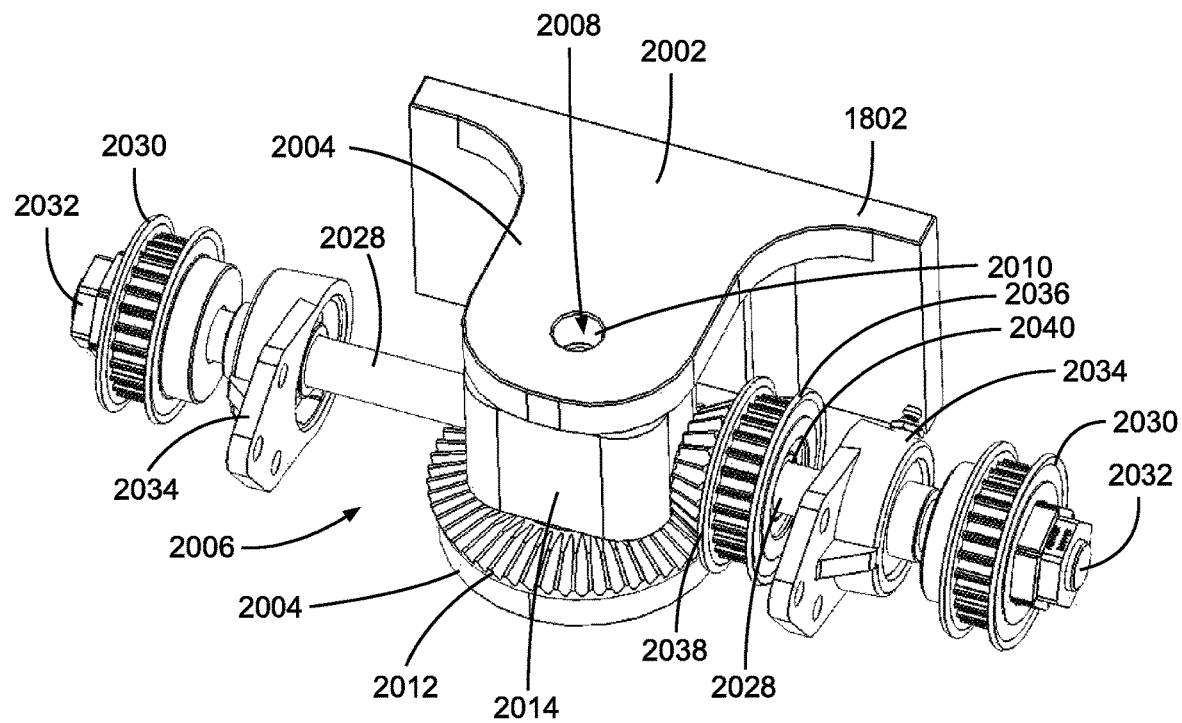
FIG. 21 is a perspective view of the FIG. 18 joint.
Figure 22:
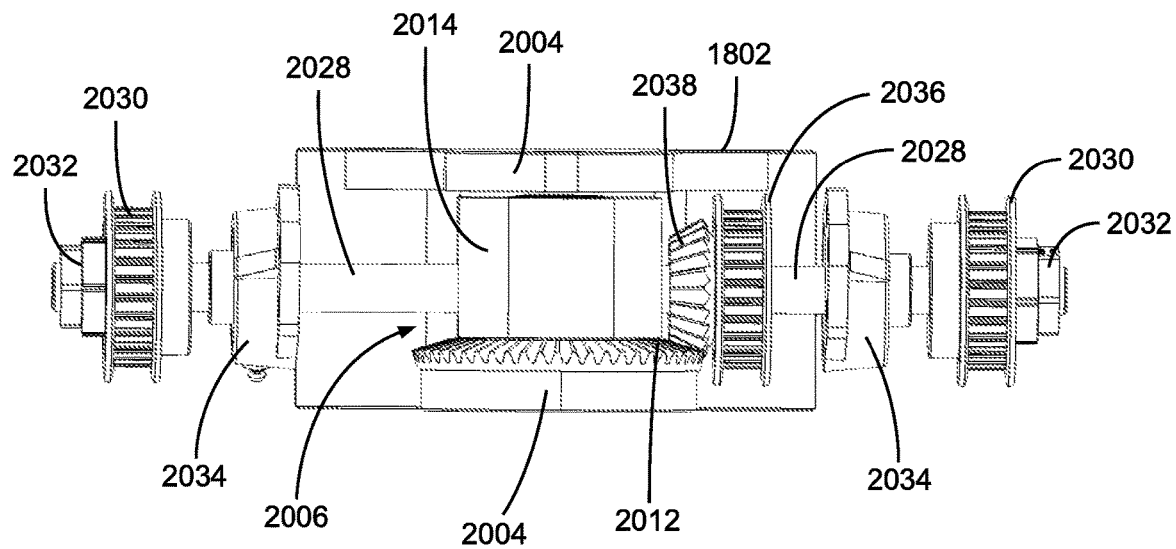
FIG. 22 is a front view of the FIG. 18 joint.

FIGS. 20, 21, and 22 respectively show exploded, enlarged perspective, and front end views of the EoAT pitch-yaw actuator joint 1802. As shown, the EoAT pitch-yaw actuator joint 1802 includes an EoAT bracket 2002 that is configured to mount to the end of the EoAT 206. The EoAT bracket 2002 has a pair of opposing bracket flanges 2004 that define a bracket cavity 2006. The bracket flanges 2004 each define a yaw pivot pin opening or shaft channel 2008 in which a yaw pivot pin or shaft 2010 is received. A yaw rack gear 2012 is mounted at a fixed position to one of the bracket flanges 2004. In one example, the yaw rack gear 2012 is bolted to the bracket flanges 2004, but in other examples, the yaw rack gear 2012 can be secured at a fixed position on the bracket flange 2004 in other ways, such as via keying, welding, adhesives, etc. A pivot block 2014 is received in the bracket cavity 2006 between the bracket flanges 2004. The pivot block 2014 defines a pin or shaft opening 2016 through which the yaw pivot pin 2010 extends. At opposite ends of the pin opening 2016, the pivot block 2014 defines bearing cavity 2018 in which yaw bearing assemblies 2020 are received. The yaw bearing assemblies 2020 are received around the yaw pivot pin 2010 so as to reduce friction between the pivot block 2014 and the yaw pivot pin 2010. This in turn allows the pivot block 2014 to freely rotate about the yaw pivot pin 2010. At one end, the pivot block 2014 has a gear clearance member 2022 that is received in a yaw rack gear opening 2024 in the yaw rack gear 2012. This configuration allows the yaw rack gear 2012 to freely rotate around the pivot block 2014. When the yaw rack gear 2012 is driven, the EoAT bracket 2002 is able to rotate about the yaw pivot pin 2010 in the yaw direction 1806. The gear clearance member 2022 in the illustrated example is in the form of a cut back in the pivot block 2014, but clearance member 2022 can be configured differently in other examples.

On opposing sides, the pivot block 2014 further defines pitch driveshaft openings 2026 in which pitch driveshafts 2028 are secured in a fixed manner. In one example, the pitch driveshafts 2028 are welded in the pitch driveshaft openings 2026 of the pivot block 2014, but the pitch driveshaft 2028 can be secured to the pivot block 2014 in other manners. For instance, the pitch driveshafts 2028 can be integrally formed with the pivot block 2014. When the pitch driveshafts 2028 are rotated, the pivot block 2014 is likewise rotated which in turn causes the EoAT 206 to pitch or tilt in the pitch direction 1804. At the end opposite the pivot block 2014, the pitch driveshafts 2028 each have a pitch drive pulley 2030 with a pitch drive keyless bushing 2032 securing the pitch drive pulley 2030 to the pitch driveshaft 2028. The pitch drive pulleys 2030 are secured to the pitch driveshafts 2028 in a fixed manner (e.g., keyed) so that, as the pitch drive pulleys 2030 are rotated, the pitch driveshafts 2028 are able to rotate the pivot block 2014. It should be recognized that the pitch drive pulleys 2030 can be secured in other ways besides through the pitch drive keyless bushing 2032. For example, the pitch drive pulleys 2030 can be welded or integrally formed with the pitch driveshafts 2028 and/or keyed to a keyed bushing. Although two pitch drive pulleys 2030 are shown, it should be recognized that a single pitch drive pulley 2030 can be used or more than two pitch drive pulleys 2030 can be used. As shown, the pitch driveshafts 2028 extend through shaft bearing guides 2034 that facilitate smooth rotation of the pitch driveshafts 2028. The shaft bearing guides 2034 are secured to the walls of the mast support arm 1402 that are located on opposite sides of the mast channel 1502.

A yaw drive gear 2036 is coupled to a yaw pinion gear 2038 in a fixed manner (e.g., keyed). Both the yaw drive gear 2036 and the yaw pinion gear 2038 are rotatably coupled to one of the pitch driveshafts 2028 via a yaw bearing assembly 2040. With the yaw bearing assembly 2040, the yaw drive gear 2036 and the yaw pinion gear 2038 are able to rotate freely about the pitch driveshaft 2028. The teeth of the yaw pinion gear 2038 engage the teeth of the yaw rack gear 2012 in a bevel gear type arrangement. In the illustrated example, the yaw rack gear 2012 and the yaw pinion gear 2038 are in a bevel gear type arrangement, but these gears 2012, 2038 can be arranged differently in other examples. As the yaw drive gear 2036 is rotated, the yaw pinion gear 2038 causes the EoAT bracket 2002 to rotate in the yaw direction 1806 which in turn causes the EoAT 206 to move in a similar fashion.

Operation of the EoAT pitch-yaw actuator joint 1802 will now be described with reference to FIGS. 18-22. To move the EoAT 206 in the pitch direction 1804, the EoAT pitch drive 1612 drives the EoAT pitch drive belts 1620 which in turn drives the pitch drive pulleys 2030. As the pitch drive pulleys 2030 rotate, the pitch driveshaft 2028 cause the pivot block 2014 to pitch or pivot. The pitching of the pivot block 2014 causes the EoAT bracket 2002 to likewise pivot, thereby causing the EoAT 206 to pitch (i.e., tilt in the vertical direction). When the EoAT pitch drive 1612 drives the EoAT pitch drive belts 1620 in an opposite direction, the EoAT 206 pitches in the opposite pitch direction 1804. To move the EoAT 206 in the yaw direction 1806, the EoAT yaw drive 1902 drives the EoAT yaw drive belt 1906 which in turn drives the yaw drive gear 2036. Driving of the yaw drive gear 2036 causes the yaw pinion gear 2038 to rotate about the pitch driveshaft 2028. Rotation of the yaw pinion gear 2038 causes the yaw rack gear 2012 to rotate the EoAT bracket 2002. This in turn causes the EoAT 206 to move in the yaw direction 1806. When the EoAT yaw drive 1902 drives the EoAT yaw drive belt 1906 in the opposite direction, the EoAT 206 moves in the opposite yaw direction 1806.

Figure 23:
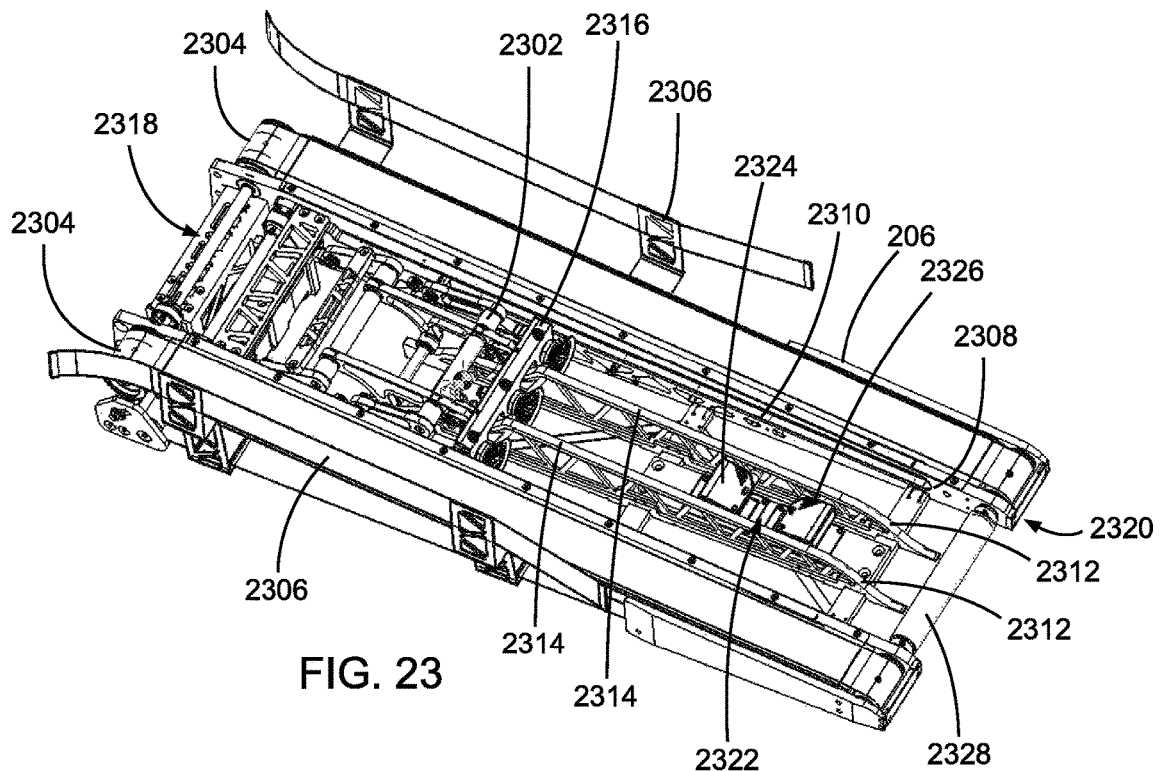
FIG. 23 is a top perspective view of FIG. 18 EoAT with a gripper mechanism in a retracted position.
Figure 24:
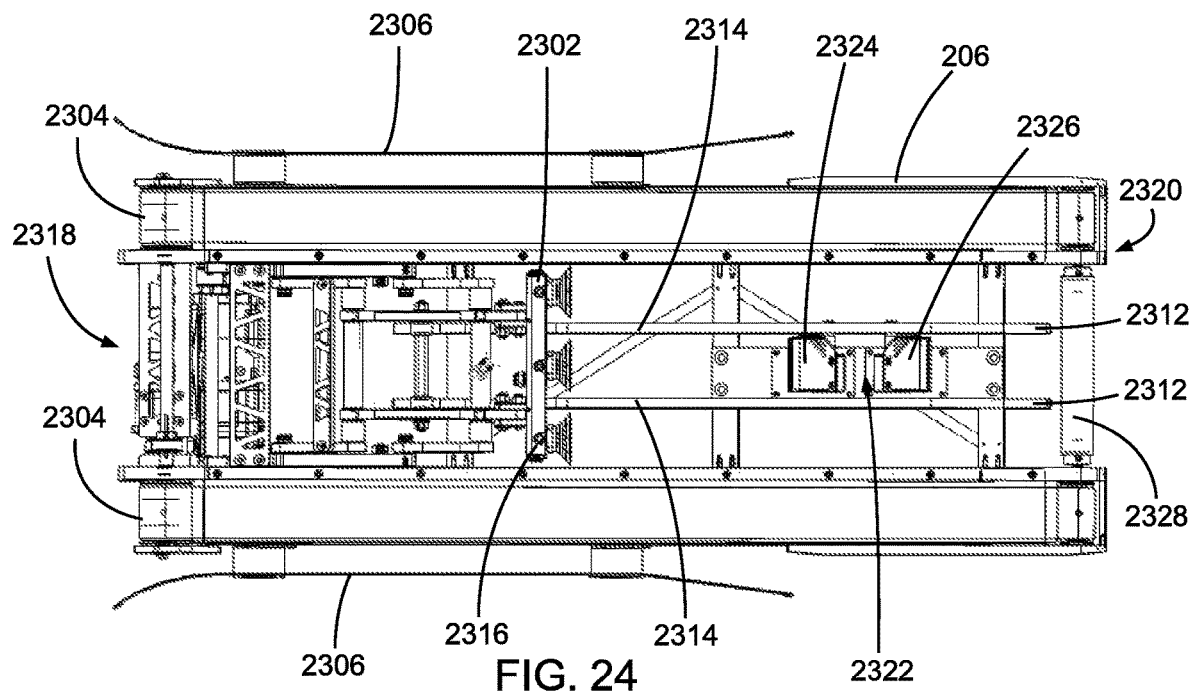
FIG. 24 is a top view of the FIG. 18 EoAT with the gripper mechanism in the retracted position.
Figure 25:
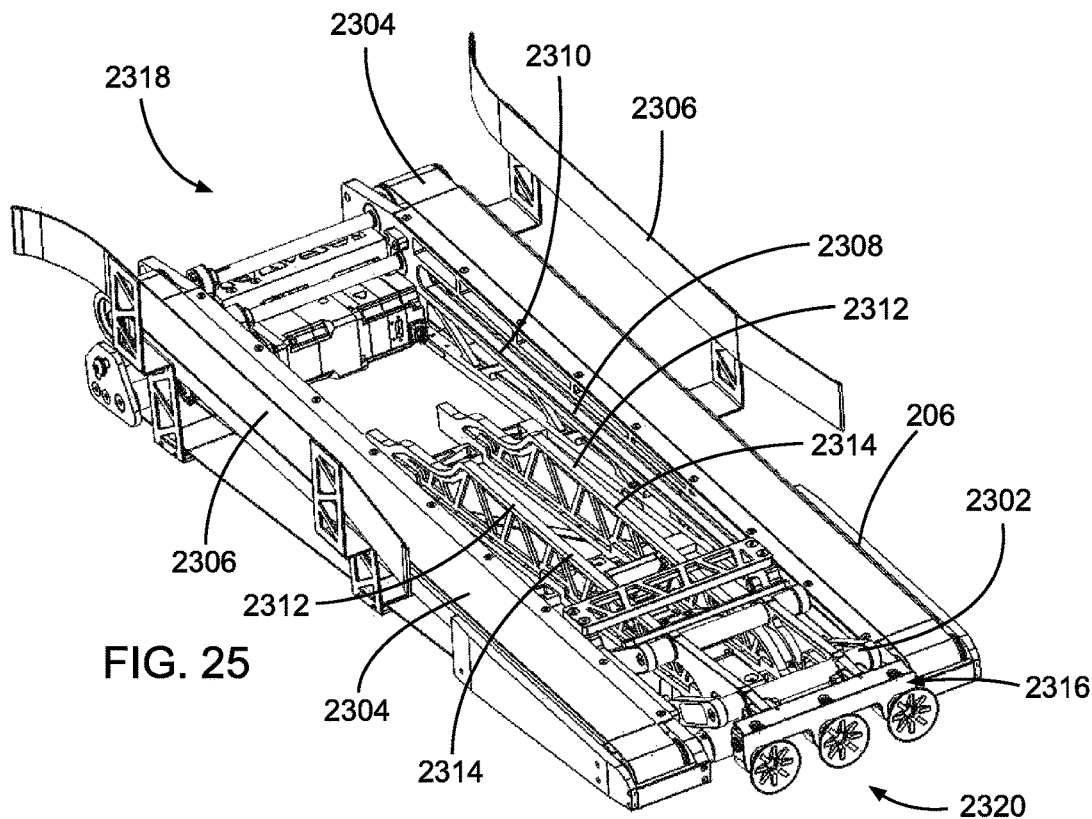
FIG. 25 is a front perspective view of the FIG. 18 EoAT with the gripper mechanism in an extended position.
Figure 26:
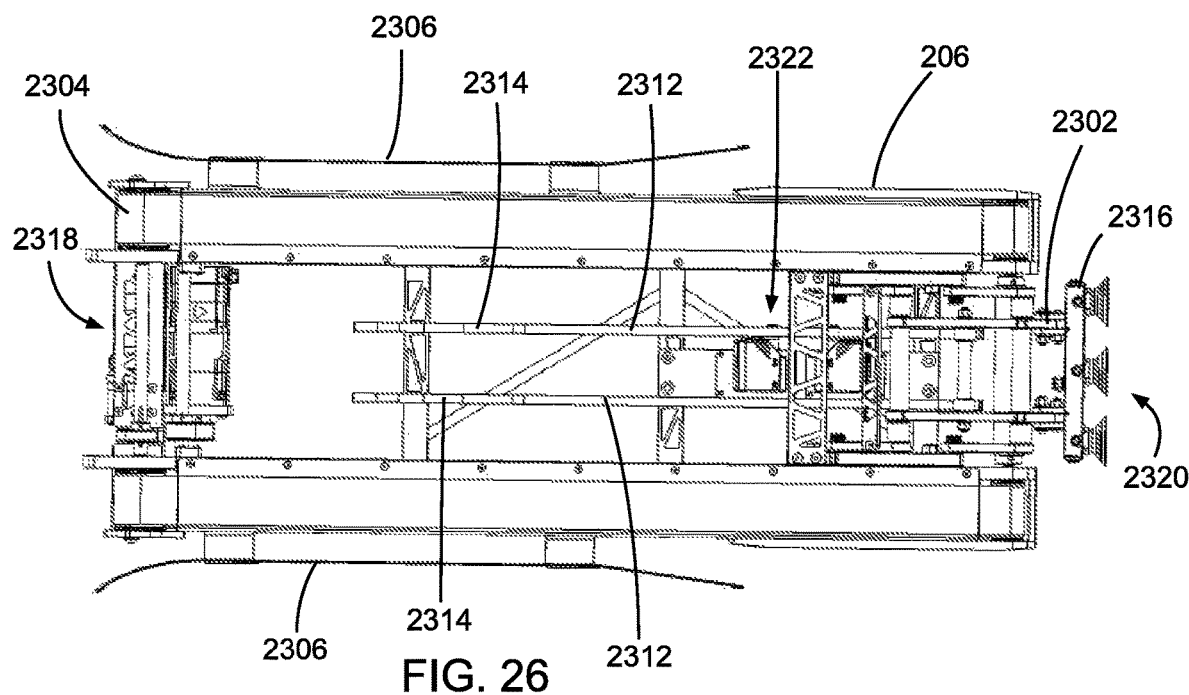
FIG. 26 is a top view of the FIG. 18 EoAT with the gripper mechanism in the extended position.

FIGS. 23 and 24 respectively illustrate front perspective and top views of the EoAT 206 with a gripper mechanism 2302 in a retracted position. FIGS. 25 and 26 respectively depict front perspective and top views of the EoAT 206 with the gripper mechanism 2302 in an extended position. The gripper mechanism 2302 is designed to grab the cargo items 110 and pull them onto the EoAT 206 when unloading the cargo items 110 from the cargo carrier 108 or elsewhere. The gripper mechanism 2302 is also configured to push or direct the cargo items 110 off of the EoAT 206 when loading or stacking the cargo items 110 in the cargo carrier 108 or elsewhere. The EoAT 206 further includes a conveyor system 2304 that is constructed to convey or move the cargo items 110 along the EoAT 206. The conveyor system 2304 facilitates loading and unloading cargo items 110 in a continuous or near continuous fashion. During unloading of the cargo items 110 from the cargo carrier 108, once the gripper mechanism 2302 pulls the cargo item 110 onto the conveyor system 2304, the conveyor system 2304 moves the cargo item 110 towards the mast 204 so that the cargo item 110 can be transferred to the mast conveyor 1404. When loading or stacking the cargo items 110 into the cargo carrier 108, the conveyor system 2304 moves the cargo items 110 from the mast 204 towards the end of the EoAT 206. As shown, the EoAT 206 further includes a pair of opposing guide rails 2306 that among other things prevent the cargo items 110 from falling off of the EoAT 206. The guide rails have a flared or hourglass shape which helps to direct cargo items 110 even when the cargo items are skewed on the conveyor system 2304. The flaring of the guide rails 2306 facing the mast 204 helps also with transitioning the cargo items 110 between the EoAT 206 and the mast 204 when the EoAT 206 is not directly aligned with the mast 204 (e.g., the EoAT 206 is at a yaw angle that is transverse to the mast 204). In essence, the guide rails 1406 on the mast 204 and the guide rails 2306 on the EoAT 206 form a dual-sided funnel so that any skewed cargo items 110 are properly aligned as the cargo items 110 travel on the robot 102. In one form, the guide rails 1406, 2306 are made of flexible steel, specifically spring steel, to allow for example the guide rails 1406, 2306 to flex when pressed against any walls, such as in the cargo carrier 108, and to spring back to its original shape afterwards.

Normally, but not always, the gripper mechanism 2302 is positioned in the retracted position as is depicted in FIGS. 23 and 24. When the gripper mechanism 2302 is in the retracted position, the gripper mechanism 2302 is positioned below the top surface of the conveyor belts for the conveyor system 2304 so that the cargo items 110 are able to be transported on the conveyor system 2304. In addition, the gripper mechanism 2302 is positioned in the retracted position sometimes during movement of the EoAT 206 so as to reduce cantilevered loading of the EoAT 206 which in turn improves the overall movement and speed of the robot 102. As can be seen, when in the retracted position, the gripper mechanism 2302 is positioned closer to the mast 204 so as to reduce the cantilevered loading. To grab or discharge a cargo item 110 from the EoAT 206, the gripper mechanism 2302 moves from the retracted position to the extended position, as is depicted in FIGS. 25 and 26. Looking at FIGS. 23 and 25, the EoAT 206 includes one or more drive tracks 2308 with guide slots 2310 for guiding the linear movement of the gripper mechanism 2302 between the extended and retracted positions. In the illustrated example, the EoAT 206 includes a pair of the drive tracks 2308 that forms part of the structural support or frame of the EoAT 206. In other examples, the EoAT 206 can include a single drive track 2308 or more than two drive tracks 2308. The EoAT 206 further includes one or more cam tracks 2312 with cam surfaces 2314 for guiding the vertical movement of a gripping or engagement section 2316 of the gripper mechanism 2302 as the gripper mechanism 2302 moves between the retracted and extended positions. In essence, the cam tracks 2312 in conjunction with the gripper mechanism 2302 form a linear cam for guiding the vertical movement profile of the gripping section 2316. As can be seen, the EoAT 206 has a mast facing end 2318 where the EoAT 206 is connected to the mast 204. Opposite the mast facing end 2318, the EoAT 206 has a cargo facing end 2320 where the cargo items 110 are loaded onto or unloaded from the EoAT 206. The gripper mechanism 2302 is positioned at the cargo facing end 2320 when in the extended position and is moved towards the mast facing end 2318 during retraction. In the illustrated example, the drive tracks 2308 and the cam tracks 2312 are illustrated as being separate components, but in other examples, the functionality of the drive tracks 2308 and cam tracks 2312 can be integrated together to form a single unit or track.

As will be explained in greater detail below, the gripping section 2316 is designed to grab the cargo item 110 and pull the cargo item 110 onto the conveyor system 2304. To accomplish this, the gripping section 2316 is raised above the conveyor system 2304 so that the gripping section 2316 is able to engage and pull the cargo item 110 fully onto the conveyor system 2304. To push the cargo items 110 from the conveyor system 2304, the gripping section 2316 is also raised. The cam surfaces 2314 on the cam tracks 2312 are contoured to adjust the vertical profile of the gripping section 2316 of the gripping mechanism 2302 during extension and retraction so that the gripping section 2316 can be raised above and lowered below the conveyor system 2304 at the appropriate time.

To sense whether or not cargo items 110 are on the EoAT 206 as well as the relative position of the cargo items 110, the EoAT 206 includes a cargo sensor system 2322. In the illustrated example, the cargo sensor system 2322 is positioned between the cam tracks 2312 near the cargo facing end 2320, but the cargo sensor system 2322 can be positioned elsewhere in other examples. The cargo sensor system 2322 in the depicted example includes a mast facing sensor 2324 that senses the presence and/or position of the cargo items 110 near the mast facing end 2318 and a cargo facing sensor 2326 that senses the presence and/or position of the cargo items near the cargo facing end 2320. In one form the sensors 2324, 2326 are photo-eye type sensors, but it should be appreciated that other types of sensors, such as proximity sensors, light curtains, lasers, and/or cameras, can be used. At the cargo facing end 2320, the EoAT 206 further includes a guide roller 2328 that is able to roll so as to assist in loading and unloading the cargo items 110 from the EoAT 206.

Figure 27:
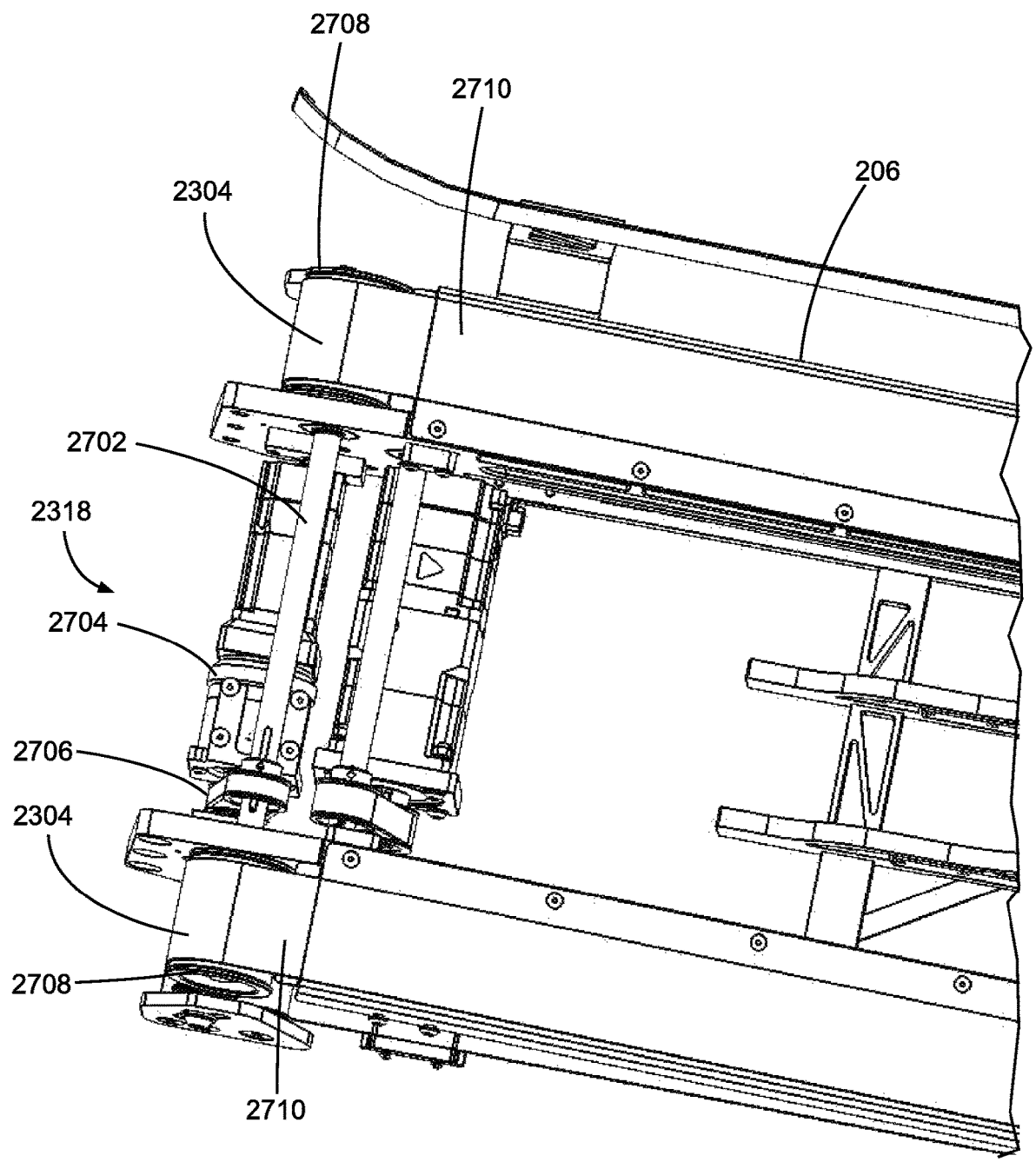
FIG. 27 is an enlarged top perspective view of a mast facing end of the FIG. 18 EoAT.

FIG. 27 shows an enlarged perspective view of the mast facing end 2318 of the EoAT 206 with several components removed to enhance the visibility of a portion of the conveyor system 2304. In the illustrated example, the conveyor system 2304 is a belt type conveyor system in order to conserve weight of the EoAT 206. The conveyor system 2304 includes a conveyor drive 2702 in the form of a servomotor that drives a conveyor driveshaft 2704 via a drive belt 2706. Drive wheels 2708 are positioned on opposite ends of the conveyor driveshaft 2704, and the drive wheels 2708 each drive conveyor belts 2710 that extend along opposite sides of the EoAT 206. In the depicted example, the conveyor drive 2702, which is relatively heavy, is positioned at the mast facing end 2318 in order to reduce the cantilevered loads on the EoAT pitch-yaw actuator joint 1802. It is envisioned that other types of conveyor systems, besides the one illustrated, can be used in other variations.

Figure 28:
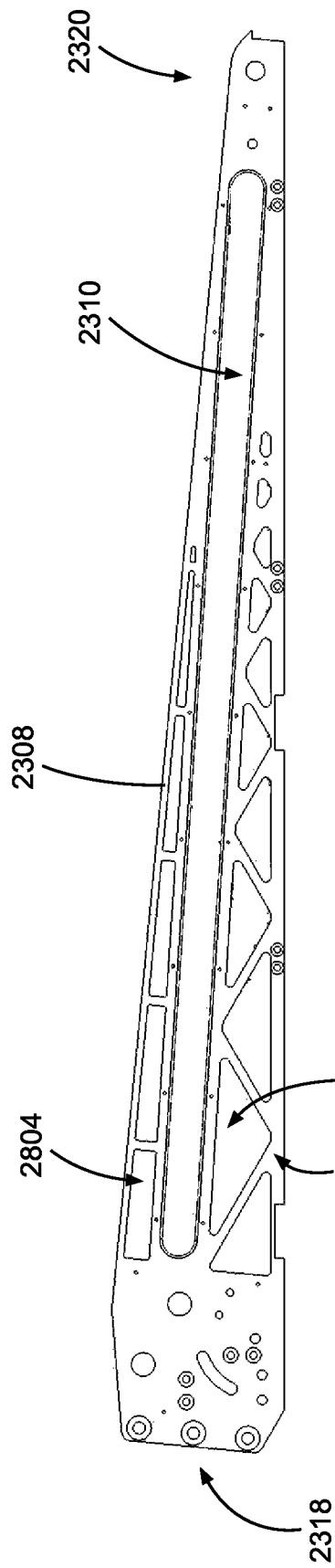
FIG. 28 is a side view of a drive track found in the FIG. 18 EoAT.

FIG. 28 illustrates a side view of one of the drive tracks 2308. As can be seen, the drive track 2308 generally tapers from the mast facing end 2318 to the cargo facing end 2320. This tapering reduces cantilevered loading on the EoAT 206 and further allows the cargo facing end 2320 of the EoAT 206 to get as close to the floor of the cargo carrier 108 as possible to reduce the required lifting distance for pulling the cargo items 110 onto the EoAT 206. Again, the drive track 2308 defines the guide slot 2310 that is used to guide the gripper mechanism 2302 when moving between the extended and retracted positions. To further reduce weight, the drive track 2308 includes trussed sections 2802 that define truss or cut-out openings 2804.

Figure 29:
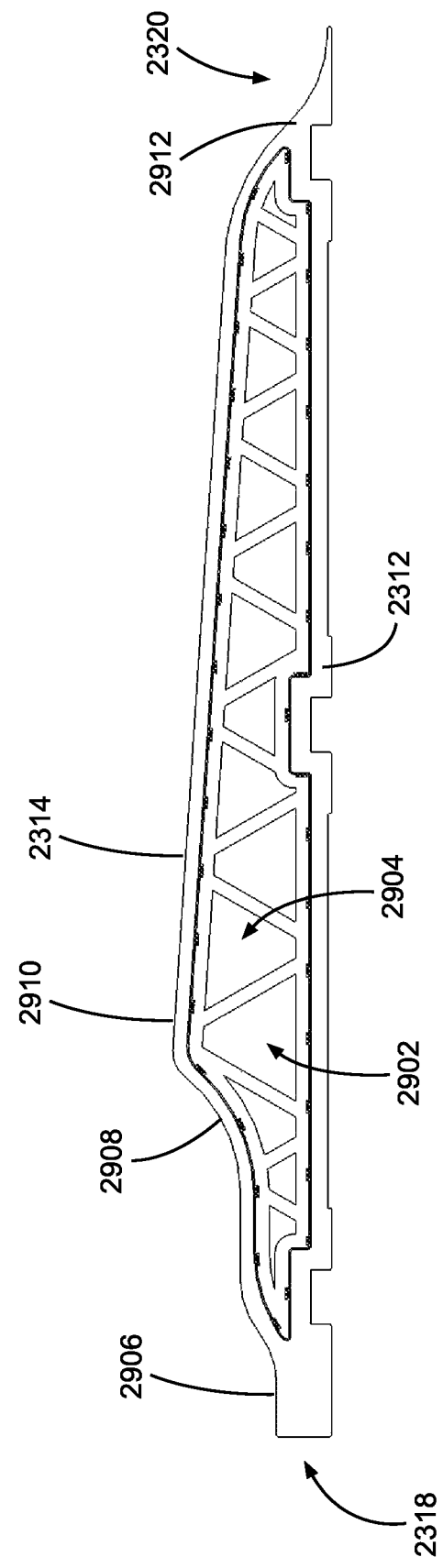
FIG. 29 is a side view of cam track found in the FIG. 18 EoAT.

FIG. 29 depicts a side view of one of the cam tracks 2312. The cam track 2312 generally tapers from the mast facing end 2318 to the cargo facing end 2320. The cam track 2312 is tapered to provide a motion profile for loading the cargo items 110 onto the EoAT 206 that generally coincides with the tapered profile of the EoAT 206. The cam track 2312 has trussed sections 2902 defining truss or cut-out openings 2904. As noted before, the cam track 2312 acts like a linear cam for the gripper mechanism 2302. The cam surface 2314 has various sections or contours that control the vertical movement of the gripping section 2316 of the gripper mechanism 2302. Starting from the mast facing end 2318, the cam surface 2314 includes a retracted section 2906 where the gripping section 2316 of the gripper mechanism 2302 is at or below the top of the conveyor belts 2710 so that the cargo items 110 are unobstructed and can readily travel over the gripper mechanism 2302 when in the retracted position. As shown, the cam surface 2314 further has a transition section 2908 where the gripping section 2316 is either raised or lowered, depending on the direction the gripper mechanism 2302 is traveling. The transition section 2908 provides a transition between the retracted section 2906 and an engagement section 2910 which is relatively higher than the retracted section 2906. Along the engagement section 2910, the gripping section 2316 is raised above the top of the conveyor system 2304 so that the gripping section 2316 of the gripper mechanism 2302 is able to engage with the cargo item 110. The engagement section 2910 is generally contoured to coincide with the height of the conveyor system 2304 so that the gripping section 2316 remains above the conveyor system 2304. At the cargo facing end 2320, the profile of the cam surfaces 2314 is lowered at an extended section 2912 where the gripping section 2316 of the gripper mechanism 2302 extends. The extended section 2912 lowers the gripping section 2316 so that the EoAT 206 is able to reach cargo items 110 at lower locations. In particular, this profile gives the gripper mechanism 2302 enough vertical travel so as to be able to pick the cargo items 110 off of the floor. Moreover, with the gripping section 2316 being lower, the gripper mechanism 2302 tends to grip the lower section of the cargo item 110 which in turn enhances stability when transitioning to or from the EoAT 206.

Figure 30:
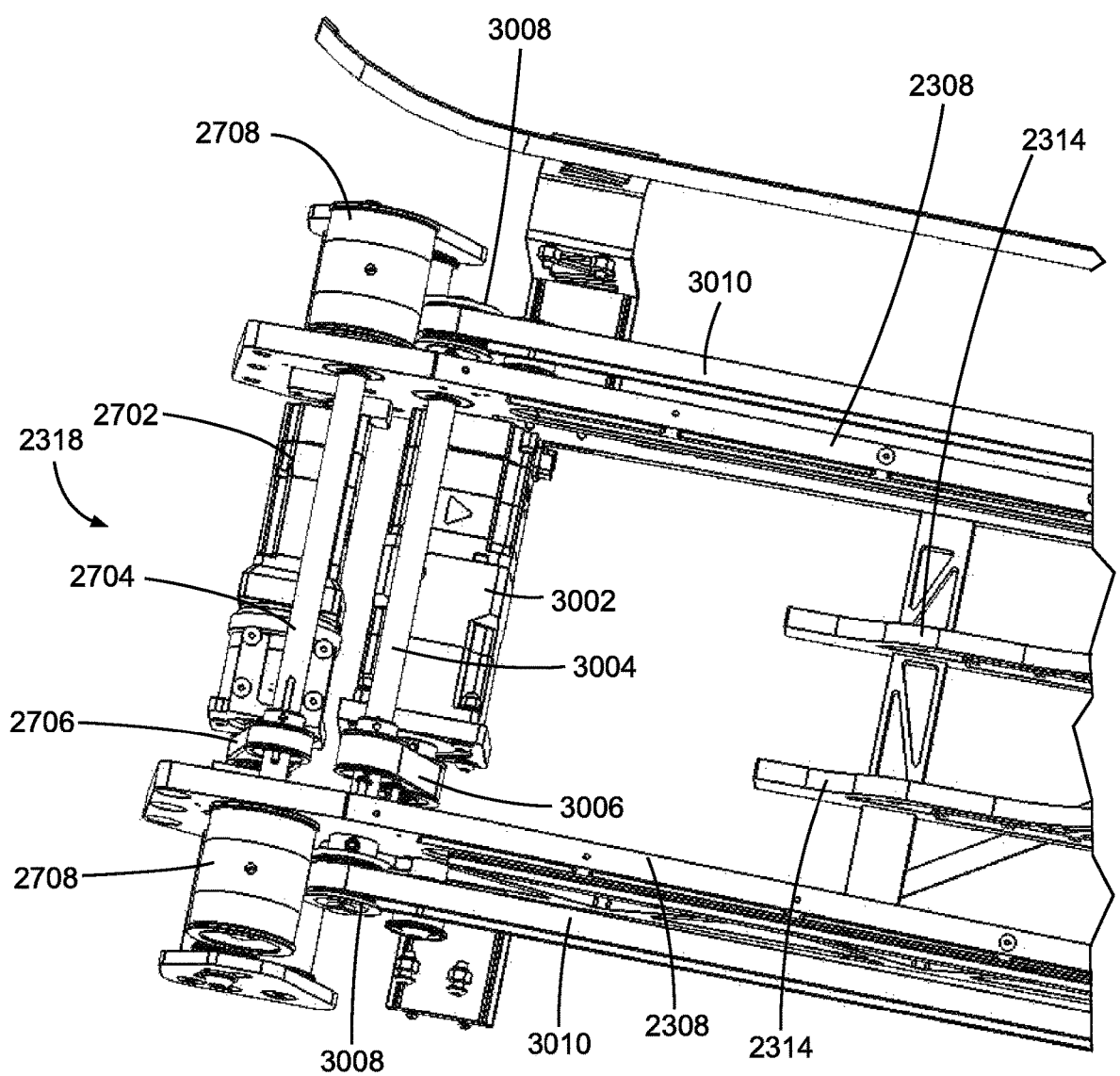
FIG. 30 is an enlarged partial perspective view of the FIG. 18 EoAT at the mast facing end.

FIG. 30 shows an enlarged perspective view of the mast facing end 2318 of the EoAT 206 with selective components removed to improve visibility. As shown, a gripper drive 3002 is configured to move the gripper mechanism 2302 along the drive tracks 2308 between the extended and retracted positions. In one form, the gripper drive 3002 is in the form of a reversible servomotor, but in other examples, the gripper drive 3002 can include other types of motors, such as pneumatic motors. A gripper driveshaft 3004 is operatively connected to the gripper drive 3002 via a drive belt 3006. At both ends, the gripper driveshaft 3004 has drive wheels 3008 that drive a gripper belt 3010. When driven by the gripper drive 3002, the gripper belt 3010 is configured to move the gripper mechanism 2302 along the drive tracks 2308.

Figure 31:
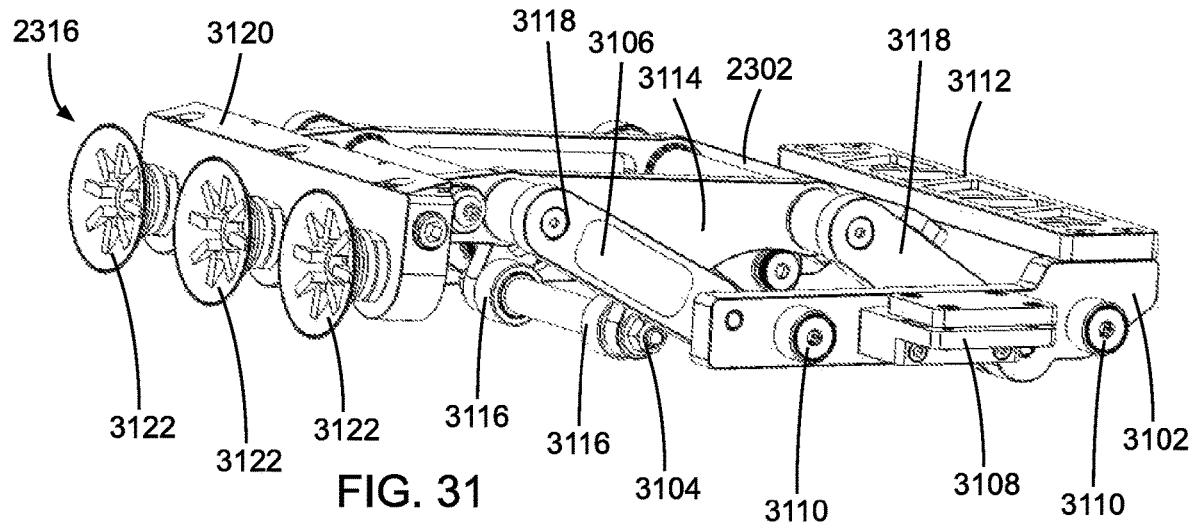
FIG. 31 is a front perspective view of the gripper mechanism found in the FIG. 18 EoAT.
Figure 32:
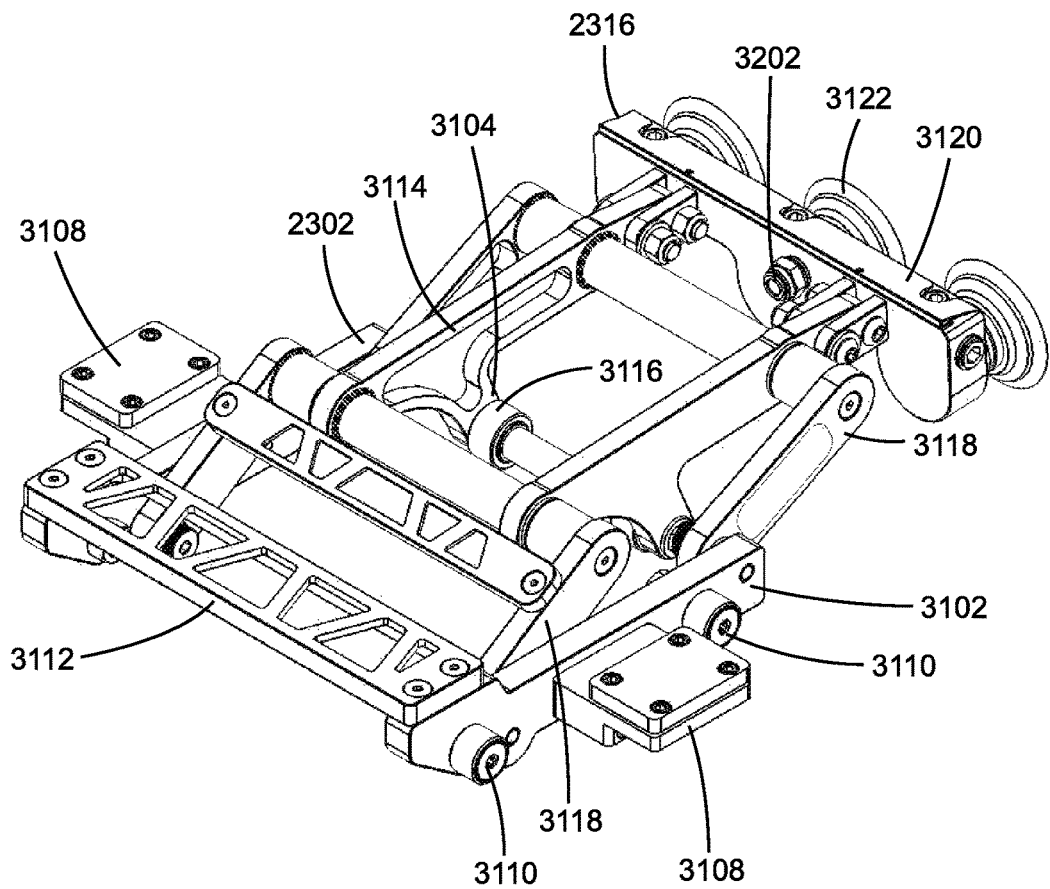
FIG. 32 is a rear perspective view of the FIG. 31 gripper mechanism.
Figure 33:
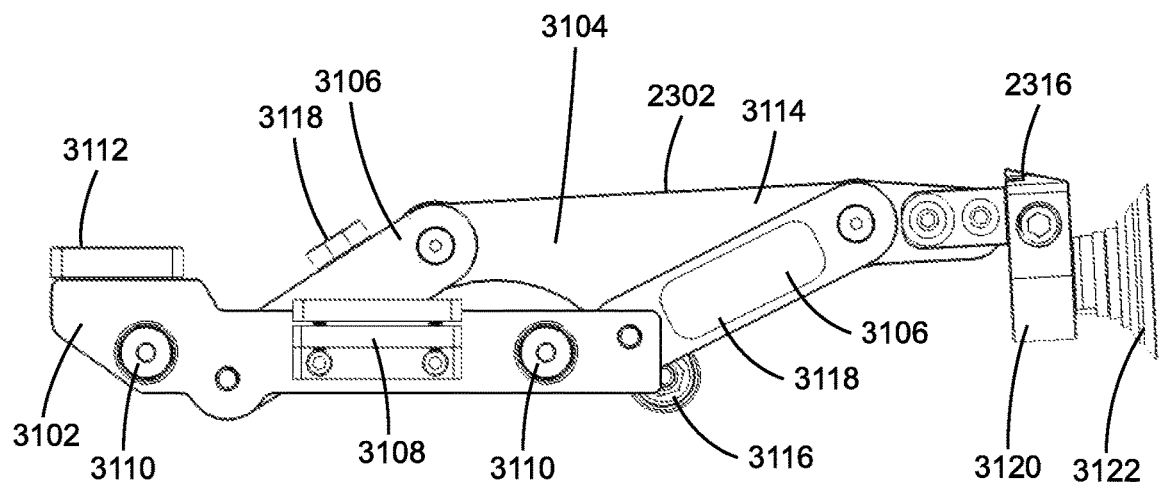
FIG. 33 is a side view of the FIG. 31 gripper mechanism.
Figure 34:
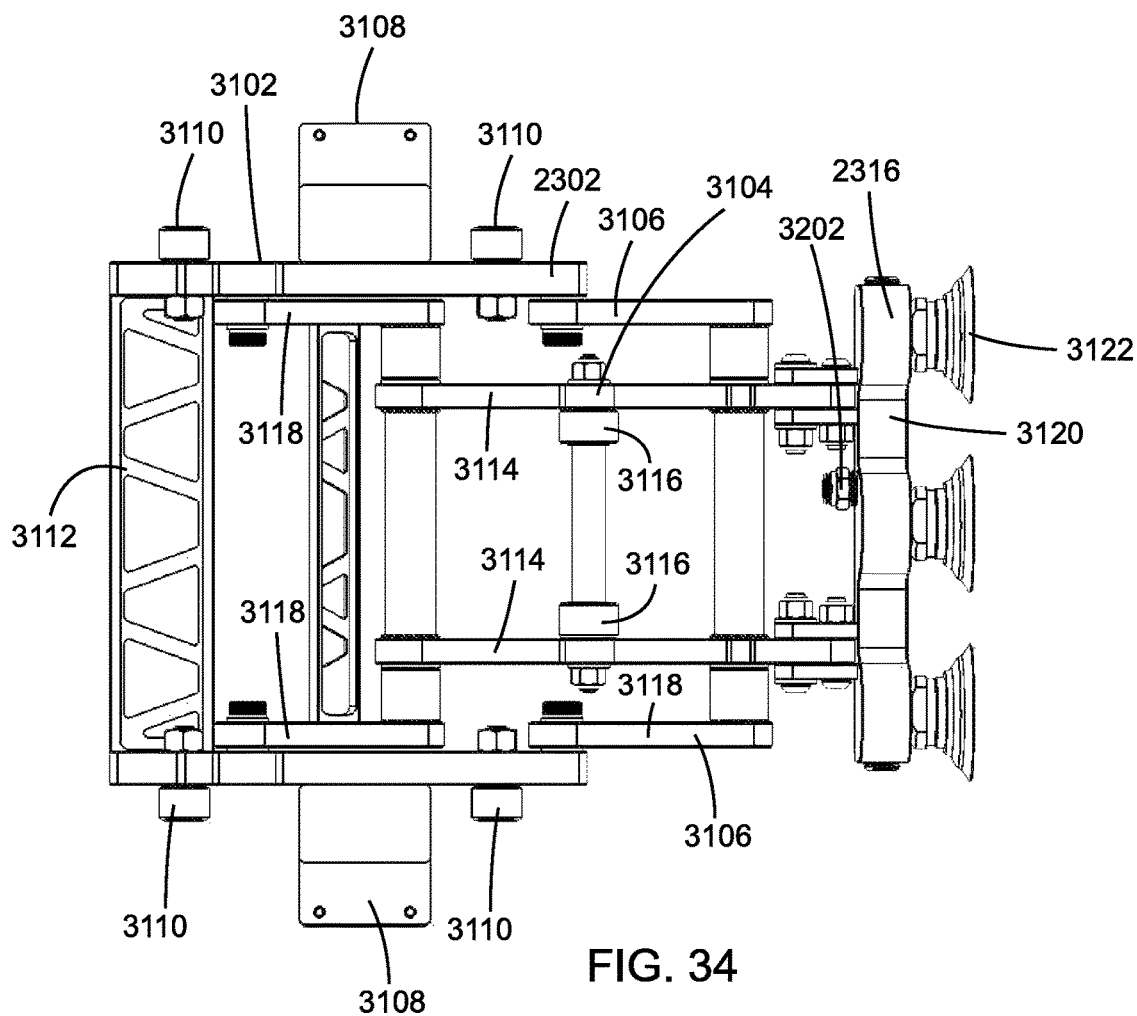
FIG. 34 is a top view of the FIG. 31 gripper mechanism.

FIGS. 31 and 32 respectively show front and rear perspective views of the gripper mechanism 2302 with the gripping section 2316, and FIGS. 33 and 34 respectively show side and top views of the gripper mechanism 2302 with the gripping section 2316. Along with the gripping section 2316, the gripper mechanism 2302 includes a carriage 3102 that rides along the drive tracks 2308, a cam follower 3104 that rides along the cam tracks 2312, and an extension mechanism 3106 for vertically extending and retracting the gripping section 2316 from the carriage 3102. The carriage 3102 includes one or more belt clamps 3108 that clamp to the gripper belt 3010. The belt clamps 3108 extend through the guide slot 2310 in the drive tracks 2308 in order to clamp to the gripper belt 3010. In other forms, the carriage 3102 can be secured to the gripper belt 3010 in other manners, and the carriage 3102 can be driven by other types of devices, such as via a pneumatic piston. The carriage 3102 further includes one or more guide wheels 3110 that are received in the guide slots 2310 in the drive tracks 2308. The guide wheels 3110 inside the guide slots 2310 help to smoothly guide the carriage 3102 along the drive tracks 2308. A crossbeam 3112 connects both sides of the carriage 3102 together.

The cam follower 3104 includes one or more cam follower arms 3114 with cam follower wheels 3116 that ride along the cam surfaces 2314 of the cam tracks 2312. As shown, the cam follower arms 3114 are connected to the gripping section 2316. In the depicted example, the gripping section 2316 is bolted to the cam follower 3104 so as to facilitate easy replacement and repair, but in other examples, the gripping section 2316 can be secured to the cam follower 3104 in other ways. The extension mechanism 3106 connects the cam follower arms 3114 to the carriage 3102. In the illustrated example, the extension mechanism 3106 includes one or more extension linkages 3118 that connect the carriage 3102 to the cam follower arms 3114. As should be appreciated, the extension linkages 3118 form a parallelogram linkage type connection between the carriage 3102 and the cam follower 3104 so that the cam follower 3104 remains generally parallel to the carriage 3102 during extension and retraction of the gripping section 2316. This in turn allows the gripping section 2316 to generally remain at an orientation facing the cargo item 110 before, during, and after engagement with the cargo item 110 so as to ensure a firm grip. In one form, the extension mechanism 3106 includes one or more biasing springs that bias the extension mechanism so that the gripping section 2316 is normally in a retracted position. In other examples, gravity is used to bias the gripping section 2316 into the retracted position.

The gripping section 2316 includes a manifold 3120 that provides a vacuum or suction (i.e., low air pressure) to one or more vacuum or suction cups 3122. In the illustrated example, the gripping section 2316 includes three vacuum cups 3122, but in other examples, the gripping section 2316 can include more or less vacuum cups 3122 than is shown. Referring to FIGS. 32 and 34, the manifold 3120 has a vacuum port 3202 that supplies the vacuum to the manifold 3120 via a tube connected to a vacuum supply. In the depicted example, the manifold 3120 includes a single vacuum port 3202 that supplies the vacuum to all three vacuum cups 3122, but in other examples, each vacuum cup 3122 can include a dedicated vacuum supply so that each vacuum cup 3122 can be independently controlled. The vacuum cups 3122 help the gripper mechanism 2302 to readily grab one side of a cargo item 110, such as a box, which is quite helpful when the cargo items 110 are tightly stacked or nested together. It should be recognized that other types of gripping mechanisms, such as clamps and/or robotic fingers, can be used in addition or as an alternative to the vacuum cups 3122.

Figure 35:
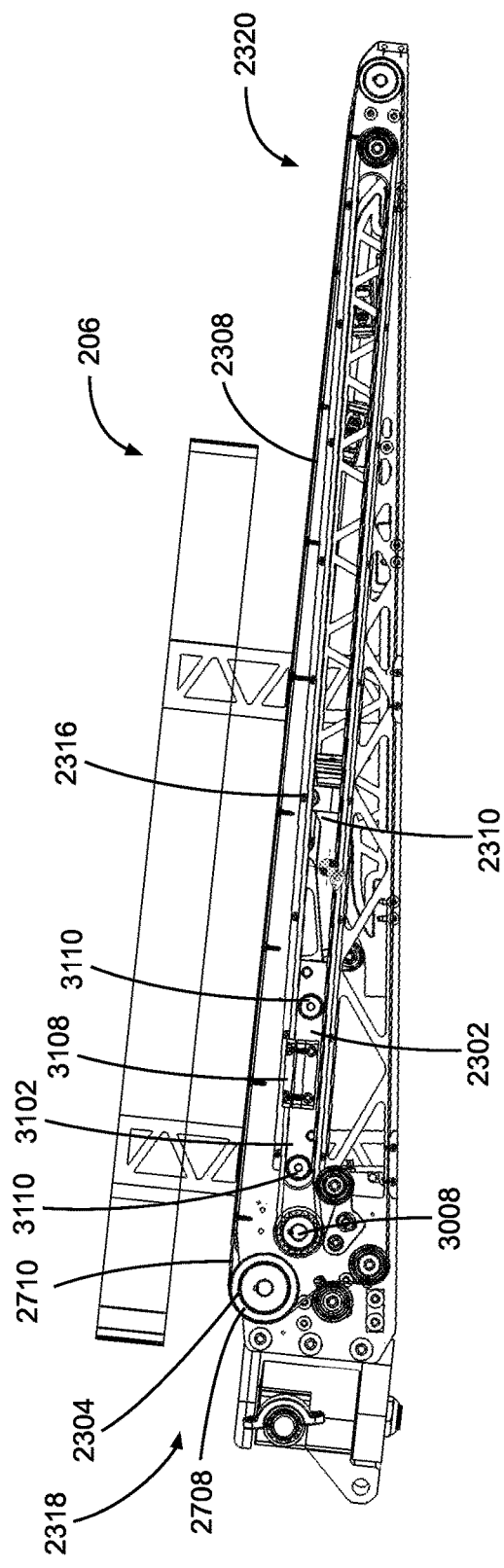
FIG. 35 is a partial side cross-sectional view of the FIG. 18 EoAT with the FIG. 31 gripper mechanism in the retracted position.
Figure 36:
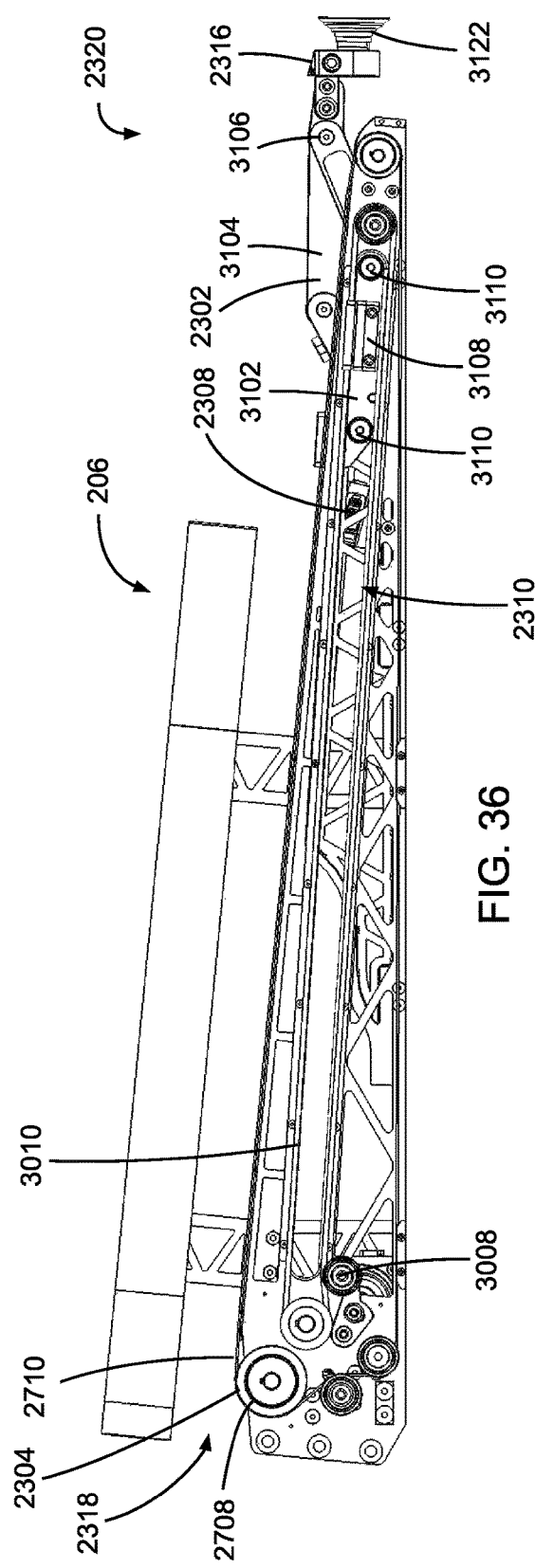
FIG. 36 is a partial side cross-sectional view of the FIG. 18 EoAT with the FIG. 31 gripper mechanism in the extended position.

A technique for extending and retracting (and vice versa) of the gripper mechanism 2302 will now be initially described with reference to FIGS. 35 and 36. FIGS. 35 and 36 show partial cross-sectional side views of the EoAT 206 when the gripper mechanism 2302 is in the retracted position and the extended position, respectively. As shown in FIG. 35, when the gripper mechanism 2302 is in the retracted position, the gripping section 2316 along with the rest of the gripper mechanism 2302 is positioned at or below the top of the conveyor belts 2710 of the conveyor system 2304. FIG. 37 shows an enlarged partial cross-sectional view of the gripper mechanism 2302 and the cam tracks 2312 when the gripper mechanism 2302 is in the retracted position. Again, this retraction of the gripping section 2316 allows cargo items 110 to smoothly move along the conveyor system 2304 without any interference. As shown, the cam follower wheels 3116 of the cam follower 3104 are located on the retracted sections 2906 of the cam surfaces 2314. Once more, biasing springs and/or gravity bias the gripping section 2316 towards the retracted position below the top of the conveyor system 2304.

To extend the gripper mechanism 2302 from the retracted position (FIG. 35) to the extended position (FIG. 36), the gripper drive 3002 (FIG. 30) drives the gripper belt 3010 so that the carriage 3102 of the gripper mechanism 2302 moves from the mast facing end 2318 towards the cargo facing end 2320. As the gripper belt 3010 moves the gripper mechanism 2302, the guide slots 2310 in the drive tracks 2308 guide the guide wheels 3110 of the carriage 3102 so that the gripper mechanism 2302 generally moves in a linear fashion along the EoAT 206. At the same time, the cam follower wheels 3116 ride along the cam surfaces 2314 of the cam tracks 2312. Starting at the transition section 2908, the cam follower 3104 causes the extension mechanism 3106 to raise the gripping section 2316 above the conveyor system 2304. Once the cam follower wheels 3116 reach the engagement section 2910 of the cam surfaces 2314, the gripping section 2316 fully extends above the conveyor belts 2710. The gripping section 2316 generally remains at the same relative position as the cam follower 3104 travels along the engagement section 2910. Upon the gripper mechanism 2302 reaching the cargo facing end 2320, the gripper drive 3002 ceases driving the drive belt 3006 such that the gripping section 2316 remains at the extended position, as is illustrated in FIG. 36. This movement of the gripper mechanism 2302 can be sensed by the cargo sensor system 2322 (e.g., the cargo facing sensor 2326) and/or other sensors. FIG. 38 shows an enlarged partial cross-sectional view of the gripper mechanism 2302 upon reaching the cargo facing end 2320. As can be seen, the cam follower wheel 3116 is positioned in the extended section 2912 of the cam surface 2314. The extended section 2912 is generally lower than the engagement section 2910 so that the gripping section 2316 is positioned closer to the bottom of the cargo item 110.

To retract the gripper mechanism 2302 back towards the mast facing end 2318, the process is reversed. The gripper drive 3002 is reversed to drive the gripper belt 3010 in a reverse direction. This movement pulls the gripper mechanism 2302 back towards the mast facing end 2318. Typically, but not always, the gripper mechanism 2302 is moved faster than the conveyor belts 2710 on the EoAT 206 to facilitate loading or unloading of the cargo items 110 from the conveyor belts 2710. In one form, the conveyor belts 2710 are driven at a speed of around 200 feet per second (about 61 meters/second). The carriage 3102 is guided back along the guide slots 2310 in the drive tracks 2308. The cam follower wheels 3116 at the same time ride along the cam surfaces 2314 of the cam tracks 2312. Like before, the cam follower 3104 causes the gripping section 2316 of the gripper mechanism 2302 to extend above the conveyor system 2304 when riding along the engagement section 2910 of the cam tracks 2312. In one example, the gripper drive 3002 varies the travel speed of the gripper mechanism 2302 as the gripper mechanism 2302 travels along the cam surfaces 2314. Similar to a car traveling over a speed bump, the gripper drive 3002 reduces the speed of the gripper mechanism 2302 during transition between the extended section 2912 and the engagement section 2910. The speed of the gripper mechanism 2302 in this example is also reduced when moving along the transition section 2908. It should be recognized that the speed of the gripping mechanism 2302 can have different velocity profiles due to a number of factors, including, but not limited to, the type or size of cargo item 110 being processed, the desired processing speeds, conveyor speeds, profiles of the cam surfaces 2314, and/or type of gripper mechanism 2302 being used. Upon reaching the transition section 2908, the cam follower 3104 causes the gripping section 2316 to start moving in a downwards direction below the conveyor belts 2710. Once the cam follower wheels 3116 reach the retracted section 2906, the gripper mechanism 2302 is retracted out of the way and below the top surface of the conveyor system 2304, thereby allowing cargo items 110 to have uninterrupted travel along the conveyor system 2304 in either direction.

Figure 39:
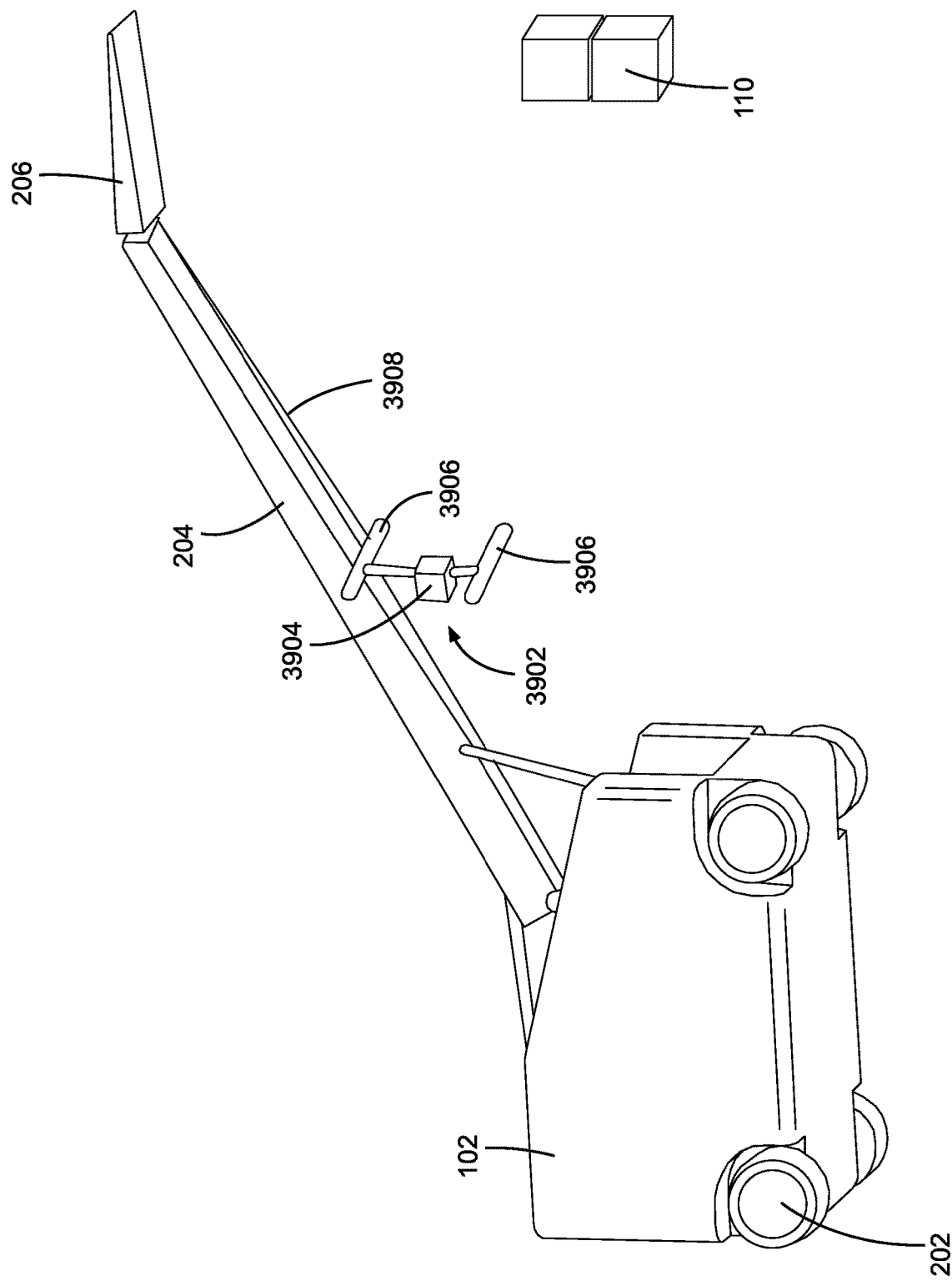
FIG. 39 is a perspective view of the FIG. 2 robot with a cargo sensor for detecting cargo items.

To detect the location and/or orientation of the cargo items 110 when for example in the cargo carrier 108, the robot 102 in FIG. 39 includes one or more cargo sensors 3902. In the illustrated example, the cargo sensor 3902 is mounted underneath the mast 204 so that the cargo sensor 3902 generally has a clear sight and is generally not blocked by the gripper mechanism 2302. It however should be recognized that the cargo sensor 3902 can be positioned elsewhere on the robot 102. In one form, the cargo sensor 3902 is a camera 3904 for a vision system that senses the edges of the cargo items 110, and in one particular example, the cargo sensor is a vision system produced by Graftek Imaging, Inc. of Austin, Tex. In the illustrated example, the cargo sensor 3902 includes the camera 3904 with two light bars 3906. The light bars 3906 are horizontally oriented and positioned above and below the camera 3904 which includes lens and bracketry. As indicated by double arrow 3908, the cargo sensor 3902 is located or recessed at a distance away from the end of the mast 204 where the mast 204 is joined to the EoAT 206. In one particular example, the cargo sensor 3902 is a vision system that includes two 24 inch horizontal light bars 3906 with a 3 inch clearance diameter, and the light bars 3906 along with the camera 3904 occupy, roughly, 6 cubic inches of space. In this example, the distance 3908 from the cargo sensor 3902 to the tip of the mast 204 is about 2 meters, and the cargo sensor 3902 occupies approximately 27 inches of vertical space below the mast 204. It is envisioned that alternate orientations, configurations, and/or locations of the cargo sensor 3902 can be devised for the robot 102. For example, one or more of the cameras 3904 and/or light bars 3906 can be mounted to the top or side of the mast 204 as well as on the base unit 202, EoAT 206, and/or not on the robot 102. Other types of sensors, such as laser curtains, ultrasonic detectors, and the like, can also be used. Note that the cargo sensor 3902 in FIG. 39 is illustrated generally larger than what is used commercially to enhance visibility in the drawings. In practice, the cargo sensor 3902 can be smaller or larger than is illustrated. By sensing the edges of the cargo items 110, the robot 102 is able to properly position the EoAT 206 during stacking and unstacking of the cargo items 110.

The cargo sensor 3902 is capable of capturing multiple images throughout the picking (or placing) process to acquire the needed data of the cargo container environment and cargo load. Correspondingly, a few images (e.g., one to five) could be acquired at the beginning of the loading or unloading process to provide the data of the trailer environment and cargo load for the robot 102. In one particular example, the camera 3904 takes one or more pictures of the cargo items 110 (and/or the environment of the cargo carrier 108) before the unloading or loading process of the cargo items 110. The controllers 210 of the robot 102 use these static pictures as a map for controlling the movement of the EoAT 206 as well as other components of the robot 102. In another example, the camera 3904 takes a series of pictures, once each time a row, column, stack, and/or individual cargo item 110 is processed, and the controllers 210 control the operation of the robot 102 based on these series of pictures. In still yet another example, the camera 3904 gather images of the cargo items 110 in a continuous (e.g., video) or near continuous manner which are then processed by one or more of the controllers 210.

Figure 40:
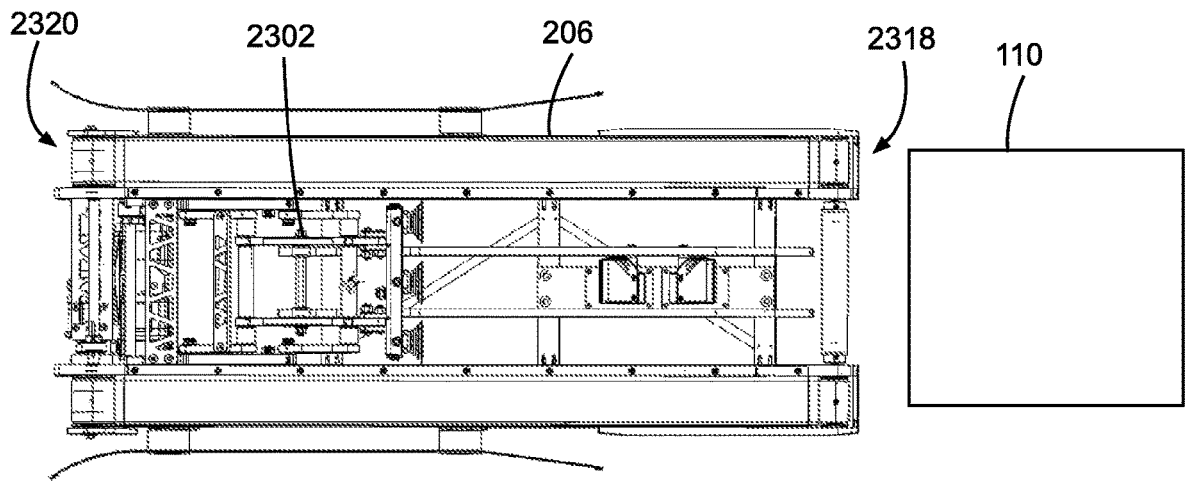
FIG. 40 is a top view of the FIG. 18 EoAT before the cargo item is loaded.
Figure 41:
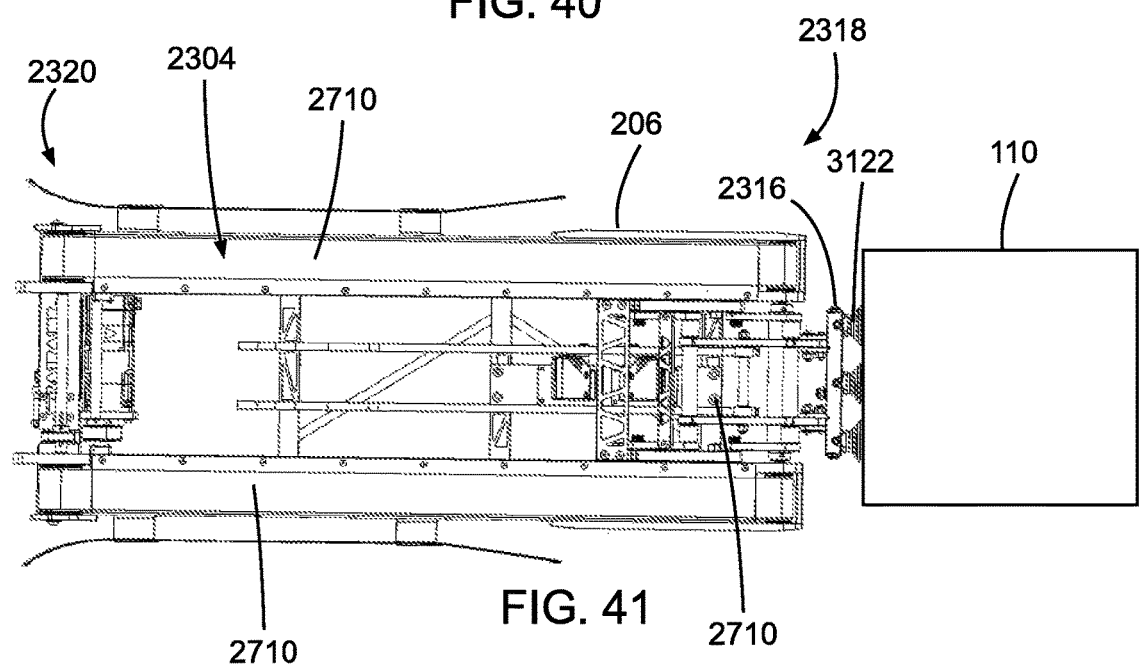
FIG. 41 is a top view of the FIG. 18 EoAT when the FIG. 31 gripper mechanism is extended to grip the cargo item.
Figure 42:
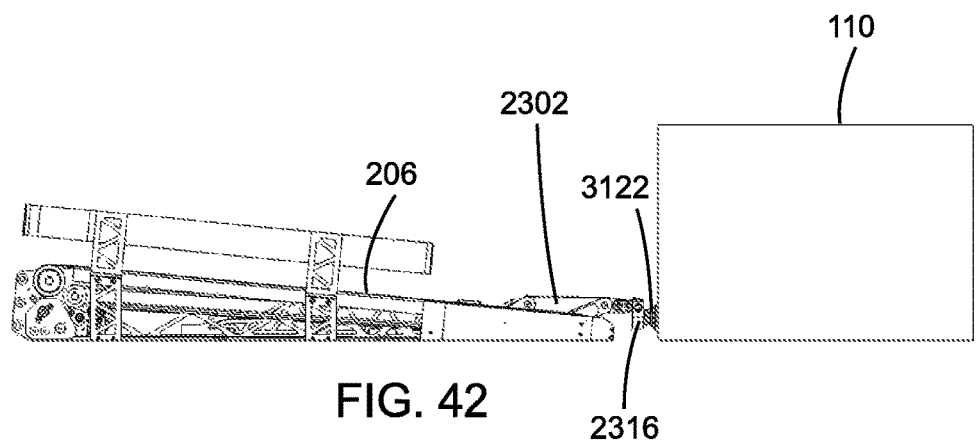
FIG. 42 is a side view of the arrangement shown in FIG. 41.

An example showing how the cargo item 110 is loaded onto the EoAT 206 will now be described with reference to FIGS. 40-45. As will be appreciated, the process steps and order of the drawings can be reversed to show how the cargo item 110 is unloaded from the EoAT 206. Turning to FIG. 40, based on the location of the cargo item 110 sensed by the cargo sensor 3902, the transport system 208, mast actuator system 212, and the EoAT pitch-yaw actuator joint 1802 position the cargo facing end 2320 of the EoAT 206 in close proximity to the cargo item 110. Once in position, the gripper mechanism 2302 is moved from the retracted position, which is shown in FIG. 40, to the extended position, as is shown in FIGS. 41 and 42. A vacuum is applied to the vacuum cups 3122 in order to secure the cargo item 110 to the gripper mechanism 2302. As illustrated in FIG. 42, the vacuum cups 3122 of the gripping section 2316 engage near the bottom of the cargo item 110. Securing at that position helps with lifting the cargo item 110 onto the EoAT 206. Before hand or when the cargo item 110 is secured, the conveyor system 2304 drives the conveyor belts 2710 in a direction so that the cargo item 110 is moved from the cargo facing end 2320 to the mast facing end 2318. In another example, the conveyor system 2304 can be continuously driven. In another example, the conveyor belts 2710 are not driven until or after the cargo item 110 is loaded onto the conveyor belts 2710. In the illustrated example, the vacuum cups 3122 are secured to or engage one cargo item 110 at a time. However, in other examples the EoAT 206 can be used to load, and/or unload more than one cargo items 110 at a time so as to enhance cycle time. For instance, the EoAT 206 can load and/or unload cargo items 110 that are stacked upon one another.

Figure 43:
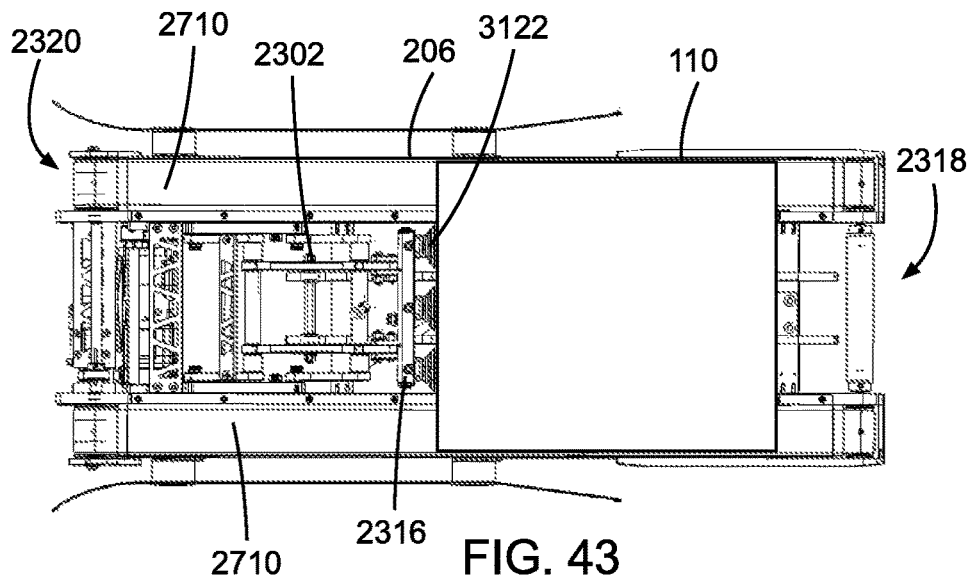
FIG. 43 is a top view of the FIG. 18 EoAT when the cargo item is loaded.
Figure 44:
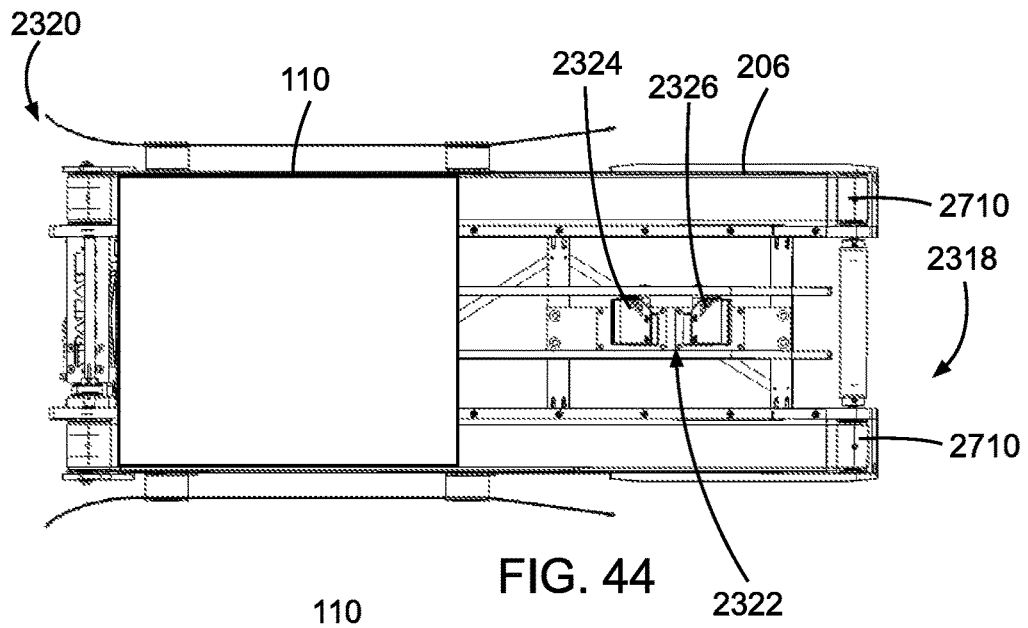
FIG. 44 is a top view of the FIG. 18 EoAT when the cargo item is traveling across the FIG. 31 gripper mechanism when in the retracted position.
Figure 45:
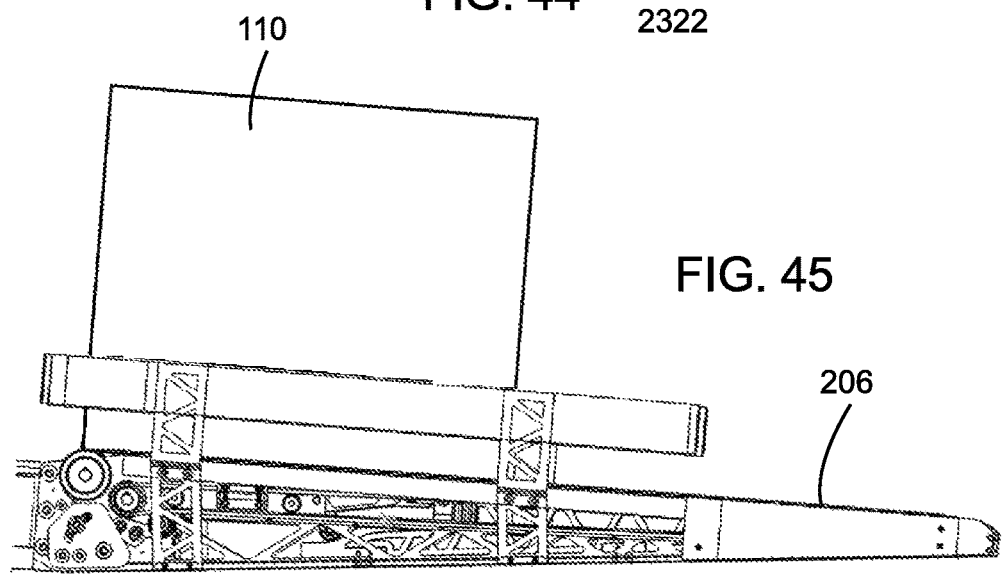
FIG. 45 is a side view of the arrangement shown in FIG. 44.

Upon sensing the cargo item 110 is secured to the gripper mechanism 2302 (e.g., by sensing a change in pressure at the vacuum cups 3122, via cargo sensor system 2322, and/or via cargo sensor 3902), the gripper mechanism 2302 is moved from the cargo facing end 2320 to the mast facing end 2318 so as to pull the cargo item 110 onto the conveyor belts 2710, as is depicted in FIG. 43. Once the cargo item 110 is fully loaded onto the EoAT 206, as for example sensed by the cargo sensor system 2322, the vacuum cups 3122 can be released from the cargo item 110. The gripper mechanism 2302 can then be accelerated faster than the conveyor belts 2710 so that the gripper mechanism 2302 is released from the cargo item 110. At or upon reaching the retracted position, the gripping section 2316 is retracted below the bottom of the cargo item 110 such that the cargo item 110 can travel over the gripper mechanism 2302, as is depicted in FIGS. 44 and 45. In one form, the mast facing sensor 2324 is used to sense when the cargo item is transferred from the EoAT 206 to the mast 204. The EoAT 206 then can be moved to grab on another cargo item 110. The cargo items 110 from the EoAT 206 travel along the mast 204 and are transferred from the robot 102 onto the extendable conveyor system 104 which in turn transfers the cargo item 110 to the conveyor system 106.

As alluded to before, the operation of the EoAT 206 can be reversed in order to stack the cargo items 110 in for example the cargo carrier 108. The EoAT 206 is positioned at the desired location where the cargo item 110 is to be stacked. The mast facing sensor 2324 can sense when one of the cargo items 110 is on the EoAT 206 (FIGS. 44 and 45). Upon the cargo facing sensor 2326 (or other sensor) sensing the cargo item 110 is approaching the cargo facing end 2320 of the EoAT 206, the gripper mechanism 2302 is moved from the retracted position to the extended position so as to push against the side of the cargo item 110. In one form, the vacuum cups 3122 are activated to grip the cargo item 110, and in another example, the vacuum cups 3122 are not activated and merely push against the cargo item 110. In a further example, the cargo items 110 are conveyed off the conveyor system 2304 of the EoAT 206 at high speed such that the gripper mechanism 2302 is not needed to push the cargo items 110 from the EoAT 206. The mast facing sensor 2324 senses when the cargo item 110 is positioned off of the EoAT 206. Moving to the fully extended position, the gripper mechanism 2302 pushes the cargo item 110 into place within the stack. Once the cargo item 110 is stacked, the suction of the vacuum cups 3122 is released, and the gripper mechanism 2302 is retracted to the fully retracted position so as to allow the next cargo item 110 to be loaded onto the EoAT 206. In still yet another variation, the gripper mechanism 2302 is not actuated when stacking cargo items 110, and only the conveyor system 2304 is used to stack the cargo items 110.

Figure 46:
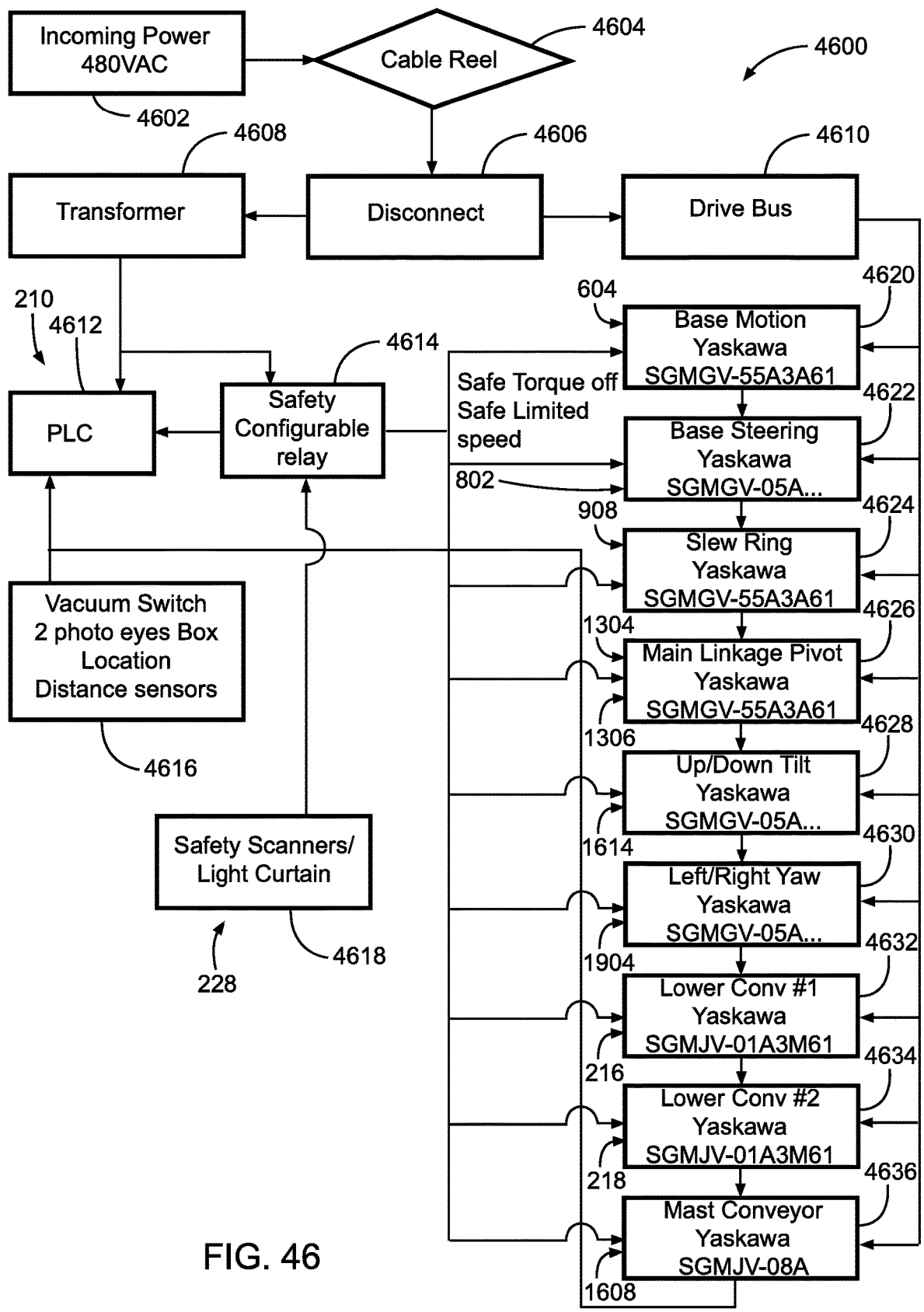
FIG. 46 is a block diagram 4600 showing one example of an overall control architecture for the FIG. 2 robot.

A block diagram 4600 showing one example of the overall control architecture for the robot 102 is shown in FIG. 46. As illustrated, a power source 4602 provides power to the robot 102. As noted before, the robot 102 in one example receives power from an external power source 4602, but in other examples, the robot 102 can include an internal power source, such as batteries. A cable reel 4604 is used to take up any slack of the electrical cable plugged into the power source 4602. As depicted, the cable reel 4604 is electrically connected to a disconnect 4606 (e.g., a circuit breaker box) that is configured to electrically disconnect or isolate the robot 102 from the power source 4602, such as during an unexpected power surge. The disconnect 4606 is electrically connected to a transformer 4608 and a drive bus 4610. The transformer 4608 down converts the power so that it can be used by the various controllers 210 and sensors in the robot 102. The transformer 4608 provides power to a PLC 4612 and a safety configurable relay 4614. The PLC 4612 controls the general operation of the robot 102. The safety configurable relay 4614 is used to determine when certain operational safety limits are exceeded so that the PLC 4612 can take appropriate corrective action, such as when motors reach a torque or speed limit. The PLC 4612 communicates with a number of different sensors and controllers. For instance, the PLC 4612 is operatively connected to EoAT sensors/controllers 4616. The EoAT sensors/controllers 4616 can include vacuum switches that control the operation of the vacuum cups 3122 and the cargo sensor system 2322. The PLC 4612 is operatively connected to the safety configurable relay 4614 which as is shown is connected to a number of other components. For instance, safety scanner/light curtains 4618 are operatively connected to the safety configurable relay 4614. The safety scanners 4618 can include the above discussed safety scanners 228 that detect objects, individuals, and structures around the robot 102 so that the robot 102 can be steered for collision avoidance or positioning. The PLC 4612 is also operatively connected directly to these components through the drive bus 4610.

As illustrated in FIG. 26, the drive bus 4610 connects a number of components, such as motors, motor controllers, and/or sensors, together so that the components can communicate with one another and the PLC 4612. In the illustrated example, the components are connected together using an Ethernet communication type system, but in other examples other types of communication protocols and/or systems can be used. The PLC 4612 through the drive bus 4610 can control the operation of a number of components, such as the previously described motors. The safety configurable relay 4614 also directly monitors the operations of these components. For example, the safety configurable relay 4614 monitors the torque and the speed of the motors to prevent damage and/or injury. As illustrated, a base motion controller 4620 controls the movement of the robot 102 through the operation of the wheel motors 604, and a basic steering controller 4622 controls the steering of the robot 102 through the steering motors 802. The PLC 4612 controls the yaw of the mast 204 through a slew ring or yaw controller 4624 which controls the operation of the mast yaw drive 908. The PLC 4612 through a main linkage controller 4626 controls the operation of the extension 1304 and pitch 1306 drive motors so as to control the pitch and yaw of the mast 204. An EoAT pitch or tilt controller 4628 controls the operation of the EoAT pitch motor 1614 so as to control the pitch (or tilt) of the EoAT 206. The PLC 4612 is also operatively connected via the drive bus 4610 to an EoAT yaw controller 4630. The EoAT yaw controller 4630 controls the operation of the EoAT yaw motor 1904 so as to control the yaw of the EoAT 206. First 4632 and second 4634 lower conveyor controllers respectively control the operation of the mast section 216 and transition section 218 of the base unit conveyor 214. The PLC 4612 is able to control the operation of the motor 1608 of the mast conveyor 1404 via the mast conveyor controller 4636. It should be recognized that other components can be operatively connected to and be controlled by the PLC 4612 through the drive bus 4610. For example, the conveyor drive 2702 and the gripper drive 3002 on the EoAT 206 are also operatively connected to the drive bus 4610 so that the PLC 4612 is able to control the operation of the EoAT 206.

Figure 47:
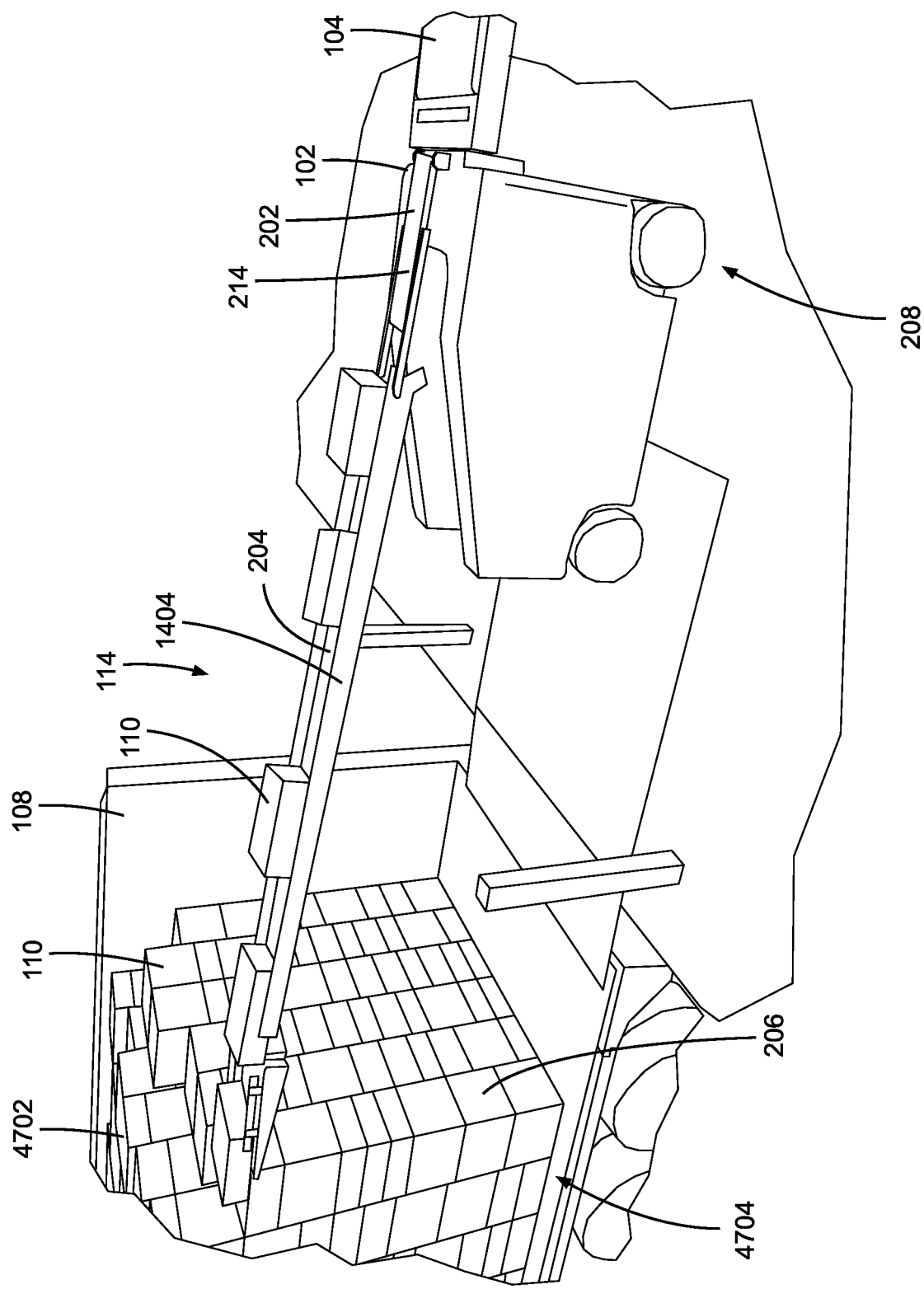
FIG. 47 is a perspective view of the FIG. 2 robot during an initial stage of unloading cargo items from a cargo carrier.
Figure 48:
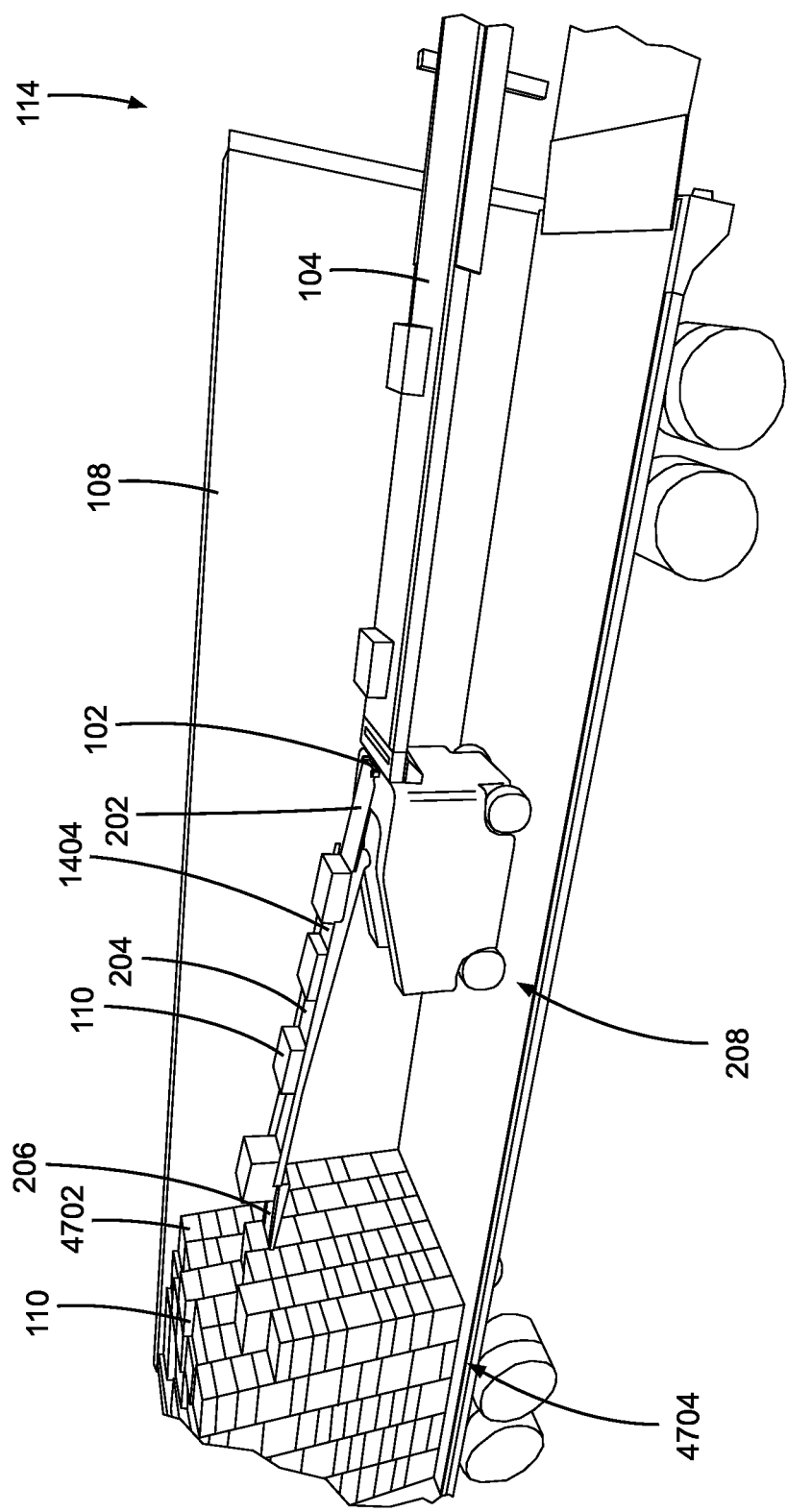
FIG. 48 is a perspective view of the FIG. 2 robot during a later stage of unloading the cargo items from the cargo carrier.

The general operation of the robot 102 will now be described with reference to FIGS. 47 and 48. In this particular example, the operation of the robot 102 will be described with reference to unloading the cargo items 110 from the cargo carrier 108, but it should be recognized that the operation can generally be reversed in order to load the cargo items 110 into the cargo carrier 108. Since the operation and function of the EoAT 206 has already been described in great detail with reference to FIGS. 40-45 as well as in the other drawings, these specific operational details of the EoAT 206 will not be described again for the sake of brevity, but please refer to the previous description. Once the cargo carrier 108, such as a semitrailer, is positioned at the loading dock 114 and that the door for the cargo carrier 108 is opened, the transport system 208 of the base unit 202 moves the robot 102 into proper position. As shown, the cargo items 110 inside the cargo carrier 108 are stacked on top of one another to form columns 4702 of the cargo items 110. Multiple columns 4702 of the cargo items 110 form walls or rows 4704 of the cargo items 110. In one example, the robot 102 via the mast 204 positions the EoAT 206 at the top corner of one of the rows 4704. As explained before, the cargo sensor 3902 senses a target cargo item 110 that the EoAT 206 will grab, and the EoAT pitch-yaw actuator joint 1802 along with the mast 204 properly positions the EoAT 206 at the target cargo item 110. As explained before with respect to FIGS. 40-45, the gripper mechanism 2302 is extended to grab the target cargo item 110 and pull the target cargo item 110 onto the EoAT 206. Once the cargo item 110 is securely placed on the conveyor system 2304 of the EoAT 206, the gripper mechanism 2302 is retracted out of the way, and the conveyor system 2304 transports the cargo item 110 onto the mast 204. The mast 204 then moves the EoAT 206 to the next column 4702 in the row 4704 in order to grab the next cargo item 110 in the same fashion. The cargo items are transported along the mast 204 via the mast conveyor 1404 in a continuous or near continuous fashion. The mast conveyor 1404 then transfers the cargo item 110 onto the base unit conveyor 214 which in turn transfers the cargo item 110 onto the extendable conveyor 104. As mentioned before, the extendable conveyor 104 transfers the cargo items onto the conveyor system 106. The robot 102 moves the EoAT 206 in a S-shaped or raster pattern along the row 4704 of cargo items 110. As mentioned before, the EoAT 206 is designed to pull the cargo items directly from the floor of the cargo carrier 108. Once a row 4704 of cargo items is emptied, the transport system 208 moves the base unit 202 so that the EoAT 206 is positioned at the next row 4704 of cargo items 110. The robot 102 continues unloading the cargo items by positioning the EoAT 206 at the top corner of the cargo items 110 in the row 4704, and the EoAT 206 unloads the cargo items 110 by moving in a similar S-shaped or serpentine pattern down the row of the cargo items 110. As the base unit 202 to progressively moves inside the cargo carrier 108, which is shown in FIGS. 1 and 48, the extendable conveyor 104 extends so as to preserve the connection between the robot 102 and the main conveyor system 106. Once the cargo carrier 108 is emptied, the robot 102 is moved out of the cargo carrier 108 so that the next cargo carrier 108 can be serviced.

To load cargo items 110 into the cargo carrier 108, the process is generally reversed. The robot 102 is moved inside the cargo carrier 108 so that the EoAT 206 is close to the back wall of the cargo carrier 108. Cargo items 110 from the main conveyor 106 are transported to the robot 102 via the extendable conveyor 104. The EoAT 206 is positioned close to a bottom corner of the back wall, and the EoAT places the cargo item 110 onto the floor of the cargo carrier 108. The EoAT 206 move horizontally along the floor of the cargo carrier 108 to form a single row 4704 of the cargo items 110. The EoAT 206 is then lifted to a position so that the next level of cargo items 110 can be placed or stacked on top of the previously placed cargo items 110 in the row 4704. The EoAT 206 is moved in an S-shaped or raster pattern to complete the row 4704 of cargo items 110. Once the row 4704 is complete, the robot 102 is driven backwards so that the EoAT 206 can form the next row 4704 of cargo items 110. The same packing process continues until the cargo carrier 108 is fully loaded with the cargo items 110.

Figure 49:
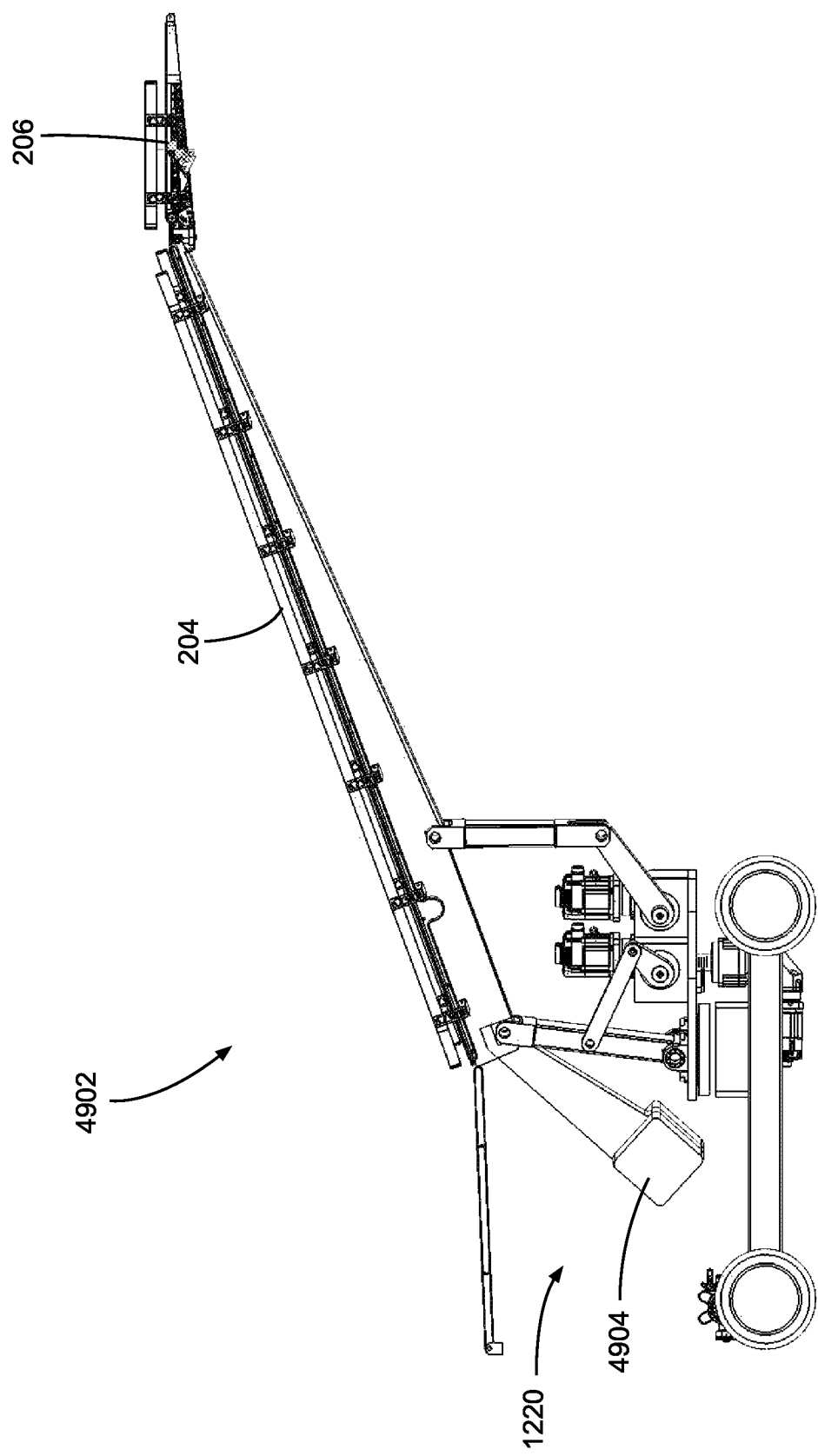
FIG. 49 is a partial side cross-sectional view of another alternative of an automated unloading and loading robot used in the FIG. 1 system.

FIG. 49 shows an example of another type of automated loading and unloading robot 4902 that can be used in the system 100. The robot 4902 in FIG. 49 has most of the same components as that of the robot 102 illustrated in FIG. 2, and for the sake of clarity as well as brevity, these common components will not be discussed, but reference is made to the previous discussion. The only difference between the robot 4902 in FIG. 49 and the previously discussed robot 102 is that the robot 4902 in FIG. 49 includes a counterbalance arm 4904 instead of the air springs 1222 for the mast counterbalance system 1220. The counterbalance arm 4904 is designed to provide enough weight to provide a counterbalance to the weight of the mast 204 and EoAT 206 and any cargo items 110. It should be recognized that in other examples other types of counterbalance systems 1220 can alternatively or additionally be used.

Figure 50:
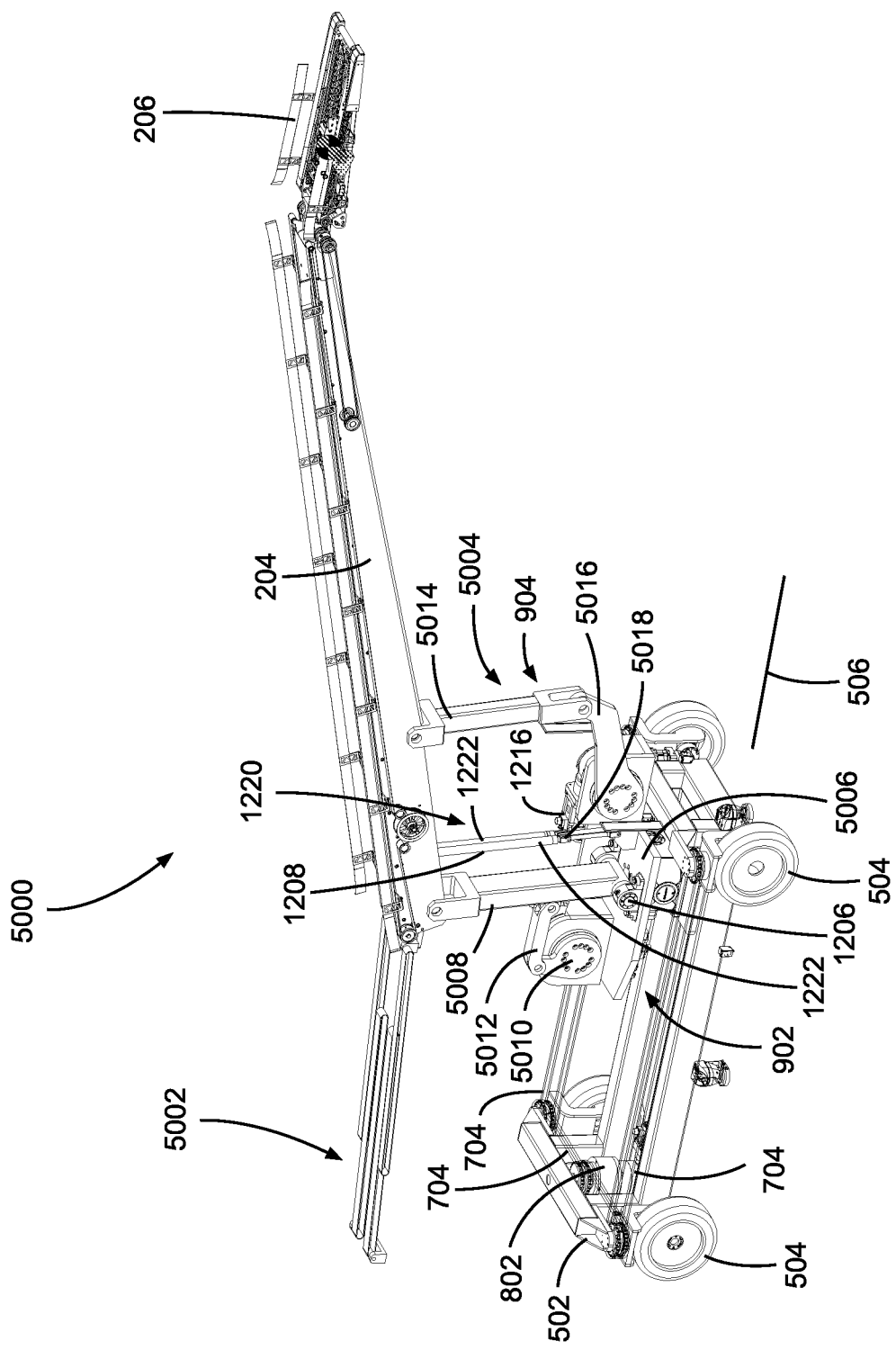
FIG. 50 is a partial, perspective view of an automated unloading and loading robot that can be used in the FIG. 1 system.

FIG. 50 illustrates a perspective view of a robot 5000 according to another example. In FIG. 50, selected components such as the controllers 210 and the base unit housing 224 have been removed to improve visibility. As will be appreciated, the robot 5000 has most of its components in common with the previously discussed robot 102, such as the mast 204 and EoAT 206. For the sake of clarity as well as brevity, these common components will not be discussed again below. The robot 5000 has a base unit 5002 that is constructed in a fashion similar to the one previously discussed. Like before, the base unit 5002 has the frame 502, wheels 504, steering chains 704, and steering motor 802. In the illustrated example, the chains 704 not only link the rear wheels 504 to the steering motor 802 but also the front wheels 504 so that the steering motor 802 is able to steer both sets of wheels 504. The base unit 5002 further includes the mast yaw control subsystem 902 and mast pitch-extension control subsystem 904 with subcomponents that are slightly different than those described before.

As shown, the mast pitch-extension control subsystem 904 in the mast actuator system 212 include linkages 5004 that connect the mast 204 to a mast base 5006. The height of the mast 204 (relative to the floor) at a neutral, level position is set so that the EoAT 206 is positioned at or near the middle of an average stack height of cargo items 110 in the cargo carrier 108. In the illustrated example, the mast pitch-extension control subsystem 904 includes a pair of rocker mechanisms for moving the mast 204. The rocker mechanisms are formed by the linkages 5004, and these linkages 5004 in part include a mast extension arm 5008 that is pivotally connected to the mast base 5006 at one end via an extension arm coupling (or bearings) 1206 and pivotally connected to the mast 204 at the other end. Pivotal movement of the mast extension arm 5008 causes the mast 204 along with the EoAT 206 to move horizontally in the longitudinal direction 506 of the robot 5000. In other words, pivoting of the mast extension arm 5008 causes the EoAT 206 to extend or retract while the base unit 5002 remains stationary, if so desired. To facilitate this, the extension drive 1208 has an extension crank 5010 that is connected to the mast extension arm 5008 via an extension link 5012. As the extension drive 1208 rotates the extension crank 5010, the mast extension arm 5008 pivots about the extension arm coupling 1206 to extend or retract the EoAT 206 via the mast 204.

A mast pitch arm 5014 is used to control the pitch or vertical movement of the mast 204. The pitch drive 1216 is operatively connected to the mast pitch arm 5014 via a pitch crank 5016. The pitch drive 1216 is able to control the pitch of the mast 204 via the pitch crank 5016 and mast pitch arm 5014. This in turn allows the pitch drive 1216 to control the vertical location of the EoAT 206. As noted before, the extension drive 1208 via the mast extension arm 5008 typically, but not always, works in conjunction with the pitch drive 1216 to ensure that the EoAT 206 is properly positioned so as to still be able to engage with the cargo items 110 as the pitch of the mast 204 changes. The mast counterbalance system 1220 in the illustrated example includes two air springs 1222 that are coupled between the mast 204 and the mast base 5006. As shown, the mast base 906 includes air spring connectors 5018 to which the air springs 1222 are pivotally connected. In the illustrated example, the mast counterbalance system 1220 includes a pair of the air springs 1222, but more or less can be used in other examples. In the depicted example, the air springs 1222 are connected to the mast 204 between the mast extension arm 5008 and the mast pitch arm 5014.

Figure 51:
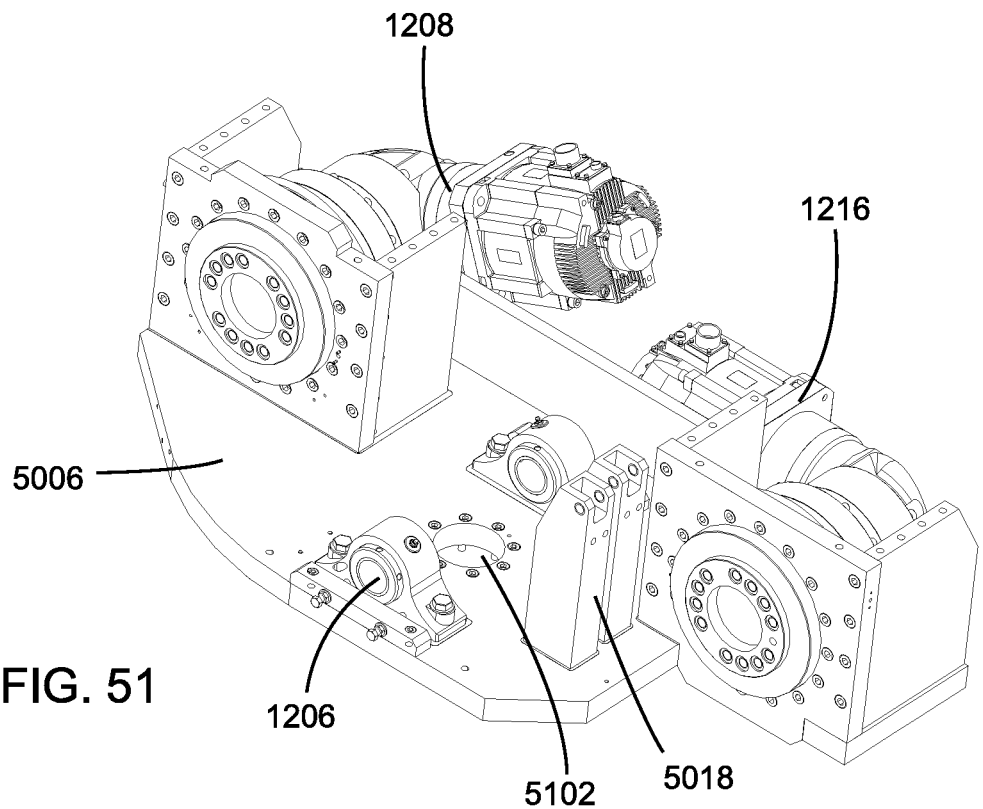
FIG. 51 is a top perspective view of a mast base found in the FIG. 50 robot.
Figure 52:
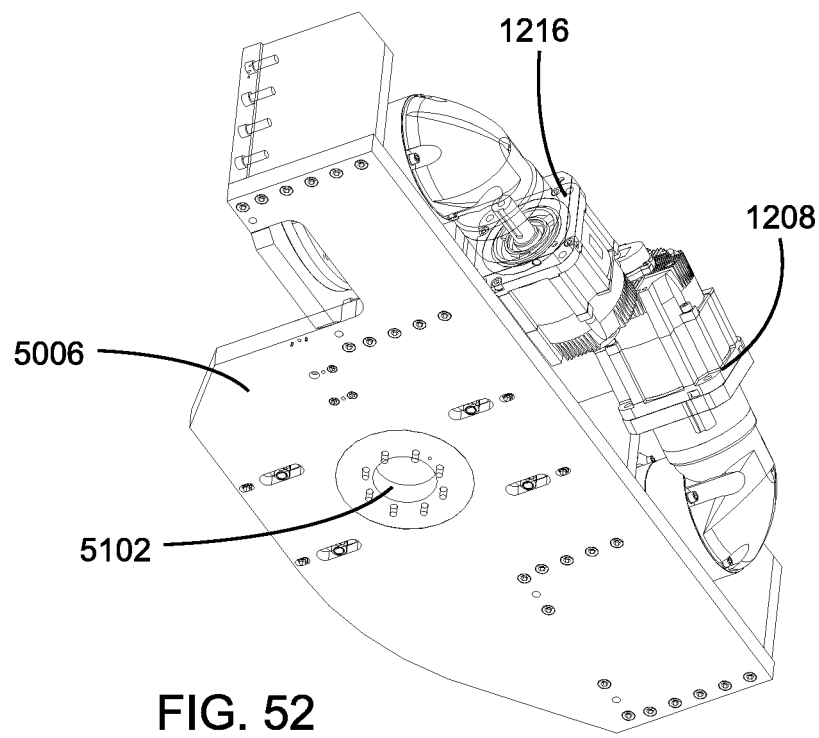
FIG. 52 is a bottom perspective view of the FIG. 51 mast base.

FIGS. 51 and 52 respectively illustrate top and bottom perspective views of the mast base 5006. The mast base 5006 includes a connector section 5102 where the mast base 5006 is connected to a mast yaw drive gearbox 5302 that is powered by the mast yaw drive motor 5304. In one form, the connector section 5102 of the mast base 5006 is bolted to the mast yaw drive gearbox 5302, but these components can be connected in other ways. The mast yaw drive gearbox 5302 is mounted to the frame 502. Through the mast yaw drive gearbox 5302, the mast yaw drive motor 5304 is able to change the yaw of the mast 204 which in turn changes the location of the EoAT 206.

Figure 53:
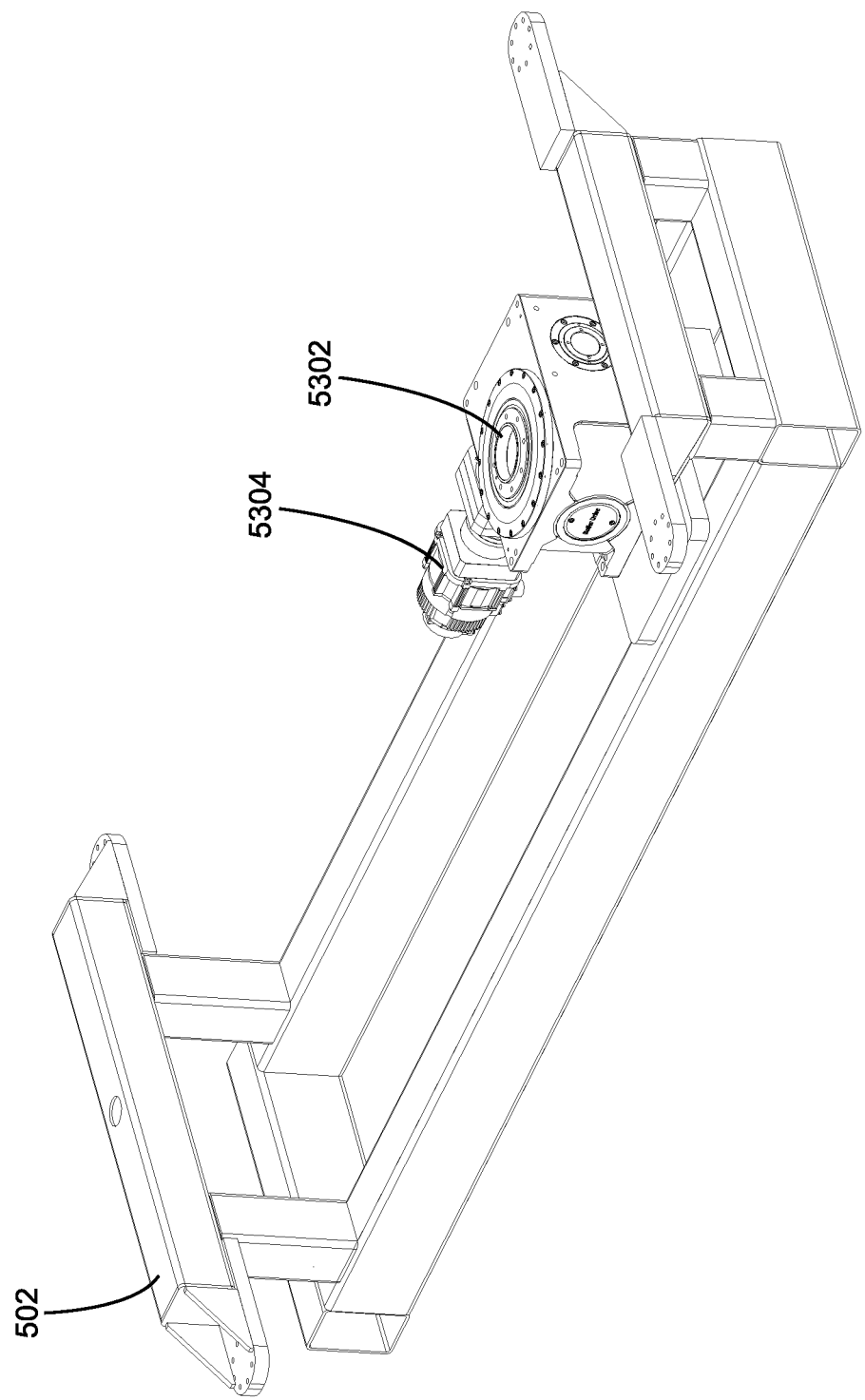
FIG. 53 is a perspective view of the frame and mast yaw drive system found in the FIG. 50 robot.
Figure 54:
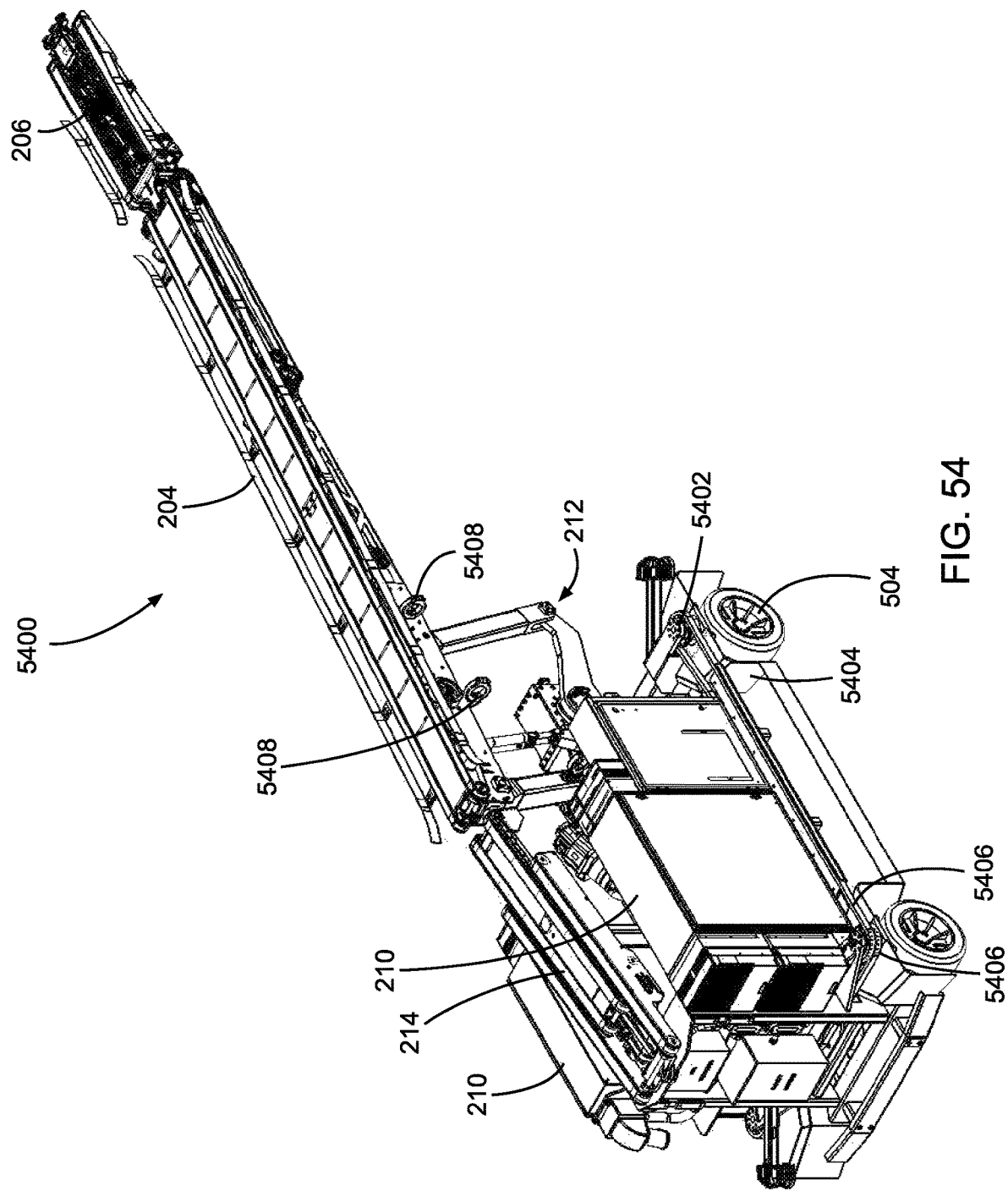
FIG. 54 is a partial, perspective view of another automated unloading and loading robot that can be used in the FIG. 1 system.
Figure 55:
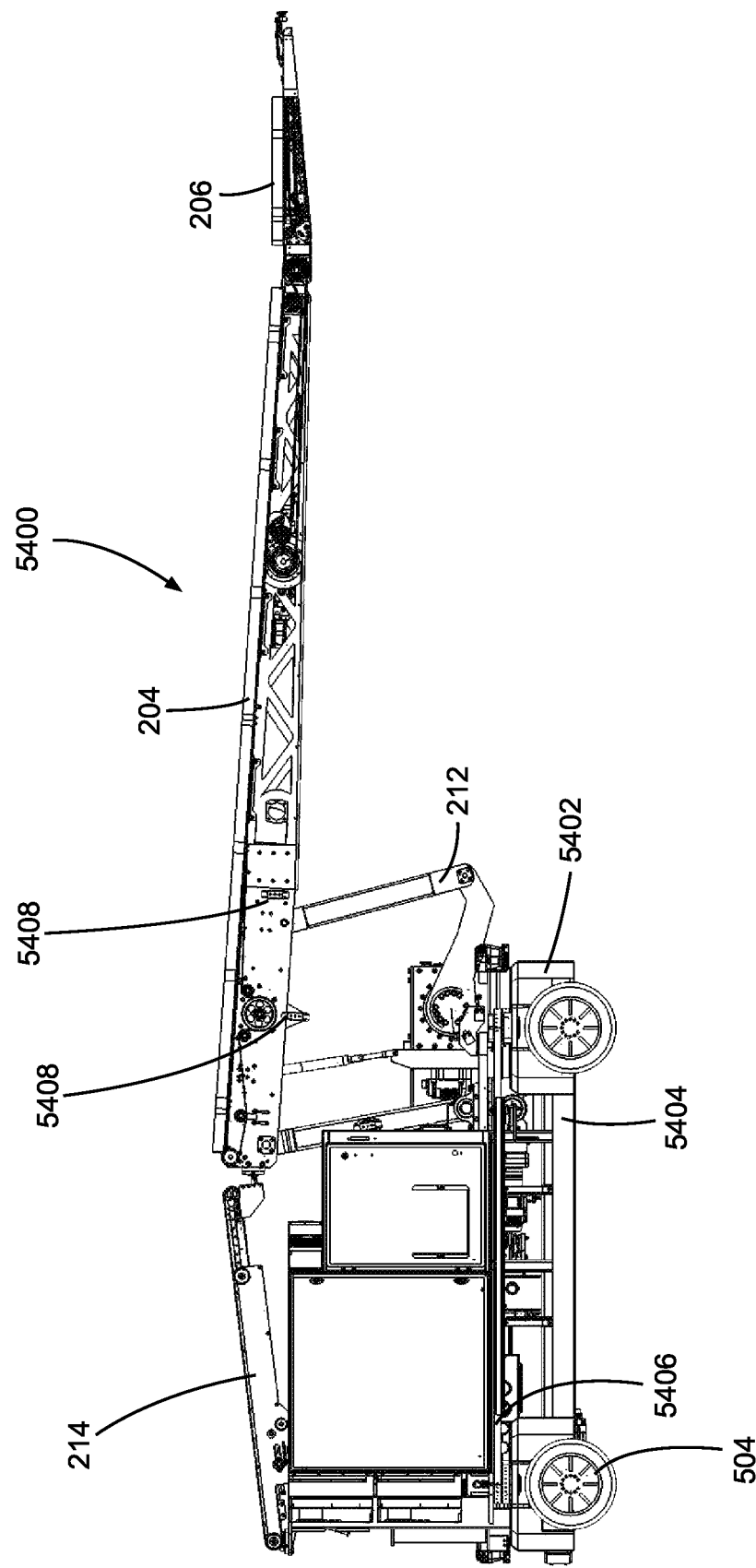
FIG. 55 is a side view of the FIG. 54 robot.

FIG. 54 illustrates a perspective view of a robot 5400 according to another example. In FIGS. 54, 55, 56, and 57, selected components such as the base unit housing 224 have been removed to improve visibility. As will be appreciated, the robot 5400 has most of its components in common with the previously discussed robots 102, 5000, such as the mast 204, EoAT 206, controllers 210, actuator system 212, and base unit conveyor 214, with just a few modifications. For the sake of clarity as well as brevity, these common components will not be discussed again below, but please refer to the previous discussion of these common features. The robot 5400 has a base unit 5402 that is constructed in a fashion similar to the ones previously discussed. Like before, the base unit 5402 has a frame 5404, wheels 504, steering belts or chains 5406, and the steering motor 802. In the illustrated example, steering belts 5406 are used to steer the wheels 504 via the steering motor 802, but in other examples, chains can be used to steer the wheels 504 in the same manner as described before. The steering belts 5406 not only link the rear wheels 504 to the steering motor 802 but also the front wheels 504 so that the steering motor 802 is able to steer both sets of wheels 504. The wheels 504 are able to be turned at least ninety degrees (90°) relative to the longitudinal axis of the robot 5400 so that the robot 5400 is able to move laterally between loading docks. In the example illustrated in FIG. 57, cater-corner wheels 504 are powered by wheel motors 604, and the other wheels 504 are unpowered. This configuration helps enhance movement of the robot 5400 and reduces issues in coordinating operation of the wheel motors 604. Looking at FIGS. 54 and 55, the mast 204 and other components of the robot 5400 in the illustrated example have guides 5408 that are configured to guide cables and/or hoses of the robot 5408. In a similar fashion as described before with respect to FIG. 53, the mast yaw drive motor 5304 is able to change the yaw of the mast 204 which in turn changes the location of the EoAT 206

Figure 58:
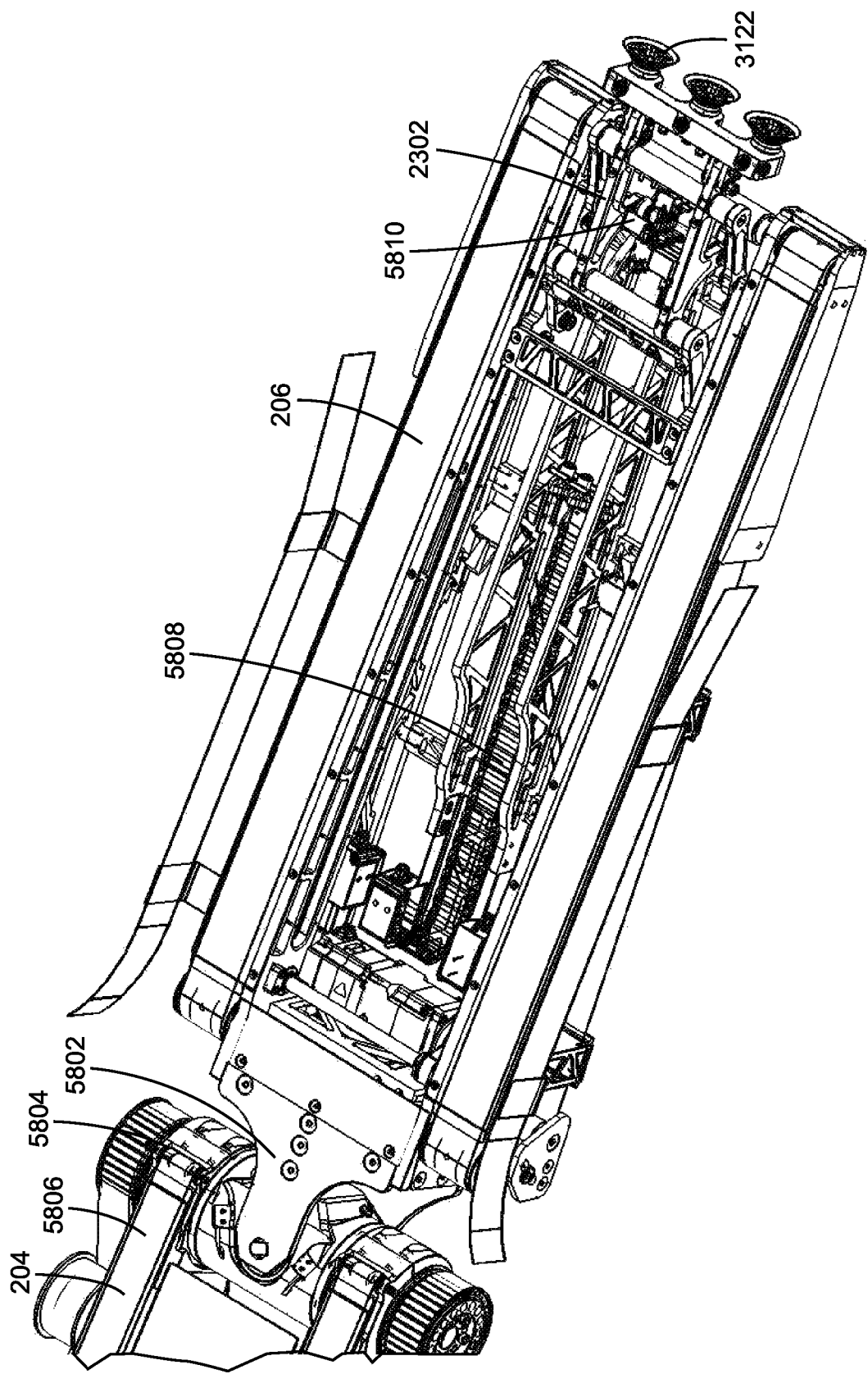
FIG. 58 is an enlarged top perspective view at an EoAT end of the FIG. 54 robot.

FIG. 58 shows an enlarged top perspective view of the robot 5400 at the EoAT 206. The EoAT 206 is configured and operates in the same manner as described before, but the EoAT 206 has an EoAT pitch-yaw actuator joint 5802 connected between the EoAT 206 and the mast 204 that is configured slightly differently than the ones described before. For example, the joint 5802 has mast conveyor pulleys 5804 around which conveyor belts 5806 for the mast are looped. With this configuration, the mast conveyor belts 5806 can be positioned closer to the EoAT 206 so as to minimize conveyor belt gapping between the mast 204 and EoAT 206. FIG. 58 further shows additional components of the EoAT 206, such as such a cable track or race 5808 and one or more vacuum control valves 5810 that control the vacuum to the individual vacuum cups 3122 on the gripper mechanism 2302. Like before, the EoAT pitch-yaw actuator joint 5802 is able to control the pitch 1804 and yaw 1806 (FIG. 18) movement of the EoAT 206.

Figure 59:
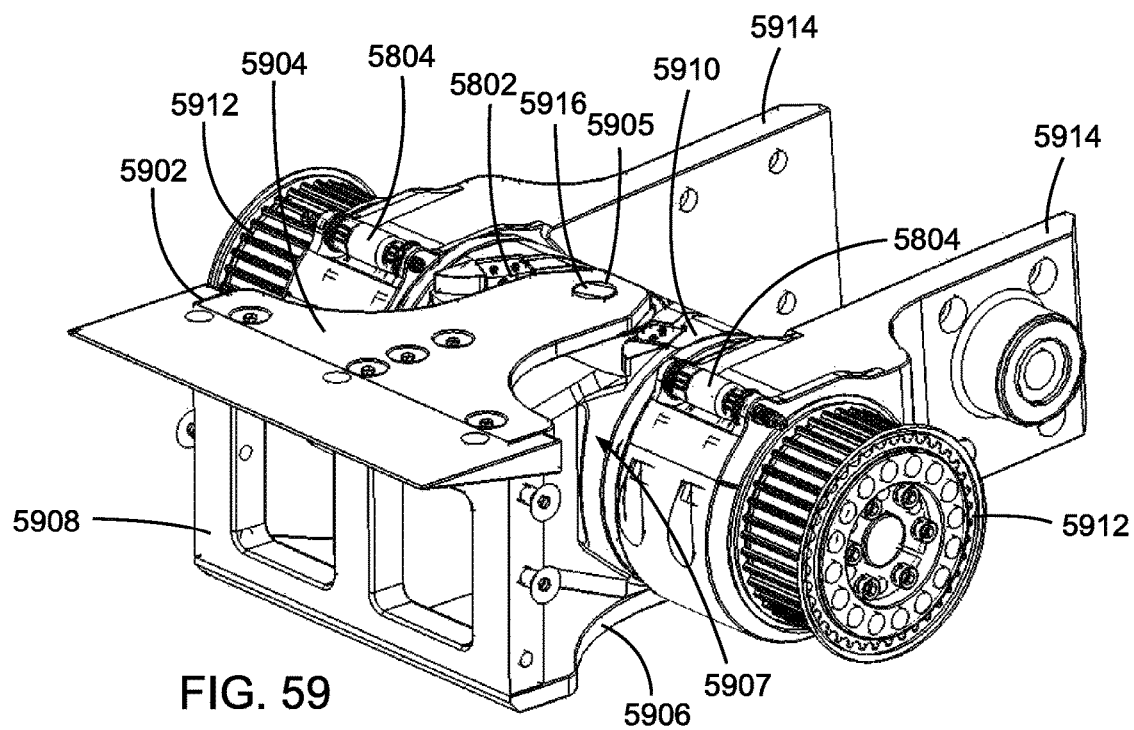
FIG. 59 is a top perspective view of an EoAT pitch-yaw actuator joint found in the FIG. 54 robot.
Figure 60:
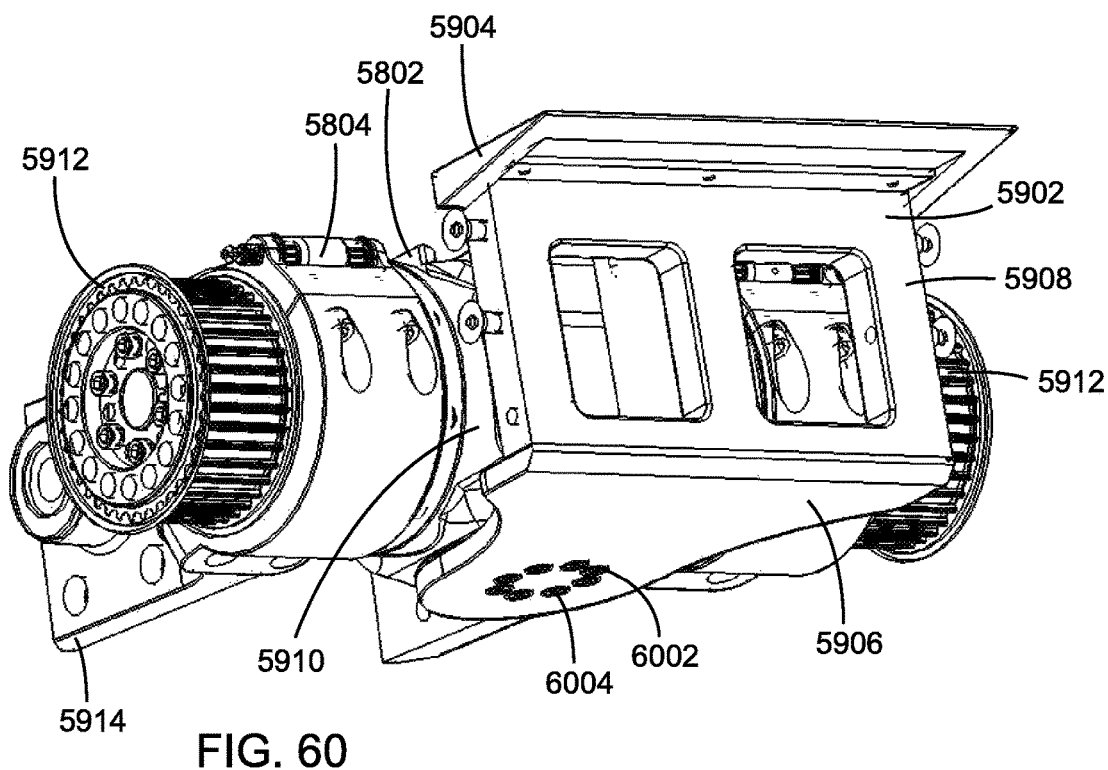
FIG. 60 is a bottom perspective view of the FIG. 60 EoAT pitch-yaw actuator joint.

FIGS. 59 and 60 respectively show top and bottom perspective views of the EoAT pitch-yaw actuator joint 5802. The joint 5802 includes an EoAT bracket 5902 that is secured to the EoAT 206 such as via bolts and/or in other manners. The EoAT bracket 5902 has a first flange 5904 with a pivot pin opening 5905, a second flange 5906, and a connector plate 5908 that connects the first 5904 and second 5906 flanges together. The first flange 5904 and the second flange 5906 define a bracket cavity 5907. The joint 5802 further includes a pivot block or housing 5910 positioned in the bracket cavity 5907, one or more drive pulleys 5912, and one or more shaft bearing guides 5914. In the illustrated example, the shaft bearing guides 5914 are sandwiched between the drive pulleys 5912 and the pivot housing 5910. The shaft bearing guides 5914 are configured to secure the yaw-actuator joint 5802 to the mast 204 such as via bolts and/or in other manners. The pivot pin opening 5905 in the first flange 5904 is configured to receive a yaw pivot pin or shaft 5916. Turning to FIG. 60, the second flange 5906 has one or more bolt opening 6002 that are configured to receive one or more bolts 6004. In the illustrated example, the bolt opening 6002 are arranged in a circular pattern. The bolts 6004 transmit torque from the internal workings of the yaw-actuator joint 5802 in order to adjust the yaw of the EoAT 206. As should be appreciated, other types of fasteners or systems for securing can be used to transfer torque in other examples besides the bolts 6004.

Figure 61:
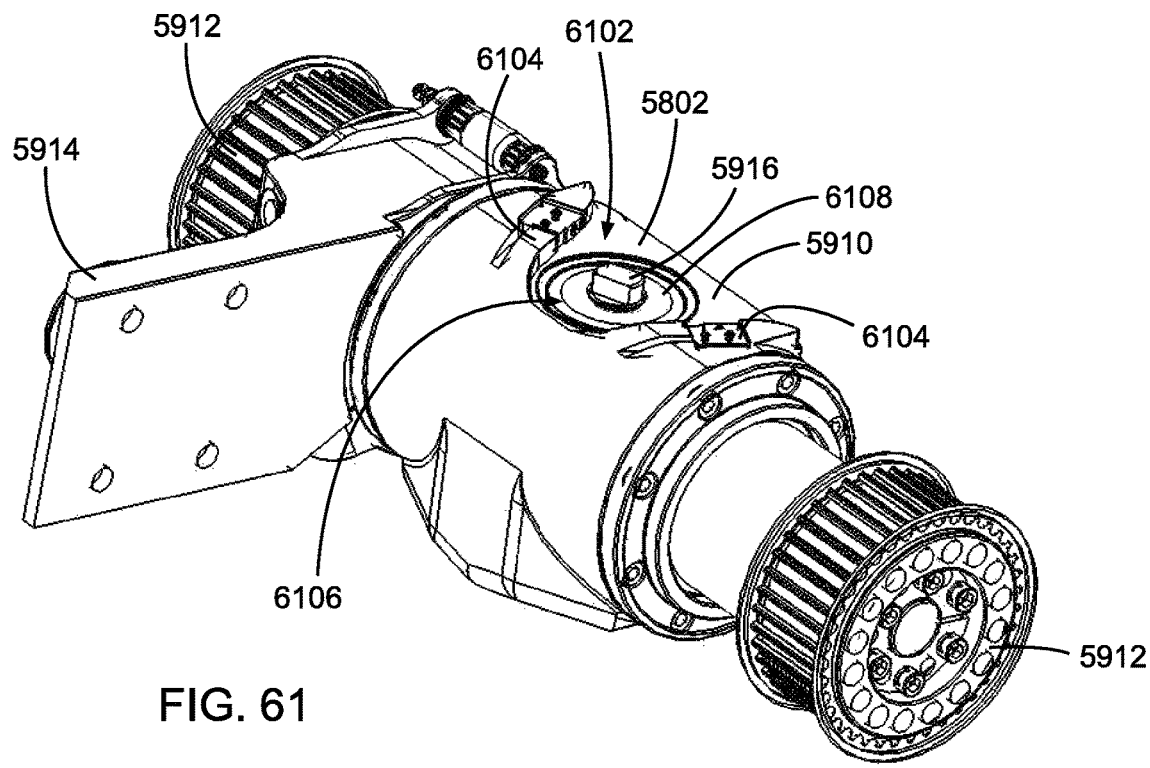
FIG. 61 is a first partial perspective view of the FIG. 60 EoAT pitch-yaw actuator joint.

FIG. 61 shows a partial perspective view of the yaw-actuator joint 5802 with selected components removed to enhance visibility. The pivot housing 5910 has a flange cavity 6102 in which the first flange 5904 is received. On opposing sides of the flange cavity 6102, the pivot housing 5910 has stop surfaces 6104 that can limit the rotational movement of the first flange 5904 which in turn limits the yaw movement of the EoAT 206. The pivot housing 5910 further defines a shaft bearing cavity 6106 in which a shaft bearing or guide 6108 facilitates rotation of the yaw pivot shaft 5916.

Figure 62:
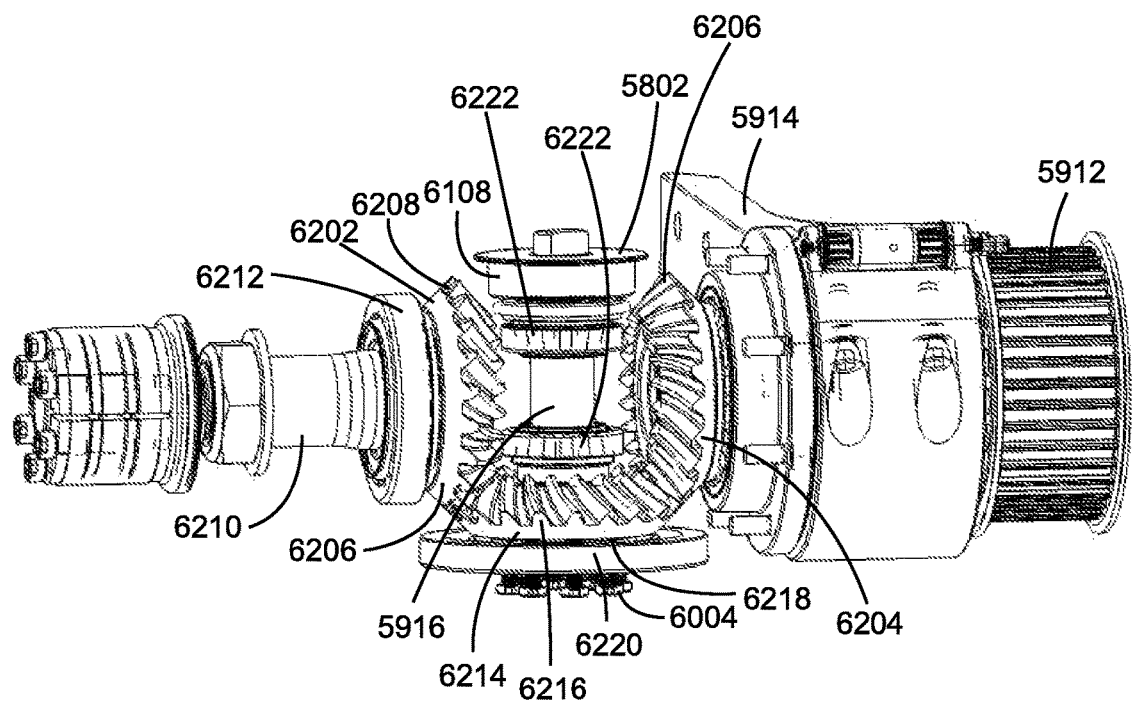
FIG. 62 is a second partial perspective view of the FIG. 60 EoAT pitch-yaw actuator joint.

FIG. 62 shows a perspective view of the yaw-actuator joint 5802 with the pivot housing 5910 and other components removed. As shown in FIG. 62, the joint 5802 includes one or more pinion gears 6202 that engage a rack gear 6104. In the illustrated example, two pinion gears 6202 engage the rack gear 6104 on opposite sides of the yaw pivot shaft 5916, but other examples can include more or less gears 6202, 6104. The pivot pin gears 6202 each include a gearhead 6206 with gear teeth 6208 that engage the rack gear 6104 and a gear shaft 6110 that connects the gearhead 6206 to the drive pulley 5912. In the illustrated example, the gear teeth 6208, 6216 are helical type gear teeth to ensure proper engagement, especially when high torques are applied, but other types of teeth arrangements can be used in other examples. In the illustrated example, the pinion gears 6202 and the rack gear 6204 are in a battle gear type arrangement, but these gears 6202, 6204 can be arranged differently in other examples. Bearings 6112 along the shaft 6110 facilitate rotation of the pinion gear 6102 within the pivot housing 5910. The rack gear 6104 has a gearhead 6114 with gear teeth 6116 that engage the teeth 6108 of the pinion gear 6102 and a gear shaft 6118 that is secured to the second flange 5906 of the EoAT bracket 5902 via the bolts 6004 (FIG. 60). A cover bearing 6220 surrounds the gear shaft 6218 of the rack gear 6204 to allow the rack gear 2104 to rotate relative to the pivot housing 5910. Bearings 6222 around the pin 5912 allow the shaft 5916 to rotate relative to the housing 5910 and the rack gear 6204.

Figure 63:
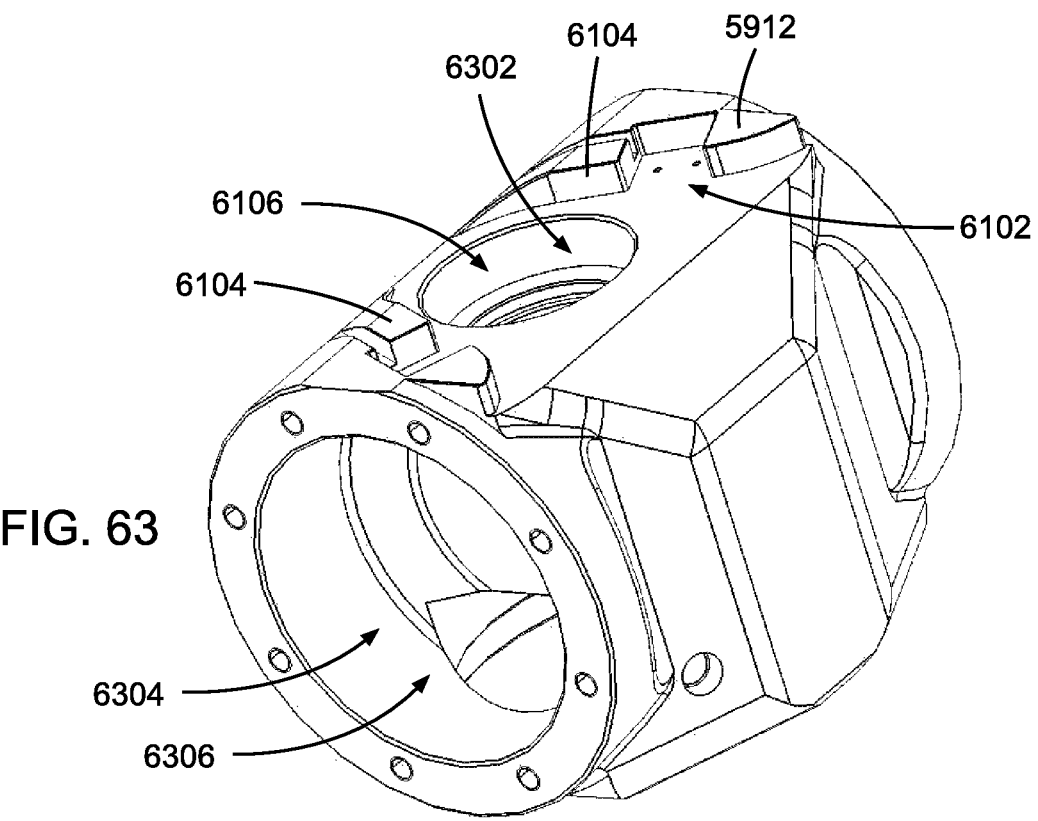
FIG. 63 is a top perspective view of a pivot block or housing in the FIG. 60 EoAT pitch-yaw actuator joint.
Figure 64:
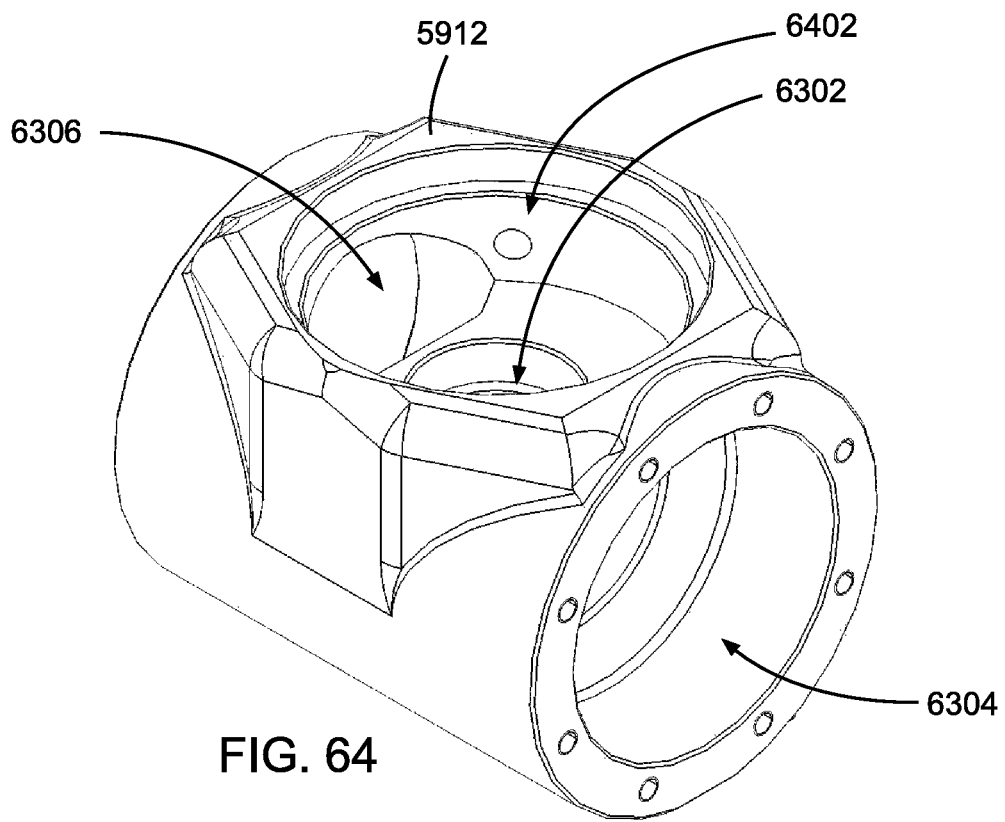
FIG. 64 is a bottom perspective view of the FIG. 63 pivot housing.

FIGS. 63 and 64 respectively show top perspective and bottom perspective views of the pivot housing 5912. As shown, the pivot housing 5912 at the shaft bearing cavity 6106 defines a shaft channel 6302 that extends completely through the pivot housing 5912 so as to receive the yaw pivot shaft 5916. Transverse or perpendicular to the shaft channel 6302, the pivot housing 5912 has opposing pinion cavities 6304 in which the pinion gears 6202 are disposed. Generally around the shaft channel 6302, the pinion cavities 6304 are closed by the pivot housing 5912, but proximal to be rack gear 6204 the pinion cavity 6304 defines gear engagement channel 6306 through which the pinion gears 6202 are able to engage the rack gear 6204. Looking at FIG. 64, the gear engagement channel 6306 from the pinion cavity 6304 opens into rack cavity 6402 where the rack gear 6204 is disposed.

Figure 65:
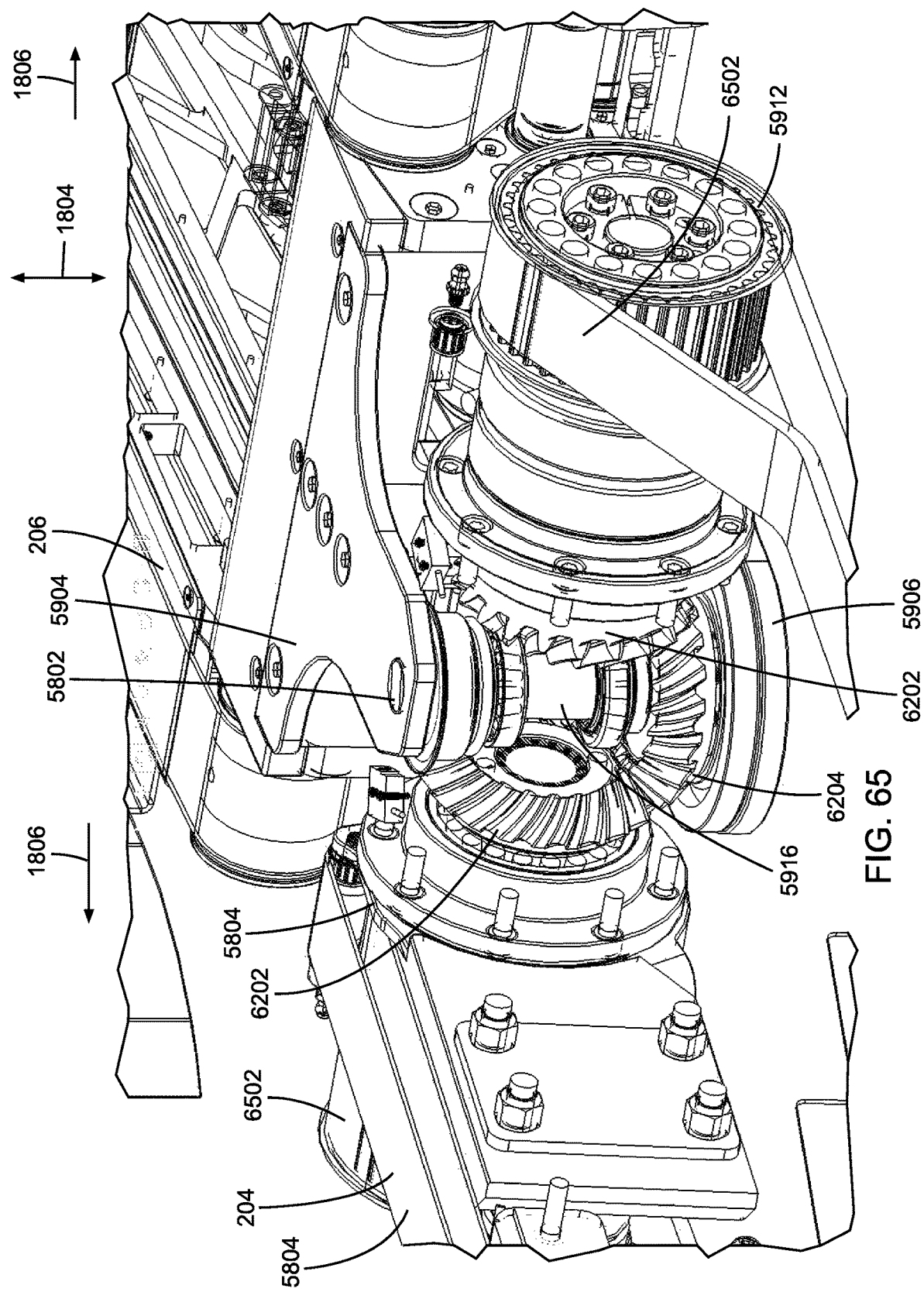
FIG. 65 is a partial perspective view of the FIG. 60 EoAT pitch-yaw actuator joint when coupled to the EoAT.

Operation of the yaw-actuator joint 5802 will now be described with reference to FIG. 65. The pinion 6202 and rack 6204 gears can rotate in both directions (i.e., clockwise or counterclockwise). The pinion gears 6202 are rotated by the drive pulleys 5912, and the drive pulleys 5912 are in turn rotated by drive belts 6502. With the drive belts 6502, the pinion gears 6202 can be rotated in a clockwise or counterclockwise direction. Each of the pinion gears 6202 are able to be rotated independently of one another by the drive belts 6502 so as to control both the pivotal and yaw orientation of the EoAT 206. To make a point of clarification in the following description, the pinion gears 6202 will be described as rotating in the "same direction" or in the "opposite direction." Since the pinion gear 6202 are facing one another, the rotational direction referred to in this description is from the same, one perspective, that is, as viewed from the back of one of the pinion gears 6202 and the front of the other or opposing pinion gear 6202. For example, when described rotating in the "same direction," the face (or front) of the gearhead 6206 with teeth 6208 of one of the pinion gears 6202 can rotate in a clockwise direction, and the back of the gearhead 6206 (i.e., facing the drive pulley 5912) likewise rotates in a clockwise direction as viewed from the same, single perspective. Conversely, when describing rotation in the "opposite direction," the face of the gearhead 6206 of one of the pinion gears 6202 can rotate in a clockwise direction, and the back of the opposite gearhead 6206 rotates in the opposite, counterclockwise direction when viewed from a single perspective. As might be appreciated, having the pinion gears 6202 described with reference to two different perspectives (i.e., the face of each pinion gear 6202) would make the description a bit confusing, so the rotational directions of the pinion gear 6202 will be described with respect to the one static perspective. For instance, in the case where the pinion gears 6202 rotate in the same direction, when viewed from the face of each of the gearheads 6206 (i.e., from the perspective of the yaw pivot shaft 5916), one of the pinion gears 6202 would rotate in a clockwise direction and the other would rotate in a counterclockwise direction. Again, for the purposes of the description below, the terms "same direction" and "opposite direction" when referring to the rotational direction of the pinion gears 6202 is from a single viewpoint.

The yaw-actuator joint 5802 is configured to move the EoAT 206 in the pitch 1804 and/or yaw 1806 directions relative to the mast 204. To move the EoAT 206 in the pitch direction 1804, the pinion gears 6202 are rotated in the same direction such that the rack gear 6204 does not rotate which in turn creates a torque that causes the EoAT 206 to pitch. For example from the perspective shown in FIG. 65, when the pinion gears 6202 are rotated in the same counterclockwise direction, the EoAT 206 pivots upwards relative to the mast 204 in the pitch direction 1804, and when the pinion gears 6202 are rotated in the same clockwise direction, the EoAT 206 pivots downwards relative to the mast 204 in the pitch direction 1804. To change the yaw of the EoAT 206 relative to the mast 204, the pinion gears 6202 are rotated in an opposite direction. For instance, when the pinion gears 6202 are rotated in the opposite direction, the rack gear 6204 rotates. As mentioned before, the rack gear 6204 is fixed to the second flange 5906 of the EoAT bracket 5902 such that when the rack gear 6204 rotates, the EoAT bracket 5902 rotates about the yaw pivot shaft 5916. This in turn causes the EoAT 206 to move in the yaw direction 1806 relative to the mast 204. The EoAT 206 can move simultaneously in both the pitch 1804 and yaw 1806 directions by having a rotational velocity differential between the pair of pinion gears 6202. As should be recognized, the gears can be configured differently in other examples such that the gears rotate in different fashions in order to move the EoAT 206 in the pitch 1804 and yaw 1806 directions. For instance, intermediate gearing can be placed between the pinion gears 6202 and the rack gears 6204 and/or oriented differently to facilitate relative movement of the EoAT 206.

Figure 66:
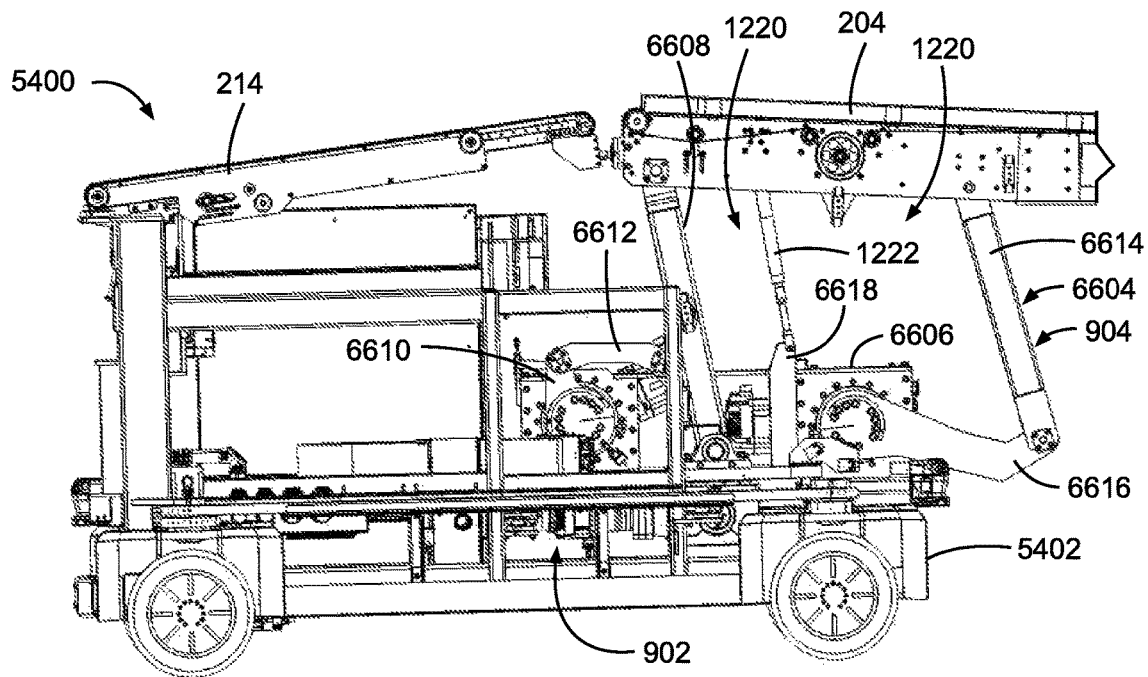
FIG. 66 is an enlarged side view of one side of the FIG. 54 robot.
Figure 67:
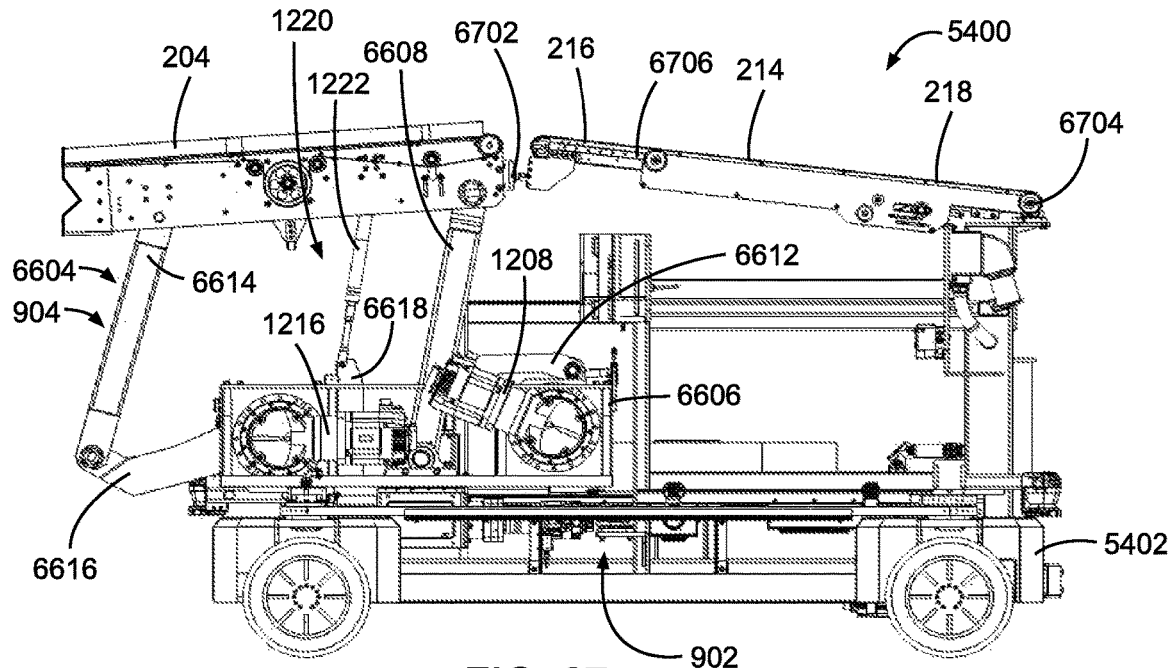
FIG. 67 is an enlarged side view of the opposite side of the FIG. 54 robot.

Turning to FIGS. 66 and 67, the base unit 5402 of the robot 5400 further includes the mast yaw control subsystem 902 and mast pitch-extension control subsystem 904 with subcomponents similar to those described with respect to FIG. 50. For the sake of clarity as well as brevity, the common components, functions, and operational modes will not be again described in detail, but please refer to the previous description.

As shown, the mast pitch-extension control subsystem 904 include linkages 6604 that connect the mast 204 to a mast base 6606. The height of the mast 204 (relative to the floor) at a neutral, level position is set so that the EoAT 206 is positioned at or near the middle of an average stack height of cargo items 110 in the cargo carrier 108. In the illustrated example, the mast pitch-extension control subsystem 904 includes a pair of rocker mechanisms for moving the mast 204. The rocker mechanisms are formed by the linkages 6604, and these linkages 6604 in part include a mast extension arm 6608 that is pivotally connected to the mast base 6606 at one end and pivotally connected to the mast 204 at the other end. Pivotal movement of the mast extension arm 6608 causes the mast 204 along with the EoAT 206 to move horizontally in the longitudinal direction 506 of the robot 5000. In other words, pivoting of the mast extension arm 6608 causes the EoAT 206 to extend or retract while the base unit 5402 remains stationary, if so desired. To facilitate this, the extension drive 1208 has an extension crank 6610 that is connected to the mast extension arm 6608 via an extension link 6612. As the extension drive 1208 rotates the extension crank 6610, the mast extension arm 6608 pivots to extend or retract the EoAT 206 via the mast 204.

A mast pitch arm 6614 is used to control the pitch or vertical movement of the mast 204. The pitch drive 1216 is operatively connected to the mast pitch arm 5014 via a pitch crank 6616. The pitch drive 1216 is able to control the pitch of the mast 204 via the pitch crank 6616 and mast pitch arm 6614. This in turn allows the pitch drive 1216 to control the vertical location of the EoAT 206. As noted before, the extension drive 1208 via the mast extension arm 6608 typically, but not always, works in conjunction with the pitch drive 1216 to ensure that the EoAT 206 is properly positioned so as to still be able to engage with the cargo items 110 as the pitch of the mast 204 changes. The mast counterbalance system 1220 in the illustrated example includes one or more air springs 1222 that are coupled between the mast 204 and the mast base 6606. As shown, the mast base 6606 includes air spring connectors 5018 to which the air springs 1222 are pivotally connected. In the illustrated example, the mast counterbalance system 1220 includes a pair of the air springs 1222, but more or less can be used in other examples. In the depicted example, the air springs 1222 are connected to the mast 204 between the mast extension arm 6608 and the mast pitch arm 6614.

Referring to FIG. 67, as the mast 204 moves the base unit conveyor 214 needs to compensate for changes in the distance, yaw, and pitch between the base unit conveyor 214 and the mast 204. As noted before, the base unit conveyor 214 includes the mast section 216 and the transition section 218 that are nested together so as to overlap. The mast section 216 is able to move in a telescoping fashion relative to the transition section 218 so as to adjust for distance changes between the end of the mast 204 and the end of the base unit 5402. In other words, the length of the base unit conveyor 214 is able to change as the mast 204 moves. The mast section 216 is connected to the transition section 218 of the mast 204 via a mast connection joint 6702. The mast connection joint 6702 is configured to compensate for both pitch and yaw changes between the mast 204 and the transition section 218 is connected to the base unit 5402 via a base connection joint 6704. The base connection joint 6704 allows the base unit conveyor 214 to move in both the pitch 1804 and yaw 1806 directions so as to compensate for the relative motion of the mast 204. A telescoping joint 6706 slidably connects the mast section 216 to the transition section 218 in a telescoping manner.

Figure 68:
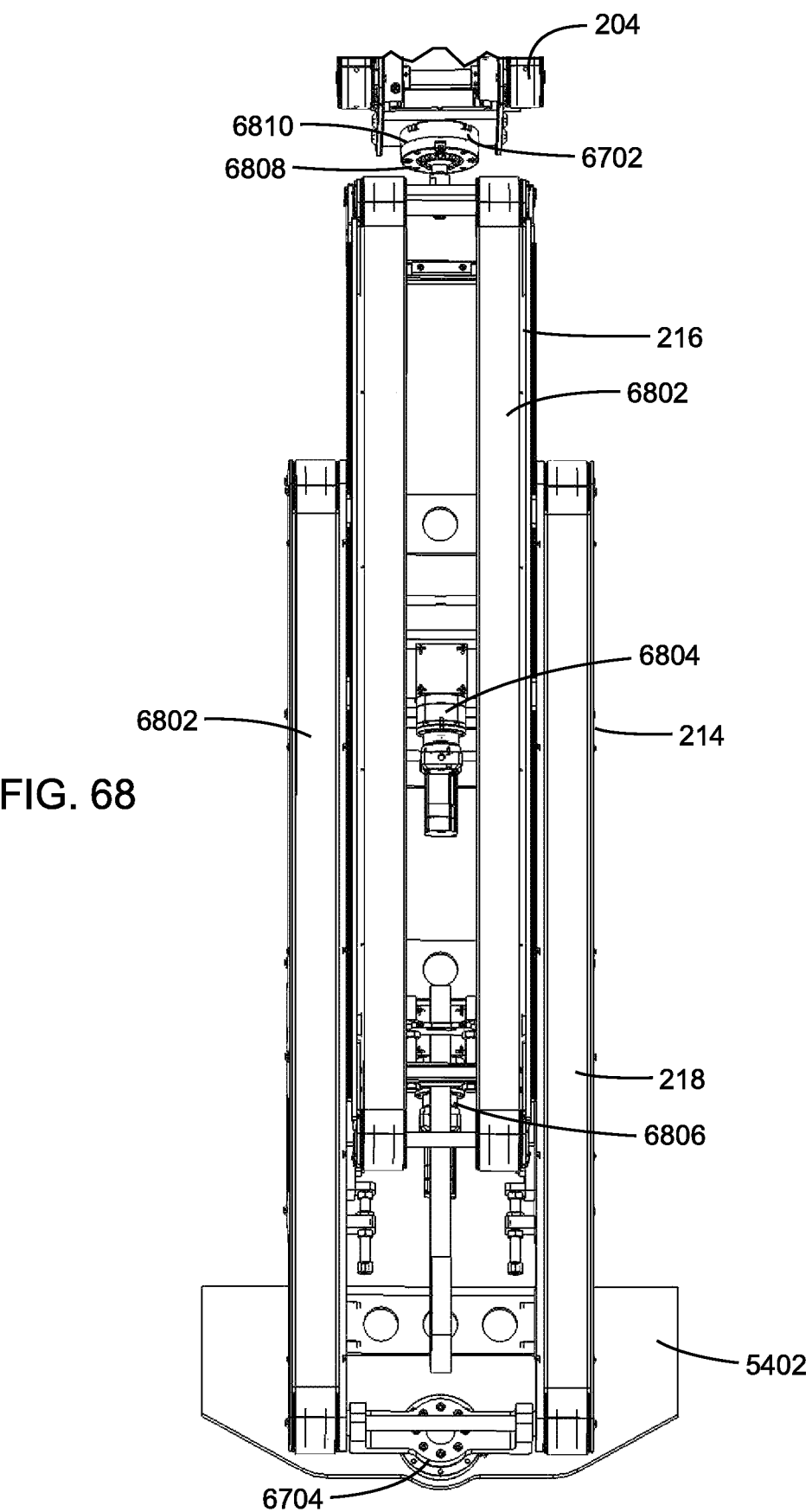
FIG. 68 is a top view of a base unit conveyor in the FIG. 54 robot.

FIG. 68 generally shows a top view of the base unit conveyor 214 extending between the base unit 5402 and the mast 204. Both the mast section 216 and the transition section 218 are self-powered such that their respective one or more conveyor belts 6802 are able to be powered independently of one another so as to operate at different speeds, if so desired. In the illustrated example, the mast section 216 has a mast belt motor 6804 that powers the conveyor belts 6802 on the mast section 216, and the transition section 218 has a transition belt motor 6806 that powers the conveyor belts 6802 on the transition section 218. The motor 6804, 6806 are operatively connected to the conveyor belts 6802 in a fashion similar to that described above with respect to the mast 204. Both the mast 216 and transition 218 sections in the depicted example have a pair of conveyor belts 6802, but in other examples, the sections 216, 218 can have more or less conveyor belts 6802 and/or can convey cargo items in other ways such as via rollers and slides, to name a few.

Figure 69:
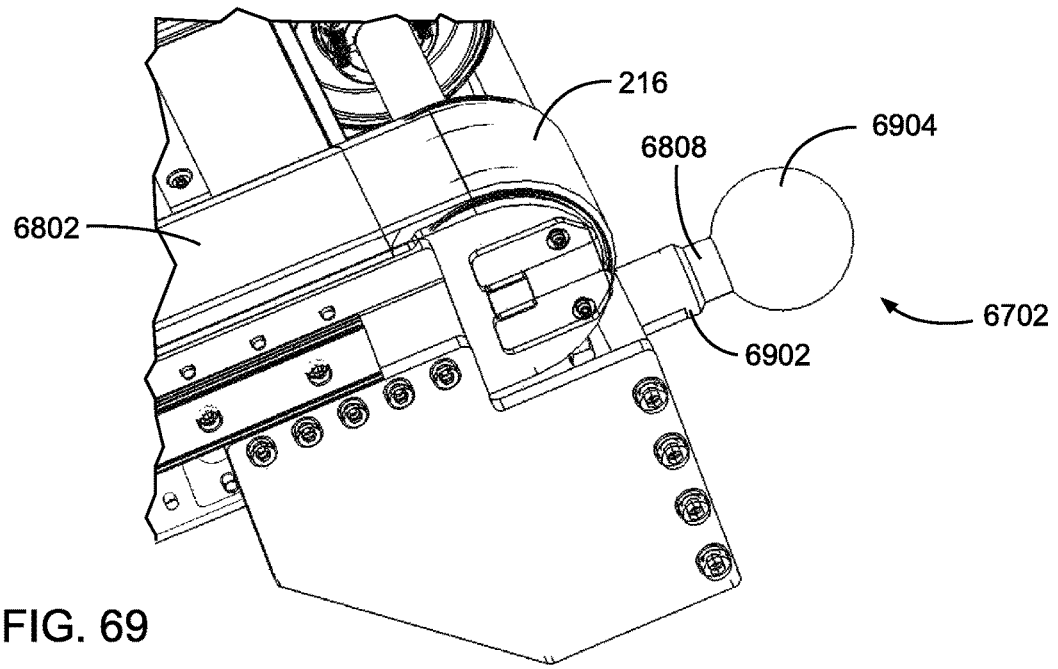
FIG. 69 is an enlarged perspective view of a ball member for a mast connection joint in the FIG. 68 base unit conveyor.

To compensate for multidirectional movement of the mast 204, the mast connection joint 6702 in the illustrated example is in the form of a ball joint. As shown, the mast connection joint 6702 includes a ball member 6808 that is received inside a socket 6810. FIG. 69 shows an enlarged perspective view of the ball member 6808. As shown, the ball member 6808 includes a stem 6902 connected to the mast section 216 and a ball 6904 that is rotatably received into the socket 6810 connected to the mast 204.

Figure 70:
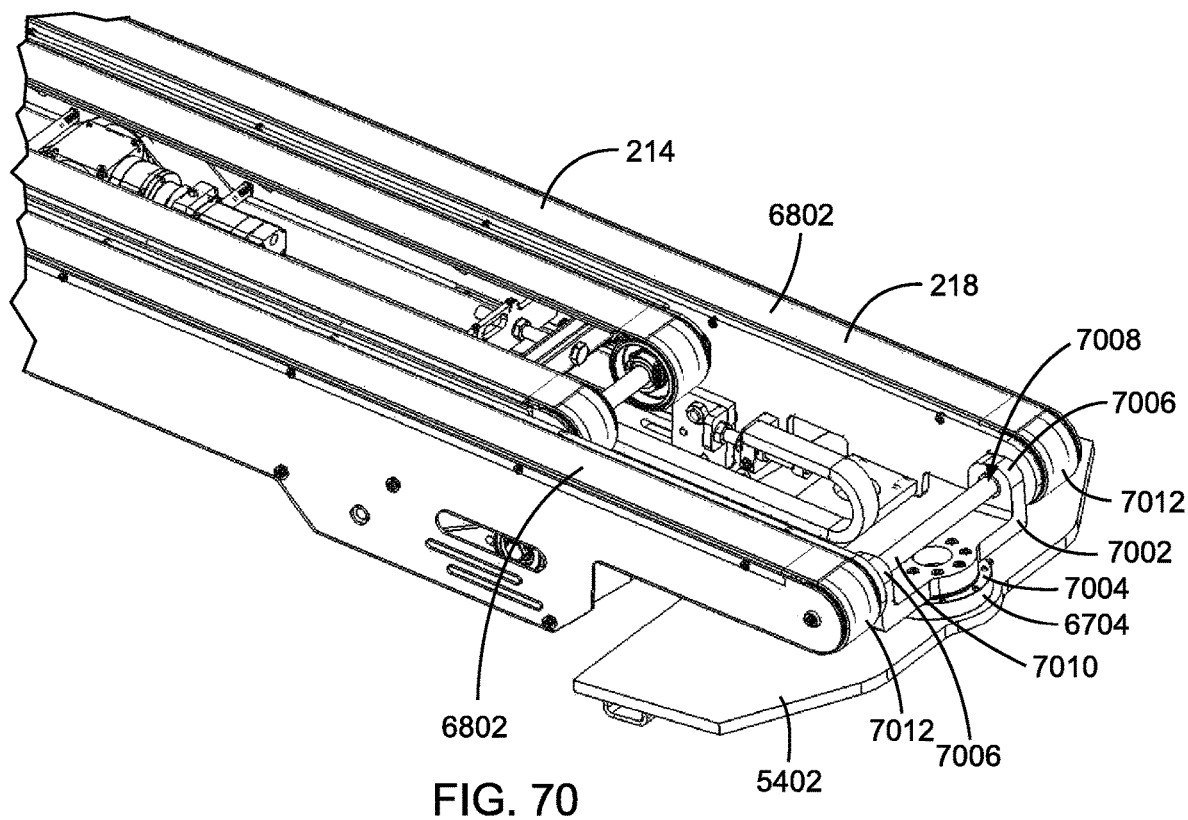
FIG. 70 is a perspective view of the FIG. 68 base unit conveyor 214 at a base connection joint.

FIG. 70 shows a perspective view of the base unit conveyor 214 at the base connection joint 6704. The base connection joint 6704 allows the base unit conveyor 214 to move both in the pitch 1804 and yaw 1806 directions. As illustrated, the base connection joint 6704 includes a conveyor shaft bracket 7002 that is rotatably coupled to the base unit 5402 via a turntable joint 7004. The turntable joint 7004 allows the base unit conveyor 214 to rotate or pivot in the yaw direction 1806. The conveyor shaft bracket 7002 allows the base unit conveyor 214 to move in the pitch direction 1804. The bracket 7002 includes one or more shaft flanges 7006 that define shaft openings 7008 that are configured to receive a conveyor pulley shaft 7010. The shaft openings 7008 in one form include bearings that reduce friction between the shaft flanges 7006 and the conveyor pulley shaft 7010. At opposite ends, the conveyor pulley shaft 7010 has a conveyor pulley 7012 around which the conveyor belts 6802 wrap as the belts 6802 to travel. The rotational connection between the shaft bracket 7002 and the shaft 7010 allows the transition section 218 to pivot in the pitch direction 1804. It is envisioned that the base connection joint 6704 can include other types of joints to facilitate movement between the base unit conveyor and the base unit 5402 in other examples.

Figure 71:
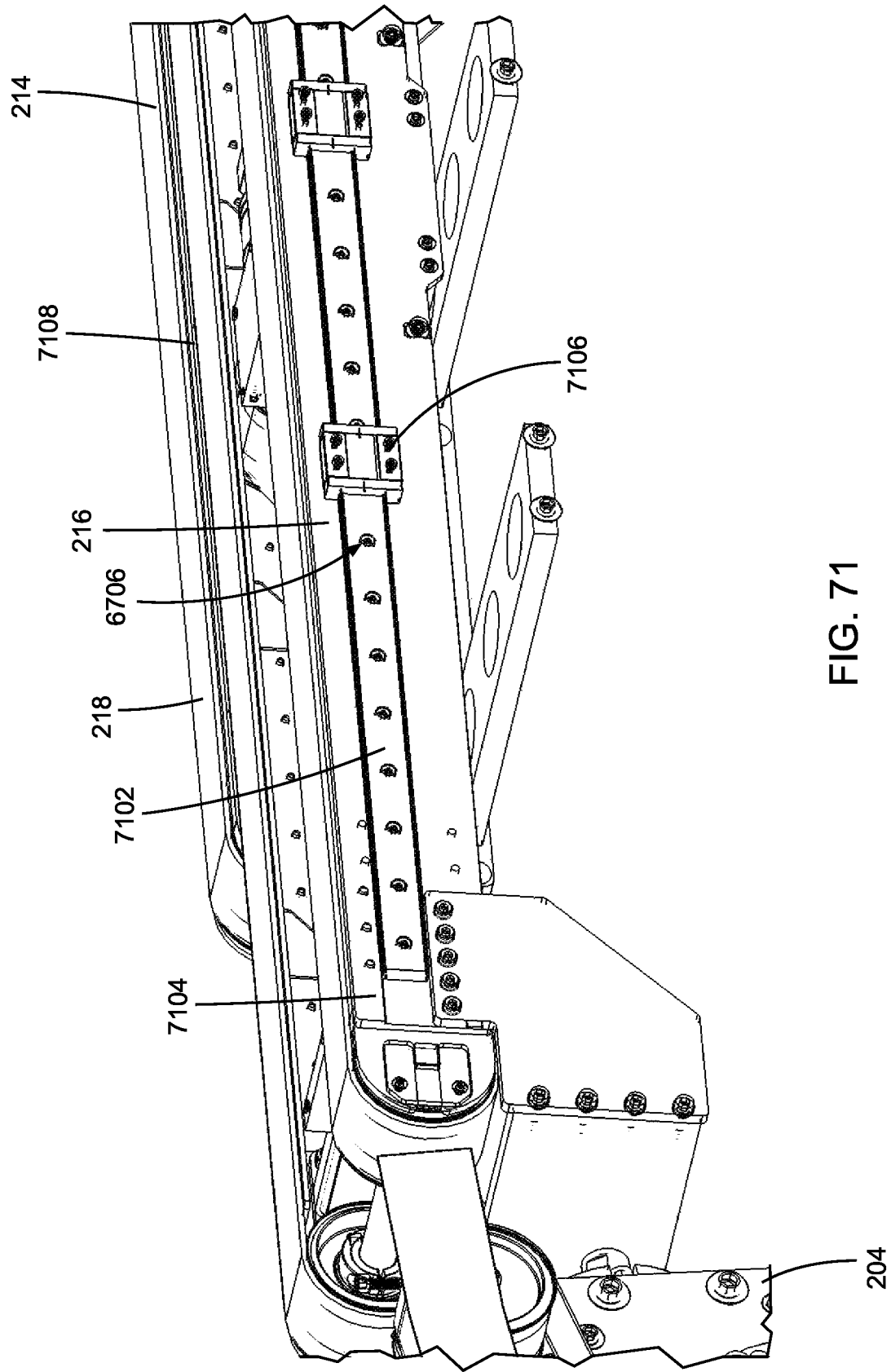
FIG. 71 is a partial perspective view of the FIG. 68 base unit conveyor.

FIG. 71 shows a perspective view of the base unit conveyor 214 with a section of the transition section 218 removed so that the telescoping joint 6706 is viewable. In the illustrated example, the telescoping joint 6706 is in the form of a bearing rail. As depicted, the telescoping joint 6706 includes a bearing rail 7102 that is secured to a frame 7104 of the mast section 216. In one form, the bearing rail 7102 is positioned on opposing sides of the mast section 216 so as to engage the transition section 218 at both sides. The transition section has a bearing slide 7106 that is secured to a frame 7108 of the transition section 218. The bearing slide 7106 engages the bearing rail 7102 such that the bearing slide 7106 is able to generally smoothly slide along the bearing rail 7102. In other examples, other types of telescopic connections can be used such as for example rack slides, compound slides, and/or dovetail type slide connections.

Figure 72:
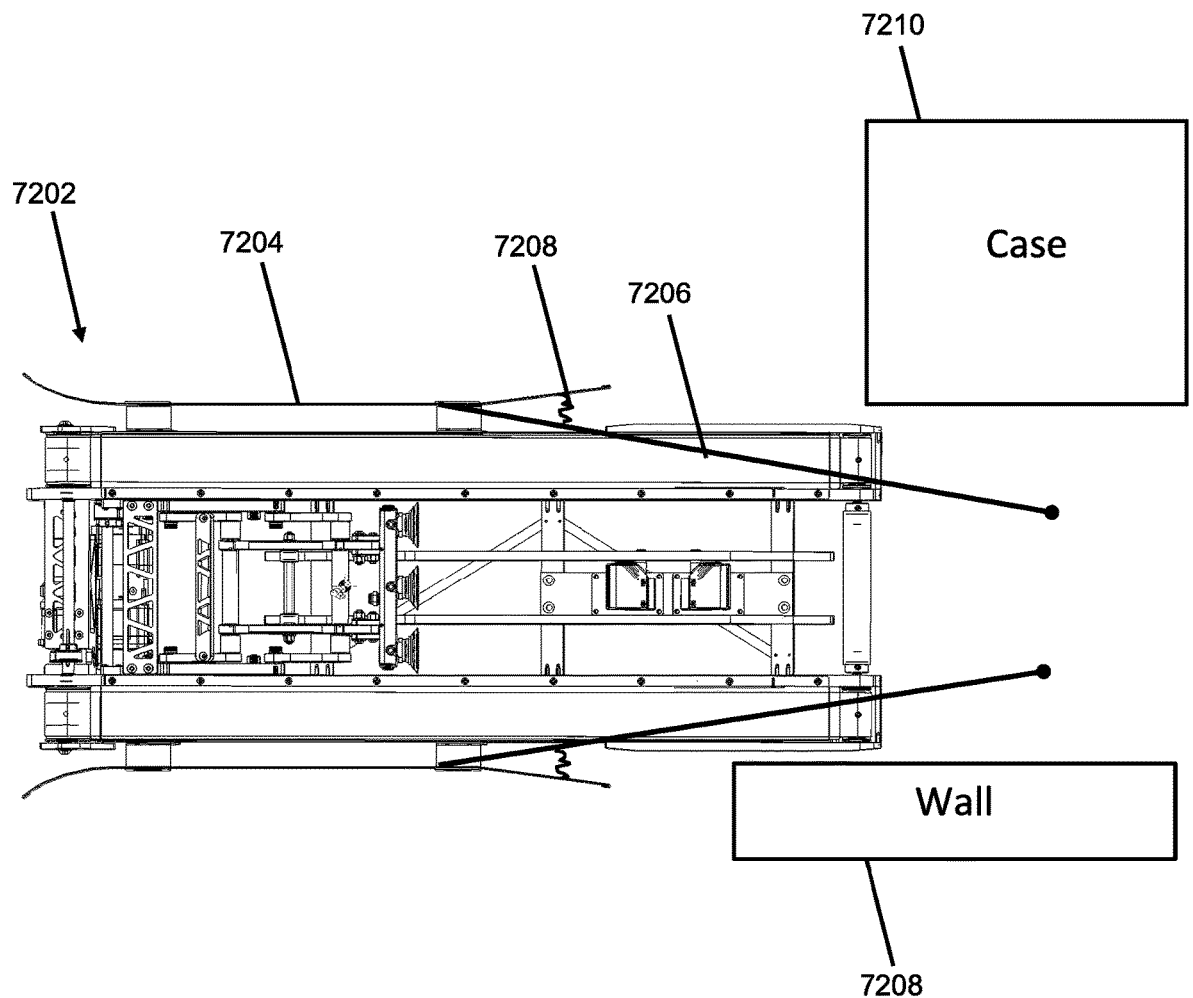
FIG. 72 is a top view of another example of an EoAT.

In other examples, different types rails that are not necessarily flared or even no rails at all can be used. For instance, a wall can be used instead of one or more of the rails 1406, 2306. In one particular example illustrated in FIG. 72, an EoAT 7202, which is similar to those described before, includes one or more of guide rails 7204 that: (1) straight on a front end 7206; (2) longer than so the rail 7204 sticks out from the EoAT 7202, and (3) spring loaded 7208 from the sides. During loading, when the EoAT 7202 places the last case in the row, the EoAT 7202 has a tight fit between a wall 7210 and the adjacent case 7212. By having the guide rails 7204 stick into the space between the wall 7201 and the adjacent case 7212 before the EoAT 7202 pushes the last case off, the EoAT 7202 will have an increased success rate of stacking the last case.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

Cargo or cargo items—is used in a broad sense to generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

Cargo carrier—generally refers to any structure used to transport and/or store cargo items, such as flatbed trailers, trailers, semitrailers, trucks, intermodal containers, refrigerated trailers, and railcars, to just name a few examples. The cargo carrier can be transported in any number of ways, such as over land, sea, space, and/or air. Certain type of cargo carriers, like intermodal containers, are designed to be transported in a number of manners, such as via a truck, in a ship, and via rail. The cargo carrier can be fully enclosed, such as when in the form of a semi-trailer or cargo container, or open to the outside environment, such as with a flatbed trailer.

Conveyor—is used in a broad sense to generally refer to a mechanism that is used to transport something, like a cargo item. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

Loading dock—generally refers to an area of a building or other structure where cargo items for cargo carriers (usually, but not always, road, rail, or sea) are loaded and unloaded. Cargo items can be also staged at the loading dock. Loading docks are commonly found on commercial and industrial buildings, and warehouses in particular. Loading docks may be exterior, flush with the building envelope, or fully enclosed. Loading docks are not just limited to fully enclosed buildings, but instead, can be located at locations that are partially or fully open to the outside environment.

Motor—generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A system, comprising:
a robot including
a base unit having a transport system to move the base unit,
a mast extending from the base unit, the mast having a mast conveyor, and
an End of Arm Tool (EoAT) coupled to the mast, wherein the EoAT includes
an EoAT conveyor configured to move a cargo item to and from the mast conveyor,
a gripper mechanism configured to move between a retracted position where the gripper mechanism is clear of the cargo item on the EoAT conveyor and an extended position where the gripper mechanism is able to grip the cargo item, wherein the gripper mechanism includes
a carriage,
an extension mechanism coupled to the carriage to vertically extend the gripper mechanism relative to the EoAT conveyor, and
a gripping section coupled to the extension mechanism, wherein the gripping section is configured to grip the cargo item, and
wherein the EoAT includes
a cam track along which the carriage rides, wherein the cam track is shaped to guide the extension mechanism to move the gripping mechanism between the retracted position and the extended position, and
a drive track coupled to the carriage to guide the carriage in a longitudinal direction along the cam track to move the gripper mechanism between the retracted position and the extended position.

2. The system of claim 1, wherein:
the gripper mechanism is at or underneath the EoAT conveyor to facilitate unobstructed movement of the cargo item along the EoAT conveyor when in the retracted position; and
the gripper mechanism is raised above the EoAT conveyor to grip the cargo item when in the extended position.

3. The system of claim 1, wherein:
the carriage includes a cam follower coupled to the extension mechanism; and
the cam follower rides along the cam track as the carriage moves in a longitudinal direction along the cam track.

4. The system of claim 3, wherein the cam track includes:
a retracted section where the gripper mechanism is positioned at the retracted position;
an engagement section where the gripper mechanism is at the extended position; and
a transition section located between the retracted section and the engagement section.

5. The system of claim 4, wherein:
the EoAT has a mast facing end where the EoAT is coupled to the mast and a cargo facing end located opposite the mast facing end; and
the cam track includes an extended section configured to lower the gripper mechanism relative to the EoAT conveyor when at the cargo facing end.

6. The system of claim 5, wherein:
the cam track tapers from the mast facing end to the cargo facing end; and
the drive track tapers from the mast facing end to the cargo facing end.

7. The system of claim 4, wherein:
the extension mechanism includes one or more extension linkages pivotally coupled between the carriage and the gripper mechanism.

8. The system of claim 7, wherein the one or more extension linkages are oriented in a parallelogram linkage type arrangement with the carriage and the gripper mechanism.

9. The system of claim 8, wherein the extension mechanism includes a biasing spring to bias the gripper mechanism towards the retracted position.

10. The system of claim 1, wherein the EoAT includes a gripper drive configured to move the gripper mechanism in the longitudinal direction along the drive track.

11. The system of claim 10, wherein:
the gripper drive includes a reversible motor; and
a gripper drive belt operatively connecting the gripper drive to the carriage.

12. The system of claim 10, wherein:
the drive track defines a guide slot; and
the carriage includes a drive wheel recited in the guide slot.

13. The system of claim 1, wherein the EoAT conveyor includes a belt type conveyor.

14. The system of claim 1, wherein the EoAT includes one or more guide rails that have a flared shape.

15. The system of claim 1, wherein:
the gripper mechanism includes at least two vacuum cups; and
each of the vacuum cups has a vacuum control valve that operates independently of the other vacuum cups.

16. The system of claim 1, wherein the gripper mechanism includes one or more vacuum cups to grip the cargo item.

17. The system of claim 1, wherein:
the robot includes an EoAT pitch-yaw joint connecting the EoAT to the mast; and
the EoAT pitch-yaw joint being configured to move the EoAT in a pitch direction and/or a yaw direction.

18. The system of claim 17, wherein the EoAT pitch-yaw joint includes
a yaw pivot shaft;
a pivot block defining a shaft channel through which the yaw pivot shaft extends;
a rack gear rotatably coupled to the yaw pivot shaft to rotate around the yaw pivot shaft; and
a pinion gear engaging the rack gear at a position traverse to the rack gear.

19. The system of claim 18, wherein:
the EoAT pitch-yaw joint includes an EoAT bracket connected to the EoAT;
the EoAT bracket has at least a pair of flanges that define a bracket cavity in which the pivot block is disposed; and
the yaw pivot shaft extends between the flanges.

20. The system of claim 19, wherein the EoAT pitch-yaw joint includes:
a pitch driveshaft secured to the pivot block in a fixed manner;
a pitch drive pulley secured to the pitch driveshaft to move the EoAT in the pitch direction when rotated; and
a yaw drive gear coupled to the pinion gear in a fixed manner, wherein the yaw drive gear is rotatably coupled to the pitch driveshaft to move the EoAT in the yaw direction when rotated about the pitch driveshaft.

21. The system of claim 19, wherein the EoAT pitch-yaw joint includes:
a second pinion gear engaging the rack gear at a second position traverse to the rack gear, wherein the second pinion gear is positioned opposite the pinion gear with the yaw pivot shaft located in between;
a first pulley connected to the pinion to rotate the pinion;
a second pulley connected to the second pinion to rotate the second pinion;
wherein the rack gear is secured in a fixed manner to one of the pair of flanges;
wherein the pivot block defines
a rack cavity in which the rack gear is disposed,
a first pinion cavity in which the pinion is disposed,
a second pinion cavity in which the second pinion is disposed,
a first gear engagement channel extending between the rack cavity and the first pinion cavity, and
a second gear engagement channel extending between the rack cavity and the second pinion cavity;
wherein the pinion and the second pinion are configured to move the EoAT in the pitch direction when rotated in a same direction; and
wherein the pinion and the second pinion are configured to move the EoAT in the yaw direction when rotated in an opposite direction.

22. The system of claim 18, wherein the EoAT pitch-yaw joint includes:
a second pinion gear engaging the rack gear at a second position traverse to the rack gear, wherein the second pinion gear is positioned opposite the pinion gear with the yaw pivot shaft located in between.

23. The system of claim 1, wherein the robot includes a mast actuator system configured to move the mast in a yaw direction, a pitch direction, and/or a longitudinal direction.

24. The system of claim 23, wherein the mast actuator system includes:
a mast yaw control subsystem coupled to the base unit to control movement of the mast in the yaw direction; and
a mast pitch control subsystem coupled to the mast yaw control subsystem to control movement of the mast in the pitch direction and the longitudinal direction.

25. The system of claim 24, wherein the mast yaw control subsystem includes:
a mast base rotatably coupled to the base unit, wherein the mast pitch control subsystem is supported by the mast base; and
a mast yaw drive motor secured to the base unit, wherein the mast yaw drive is coupled to the mast base to rotate the mast base in the yaw direction relative to the base unit.

26. The system of claim 25, wherein the mast yaw control subsystem includes:
a mast yaw drive gearbox mounted to the base unit; and
wherein the mast yaw drive gearbox operatively couples the mast yaw drive motor to the mast base.

27. The system of claim 25, wherein the mast pitch control subsystem includes:
a mast extension arm pivotally coupled between the mast base and the mast, wherein the mast extension arm is configured to pivot to cause the mast and the EoAT to move horizontally in the longitudinal direction; and
a mast pitch arm pivotally coupled between the mast base the mast, wherein the mast pitch arm is configured to move to control movement the mast in the pitch direction.

28. The system of claim 27, wherein the mast pitch control subsystem includes:
an extension drive mounted to the mast base;

an extension crank coupled to the extension drive;
an extension link connecting the extension crank to the mast extension arm;
wherein the extension drive is configured to rotate the extension crank to pivot the mast extension arm;
a pitch drive mounted to the mast base;
a pitch crank coupled to the pitch drive;
wherein the mast pitch arm is pivotally coupled to the pitch crank; and
wherein the pitch drive is configured to rotate the pitch crank to move the mast pitch arm.

29. The system of claim 23, further comprising:
a counterbalance system coupled to the mast to counterbalance the weight of the mast.

30. The system of claim 29, wherein the counterbalance system includes an air spring coupled to the mast.

31. The system of claim 23, further comprising:
a base unit conveyor operatively connecting the base unit and the mast to transport the cargo item between the mast and a main conveyor system, wherein the base unit conveyor has an extendable length;
a mast connection joint connecting the base unit conveyor to the mast, wherein the mast connection joint is configured to allow multidirectional movement between the base unit conveyor and the mast; and
a base connection joint connecting the base unit conveyor to the base unit, wherein the base unit connection joint is configured to allow movement of the base unit conveyor in the yaw direction and the pitch direction.

32. The system of claim 1, further comprising:
a base unit conveyor operatively connecting the base unit and the mast, wherein the base unit conveyor is configured to extend in a telescoping manner;
a mast connection joint connecting the base unit conveyor to the mast, wherein the mast connection joint is configured to allow multidirectional movement between the base unit conveyor and the mast; and
a base connection joint connecting the base unit conveyor to the base unit, wherein the base unit connection joint is configured to allow movement of the base unit conveyor in the yaw direction and the pitch direction.

33. The system of claim 32, wherein the base unit conveyor includes:
a mast section connected to the mast via the mast connection joint;
a transition section connected to the base unit via the base unit connection joint, wherein the mast section and the transition section are nested together; and
a telescoping joint connecting the mast section to the transition section to allow the mast section to move relative to the transition section in a telescoping manner.

34. The system of claim 33, wherein:
the mast section includes
 a mast section conveyor, and
 a mast section conveyor motor configured to power the mast section conveyor;
the transition section includes
 a transition section conveyor, and
 a transition section conveyor motor configured to power the transition section conveyor; and
wherein the mast section conveyor motor and the transition section conveyor motor are configured to operate independently of each other.

35. The system of claim 32, wherein the mast connection joint includes a ball type joint to facilitate relative movement between the mast and the base unit conveyor in both a pitch direction and a yaw direction.

36. The system of claim 32, wherein the base connection joint includes:
a turntable joint rotatably coupled to the base unit;
a conveyor shaft bracket defining a shaft opening; and
a conveyor shaft rotatably received in the shaft opening.

37. The system of claim 1, wherein the transport system includes one or more self-powered wheels configured to rotate at least ninety-degrees (90°) relative to the base unit.

38. The system of claim 1, further comprising:
a main conveyor system; and
an extendable conveyor coupled between the robot and the main conveyor.

39. A system, comprising:
an End of Arm Tool (EoAT) including
 an EoAT conveyor configured to move a cargo item,
 a gripper mechanism configured to move between a retracted position and an extended position,
 wherein the gripper mechanism includes one or more vacuum cups to grip the cargo item,
 wherein the gripper mechanism is at or underneath the EoAT conveyor to facilitate unobstructed movement of the cargo item along the EoAT conveyor when in the retracted position,
 wherein the gripper mechanism is raised above the EoAT conveyor to grip the cargo item when in the extended position;
an EoAT pitch-yaw joint connected to the EoAT; and
the EoAT pitch-yaw joint being configured to move the EoAT in a pitch direction and/or a yaw direction.

40. The system of claim 39, wherein the gripper mechanism includes:
a carriage;
an extension mechanism coupled to the carriage to vertically extend the gripper mechanism relative to the EoAT conveyor; and
a gripping section coupled to the extension mechanism, wherein the gripping section is configured to grip the cargo item.

41. The system of claim 40, wherein the EoAT includes:
a cam track along which the carriage rides, wherein the cam track is shaped to guide the extension mechanism to move the gripping mechanism between the retracted position and the extended position; and
a drive track coupled to the carriage to guide the carriage in a longitudinal direction along the cam track to move the gripper mechanism between the retracted position and the extended position.

42. The system of claim 41, wherein:
the carriage includes a cam follower coupled to the extension mechanism; and
the cam follower rides along the cam track as the carriage moves in a longitudinal direction along the cam track.

43. The system of claim 42, wherein the cam track includes:
a retracted section where the gripper mechanism is positioned at the retracted position;
an engagement section where the gripper mechanism is at the extended position; and
a transition section located between the retracted section and the engagement section.

44. The system of claim 39, wherein the EoAT pitch-yaw joint includes
a yaw pivot shaft;
a pivot block defining a shaft channel through which the yaw pivot shaft extends;

a rack gear rotatably coupled to the yaw pivot shaft to rotate around the yaw pivot shaft; and
a pinion gear engaging the rack gear at a position traverse to the rack gear.

45. The system of claim 39, further comprising:
a robot including
   a base unit having a transport system to move the base unit,
   a mast extending from the base unit, the mast having a mast conveyor, and
   the EoAT coupled to the mast.

46. The system of claim 39, wherein:
the EoAT includes a guide rail having a front end extending longer than the EoAT; and
the front end is spring biased.

47. The system of claim 39, wherein the EoAT has a vision sensor to sense the cargo item.

48. A system, comprising:
an End of Arm Tool (EoAT) having an EoAT conveyor;
a mast having a mast conveyor;
an EoAT pitch-yaw joint connecting the EoAT to the mast;
wherein the EoAT pitch-yaw joint is configured to move the EoAT in a pitch direction and/or a yaw direction to maintain alignment of the EoAT conveyor and the mast conveyor; and
wherein the EoAT pitch-yaw joint includes
   a yaw pivot shaft,
   a rack gear rotatably coupled to the yaw pivot shaft to rotate around the yaw pivot shaft,
   a first pinion gear engaging the rack gear at a position traverse to the rack gear, and
   a second pinion gear engaging the rack gear at a second position traverse to the rack gear.

49. The system of claim 48, wherein:
the mast conveyor includes a mast conveyor belt; and
the EoAT pitch-yaw joint includes:
a pivot housing;
a mast conveyor pulley rotatably coupled to the pivot housing, and
wherein the mast conveyor belt engages the mast conveyor pulley.

50. A system, comprising:
a base unit having a transport system to move the base unit,
a mast having a mast conveyor coupled to the base unit;
a mast actuator system configured to move the mast in a yaw direction, a pitch direction, and/or a longitudinal direction relative to the base unit, wherein the mast actuator system includes
   a mast yaw control subsystem coupled to the base unit to control movement of the mast in the yaw direction, and
   a mast pitch control subsystem coupled to the mast yaw control subsystem to control movement of the mast in the pitch direction and the longitudinal direction;
a base unit conveyor operatively connecting the base unit and the mast to transport a cargo item, wherein the base unit conveyor has an extendable length;
a mast connection joint connecting the base unit conveyor to the mast, wherein the mast connection joint is configured to allow multidirectional movement between the base unit conveyor and the mast; and
a base connection joint connecting the base unit conveyor to the base unit, wherein the base unit connection joint is configured to allow movement of the base unit conveyor in the yaw direction and the pitch direction.

51. The system of claim 50, wherein the mast yaw control subsystem includes:
a mast base rotatably coupled to the base unit, the mast pitch control subsystem is supported by the mast base; and
a mast yaw drive motor secured to the base unit, wherein the mast yaw drive is coupled to the mast base to rotate the mast base in the yaw direction relative to the base unit.

52. The system of claim 51, wherein the mast pitch control subsystem includes:
a mast extension arm pivotally coupled between the mast base and the mast, wherein the mast extension arm is configured to pivot to cause the mast to move horizontally in the longitudinal direction; and
a mast pitch arm pivotally coupled between the mast base and the mast, wherein the mast pitch arm is configured to move to control movement of the mast in the pitch direction.

53. The system of claim 50, wherein the base unit conveyor includes:
a mast section connected to the mast via the mast connection joint;
a transition section connected to the base unit via the base unit connection joint, wherein the mast section and the transition section are nested together; and
a telescoping joint connecting the mast section to the transition section to allow the mast section to move relative to the transition section in a telescoping manner.

54. The system of claim 53, wherein:
the mast section includes
   a mast section conveyor, and
   a mast section conveyor motor configured to power the mast section conveyor;
the transition section includes
   a transition section conveyor, and
   a transition section conveyor motor configured to power the transition section conveyor; and
wherein the mast section conveyor motor and the transition section conveyor motor are configured to operate independently of each other.

55. The system of claim 50, wherein the mast connection joint includes a ball type joint to facilitate relative movement between the mast and the base unit conveyor in both a pitch direction and a yaw direction.

56. The system of claim 50, wherein the base connection joint includes:
a turntable joint rotatably coupled to the base unit;
a conveyor shaft bracket defining a shaft opening; and
a conveyor shaft rotatably received in the shaft opening.

57. A system, comprising:
a robot including
   a base unit having a transport system to move the base unit,
   a mast extending from the base unit, the mast having a mast conveyor, and
   an End of Arm Tool (EoAT) coupled to the mast, wherein the EoAT includes
   an EoAT conveyor configured to move a cargo item to and from the mast conveyor,
   a gripper mechanism configured to move between a retracted position where the gripper mechanism is clear of the cargo item on the EoAT conveyor and an extended position where the gripper mechanism is able to grip the cargo item, and an EoAT pitch-yaw joint connecting the EoAT to the mast, wherein the EoAT pitch-yaw joint being configured to move the EoAT in a pitch direction and/or a yaw direction, wherein the EoAT pitch-yaw joint includes
- a yaw pivot shaft,
- a pivot block defining a shaft channel through which the yaw pivot shaft extends,
- a rack gear rotatably coupled to the yaw pivot shaft to rotate around the yaw pivot shaft, and
- a pinion gear engaging the rack gear at a position traverse to the rack gear.

58. The system of claim 57, wherein:
the EoAT pitch-yaw joint includes an EoAT bracket connected to the EoAT;
the EoAT bracket has at least a pair of flanges that define a bracket cavity in which the pivot block is disposed; and
the yaw pivot shaft extends between the flanges.

59. The system of claim 58, wherein the EoAT pitch-yaw joint includes:
- a pitch driveshaft secured to the pivot block in a fixed manner;
- a pitch drive pulley secured to the pitch driveshaft to move the EoAT in the pitch direction when rotated; and
- a yaw drive gear coupled to the pinion gear in a fixed manner, wherein the yaw drive gear is rotatably coupled to the pitch driveshaft to move the EoAT in the yaw direction when rotated about the pitch driveshaft.

60. The system of claim 57, wherein the EoAT pitch-yaw joint includes:
a second pinion gear engaging the rack gear at a second position traverse to the rack gear, wherein the second pinion gear is positioned opposite the pinion gear with the yaw pivot shaft located in between.

61. A system, comprising:
a base unit having a transport system to move the base unit,
a mast having a mast conveyor coupled to the base unit;
a mast actuator system configured to move the mast in a yaw direction, a pitch direction, and/or a longitudinal direction relative to the base unit, wherein the mast actuator system includes
 a mast yaw control subsystem coupled to the base unit to control movement of the mast in the yaw direction, wherein the mast yaw control subsystem includes
  a mast base rotatably coupled to the base unit, the mast pitch control subsystem is supported by the mast base, and
  a mast yaw drive motor secured to the base unit, wherein the mast yaw drive is coupled to the mast base to rotate the mast base in the yaw direction relative to the base unit, and
 a mast pitch control subsystem coupled to the mast yaw control subsystem to control movement of the mast in the pitch direction and the longitudinal direction, wherein the mast pitch control subsystem includes
  a mast extension arm pivotally coupled between the mast base and the mast, wherein the mast extension arm is configured to pivot to cause the mast to move horizontally in the longitudinal direction, and
  a mast pitch arm pivotally coupled between the mast base and the mast, wherein the mast pitch arm is configured to move to control movement of the mast in the pitch direction.

62. The system of claim 61, wherein the mast yaw control subsystem includes:
a mast yaw drive gearbox mounted to the base unit; and
wherein the mast yaw drive gearbox operatively couples the mast yaw drive motor to the mast base.

63. The system of claim 61, wherein the mast pitch control subsystem includes:
a mast extension arm pivotally coupled between the mast base and the mast, wherein the mast extension arm is configured to pivot to cause the mast and the EoAT to move horizontally in the longitudinal direction; and
a mast pitch arm pivotally coupled between the mast base the mast, wherein the mast pitch arm is configured to move to control movement the mast in the pitch direction.

64. The system of claim 63, wherein the mast pitch control subsystem includes:
an extension drive mounted to the mast base;
an extension crank coupled to the extension drive;
an extension link connecting the extension crank to the mast extension arm;
wherein the extension drive is configured to rotate the extension crank to pivot the mast extension arm;
a pitch drive mounted to the mast base;
a pitch crank coupled to the pitch drive;
wherein the mast pitch arm is pivotally coupled to the pitch crank; and
wherein the pitch drive is configured to rotate the pitch crank to move the mast pitch arm.

65. A system, comprising:
a robot including
 a base unit having a transport system to move the base unit,
 a mast extending from the base unit, the mast having a mast conveyor, and
 an End of Arm Tool (EoAT) coupled to the mast, wherein the EoAT includes an EoAT conveyor configured to move a cargo item to and from the mast conveyor,
 a gripper mechanism configured to move between a retracted position where the gripper mechanism is clear of the cargo item on the EoAT conveyor and an extended position where the gripper mechanism is able to grip the cargo item, wherein the gripper mechanism is at or underneath the EoAT conveyor to facilitate unobstructed movement of the cargo item along the EoAT conveyor when in the retracted position, the gripper mechanism is raised above the EoAT conveyor to grip the cargo item when in the extended position,
 an EoAT pitch-yaw joint connecting the EoAT to the mast, wherein EoAT pitch-yaw joint is configured to move the EoAT in a pitch direction and a yaw direction,
 a mast yaw control subsystem coupled to the base unit and the mast to control movement of the mast in the yaw direction,
 a mast pitch control subsystem coupled to the mast yaw control subsystem to control movement of the mast in the pitch direction, and
 wherein the EoAT pitch-yaw joint orients the EoAT relative to the mast as the mast yaw control subsystem moves the mast in the yaw direction and the mast pitch control subsystem moves the mast in the pitch so that the gripper mechanism is able to engage the cargo item in a flush manner.

66. The system of claim 65, wherein the mast yaw control subsystem includes:
a mast base rotatably coupled to the base unit, wherein the mast pitch control subsystem is supported by the mast base; and
a mast yaw drive motor secured to the base unit, wherein the mast yaw drive is coupled to the mast base to rotate the mast base in the yaw direction relative to the base unit.

67. The system of claim 66, wherein the mast yaw control subsystem includes:
a mast yaw drive gearbox mounted to the base unit; and
wherein the mast yaw drive gearbox operatively couples the mast yaw drive motor to the mast base.

68. The system of claim 66, wherein the mast pitch control subsystem includes:
a mast extension arm pivotally coupled between the mast base and the mast, wherein the mast extension arm is configured to pivot to cause the mast and the EoAT to move horizontally in the longitudinal direction; and
a mast pitch arm pivotally coupled between the mast base the mast, wherein the mast pitch arm is configured to move to control movement the mast in the pitch direction.

* * * * *